United States Patent [19]
Horikiri et al.

[11] Patent Number: 5,706,501
[45] Date of Patent: Jan. 6, 1998

[54] APPARATUS AND METHOD FOR MANAGING RESOURCES IN A NETWORK COMBINING OPERATIONS WITH NAME RESOLUTION FUNCTIONS

[75] Inventors: Kazunori Horikiri; Ichiro Yamashita; Shigehisa Kawabe; Sunao Hashimoto, all of Nakai-machi, Japan

[73] Assignee: Fuji Xerox Co., Ltd., Tokyo, Japan

[21] Appl. No.: 545,030

[22] Filed: Oct. 19, 1995

[30] Foreign Application Priority Data

Feb. 23, 1995 [JP] Japan .................... 7-035499

[51] Int. Cl.[6] .................... G06F 15/163; G06F 17/00
[52] U.S. Cl. .................... 395/610; 395/640; 395/619; 395/616; 395/200.11; 395/200.19; 395/200.2
[58] Field of Search .................... 395/610, 200.02, 395/200.03, 200.11, 604, 619, 200.19, 200.2, 616

[56] References Cited

U.S. PATENT DOCUMENTS

| | | | |
|---|---|---|---|
| 4,644,468 | 2/1987 | Doster et al. | 364/200 |
| 5,345,586 | 9/1994 | Hamala et al. | 395/650 |
| 5,408,619 | 4/1995 | Oran | 395/325 |
| 5,434,914 | 7/1995 | Fraser | 379/219 |
| 5,434,974 | 7/1995 | Loucks et al. | 395/200 |
| 5,581,761 | 12/1996 | Radia et al. | 395/702 |
| 5,588,119 | 12/1996 | Vincent et al. | 395/200.15 |

FOREIGN PATENT DOCUMENTS

| | | |
|---|---|---|
| 63-236436 | 10/1988 | Japan . |
| 5-189389 | 7/1993 | Japan . |
| 5-219799 | 8/1993 | Japan . |
| 5-274274 | 10/1993 | Japan . |
| 5-342134 | 12/1993 | Japan . |

OTHER PUBLICATIONS

Dasgupta, P. "Resource Location in Very Large Networks", IEEE pp. 156–163, 1994.
Fujinami, N. "Naming and Addressing of Objects Without Unique Identifiers", IEEE, pp. 581–588, 1992.
Local Area Network. Outline of Ethernet (Maruzen), 2nd Edition, pp. 222–229, Xerox Corp., A. Uetani, 1989.
Distributed Operating System, That Coming Next to UNIX (Shuppan), pp. 243–264, 1991, Shimizu et al.
"Name Management on Distributed Operating System" (Shimizu et al.) *Computer Software*, vol. 6, No. 3, Jul. 1989, pp. 19–34.
"A Model of Name Resolution in Distributed Systems" (Comer et al.), Proc. 6th Intl. Conf. on Distributed Computing Systems, pp. 523–530, IEEE, 1986.

*Primary Examiner*—Thomas G. Black
*Assistant Examiner*—Jean R. Homere
*Attorney, Agent, or Firm*—Oliff & Berridge

[57] ABSTRACT

When the name of a resource is inputted to a given context holder, a name analysis unit analyzes the name and a name translation unit converts it into first or second resource implementation representations. A name resolution unit receives the first or second resource implementation representations from each context holder. When the result of conversion is of the second resource implementation representations, the name resolution unit outputs a resource name of a second series or string of resource elements included in the second resource implementation representations to its corresponding context holder. This operation is executed on a chain basis to solve the name. A resource implementation unit outputs a handle for the resource corresponding to the result of name resolution therefrom. A user can obtain access to a virtual resource corresponding to the input name by using the handle. Owing to the above construction, an apparatus for and a method of managing resources can be provided which is capable of embodying a high-flexible distributed system providing name spaces for performing local resource access every users, which reflect preference and intentions for an access method by each individual user.

12 Claims, 49 Drawing Sheets

| NAME | SERIES OF RESOURCE IMPLEMENTATION ELEMENTS | SERIES OF CONTEXT IDENTIFIERS |
|---|---|---|
| Z | (COMPRESS) | CTXT-1 |
| | | |

FIG.8

| NAME | SERIES OF RESOURCE IMPLEMENTATION ELEMENTS | SERIES OF RESOURCE ELEMENTS |
|---|---|---|
| NAME 1 | INTERPOLATE_300_100 | RES3, RES2 |
| NAME 2 | INTERPOLATE_800_100 | RES4, RES2 |
| NAME 3 | INTERPOLATE_400_100 | RES1, RES2 |

FIG.9

| NAME | IDENTIFIER | PROCEDURE |
|---|---|---|
| " " |  | [GROUP] |
| "1G" | [1G] |  |
| "2G" | [2G] |  |

FIG.16A

| NAME | IDENTIFIER | PROCEDURE |
|---|---|---|
| " " |  | [GROUP] |
| "MONTHLY REPORT" | [1G MONTHLY REPORT] |  |
| "PLAN" | [1G PLAN] |  |

FIG.16B

| NAME | IDENTIFIER | PROCEDURE |
|---|---|---|
| " " | | [GROUP] |
| "MONTHLY REPORT" | [2G MONTHLY REPORT] | |
| "PATENT" | [2G PATENT] | |

FIG.16C

| NAME | IDENTIFIER | PROCEDURE |
|---|---|---|
| " " | | [GROUP] |
| "BY G" | [BY G] | |

FIG.16D

| NAME | IDENTIFIER | PROCEDURE |
|---|---|---|
| " " | | [GROUP] |
| "BY G" | [BY G] | |

FIG.18A

| NAME | IDENTIFIER | PROCEDURE |
|---|---|---|
| " " | | [GROUP] |
| "BY DOCUMENT" | [BY DOCUMENT] | |

FIG.18B

| NAME | IDENTIFIER | PROCEDURE |
|---|---|---|
| " " | | [GROUP] |
| "MONTHLY REPORT" | [ MONTHLY REPORT] | |
| "PLAN" | [PLAN] | |
| "PATENT" | [PATENT] | |

FIG.18C

| NAME | IDENTIFIER | PROCEDURE |
|---|---|---|
| " " | | [GROUP] |
| "1G" | [1G] | |
| "2G" | [2G] | |

FIG.18D

| NAME | IDENTIFIER | PROCEDURE |
|---|---|---|
| " " | | [GROUP] |
| "MONTHLY REPORT" | [1G MONTHLY REPORT] | |
| "PLAN" | [1G PLAN] | |

FIG.18E

| NAME | IDENTIFIER | PROCEDURE |
|---|---|---|
| " " | | [GROUP] |
| "MONTHLY REPORT" | [2G MONTHLY REPORT] | |
| "PATENT" | [2G PATENT] | |

FIG.18F

| NAME | IDENTIFIER | PROCEDURE |
|---|---|---|
| " " | | [GROUP] |
| "1G" | [1G MONTHLY REPORT] | |
| "2G" | [2G PLAN] | |

FIG.18G

| NAME | IDENTIFIER | PROCEDURE |
|---|---|---|
| " " | | [GROUP] |
| "1G" | [1G PLAN] | |

FIG.18H

| NAME | IDENTIFIER | PROCEDURE |
|---|---|---|
| " " | | [GROUP] |
| "2G" | [2G PATENT] | |

FIG.18I

| NAME | IDENTIFIER | PROCEDURE |
|------|------------|-----------|
| " "  |            | [GROUP]   |
| "BY G" | [BY G]   |           |

FIG.22A

| NAME | IDENTIFIER | PROCEDURE |
|------|------------|-----------|
| " "  |            | [GROUP]   |
| "1G" | [1G]       |           |
| "2G" | [2G]       |           |

FIG.22B

| NAME | IDENTIFIER | PROCEDURE |
|---|---|---|
| " " | | [GROUP] |
| "MONTHLY REPORT" | [1G MONTHLY REPORT] | [COMPRESSION/ EXPANSION] |
| "PLAN" | [1G PLAN] | [COMPRESSION/ EXPANSION] |

FIG.22C

| NAME | IDENTIFIER | PROCEDURE |
|---|---|---|
| " " | | [GROUP] |
| "MONTHLY REPORT" | [2G MONTHLY REPORT] | [COMPRESSION/ EXPANSION] |
| "PATENT" | [2G PATENT] | [COMPRESSION/ EXPANSION] |

FIG.22D

| NAME | IDENTIFIER | PROCEDURE |
|---|---|---|
| " " | | [GROUP] |
| "BY G" | [BY G] | |

FIG.24A

| NAME | IDENTIFIER | PROCEDURE |
|---|---|---|
| " " | | [GROUP] |
| "1G" | [1G] | [COMPRESSION/ EXPANSION] |
| "2G" | [2G] | [COMPRESSION/ EXPANSION] |

FIG.24B

| NAME | IDENTIFIER | PROCEDURE |
|---|---|---|
| " " | | [GROUP] |
| "MONTHLY REPORT" | [1G MONTHLY REPORT] | |
| "PLAN" | [1G PLAN] | |

FIG.24C

| NAME | IDENTIFIER | PROCEDURE |
|---|---|---|
| " " | | [GROUP] |
| "MONTHLY REPORT" | [2G MONTHLY REPORT] | |
| "PATENT" | [2G PATENT] | |

FIG.24D

| NAME | IDENTIFIER | PROCEDURE |
|---|---|---|
| " " | | [GROUP] |
| "BY G" | [BY G] | [COMPRESSION/ EXPANSION] |

FIG.26A

| NAME | IDENTIFIER | PROCEDURE |
|---|---|---|
| " " | | [GROUP] |
| "1G" | [1G] | |
| "2G" | [2G] | |

FIG.26B

| NAME | IDENTIFIER | PROCEDURE |
|---|---|---|
| " " | | [GROUP] |
| "MONTHLY REPORT" | [1G MONTHLY REPORT] | |
| "PLAN" | [1G PLAN] | |

FIG.26C

| NAME | IDENTIFIER | PROCEDURE |
|---|---|---|
| " " | | [GROUP] |
| "MONTHLY REPORT" | [2G MONTHLY REPORT] | |
| "PATENT" | [2G PATENT] | |

GROUP MANAGER

| GROUP ATTRIBUTE HOLDER 94-0 | GROUP ATTRIBUTE HOLDER 94-4 | GROUP ATTRIBUTE HOLDER 94-5 |
|---|---|---|
| GROUP IDENTIFIER [/] | GROUP IDENTIFIER [\] | GROUP IDENTIFIER [BY-DOCUMENT] |
| NAME ANALYSIS UNIT 2-0 | NAME ANALYSIS UNIT 2-4 | NAME ANALYSIS UNIT 2-5 |
| NAME TRANSLATION UNIT FIG.18(A) 3-0 | NAME TRANSLATION UNIT FIG.18(B) 3-4 | NAME TRANSLATION UNIT FIG.18(C) 3-5 |
| NAME RESOLUTION UNIT 4-0 | NAME RESOLUTION UNIT 4-4 | NAME RESOLUTION UNIT 4-5 |

| GROUP ATTRIBUTE HOLDER 94-1 | GROUP ATTRIBUTE HOLDER 94-2 | GROUP ATTRIBUTE HOLDER 94-3 |
|---|---|---|
| GROUP IDENTIFIER [BY G] | GROUP IDENTIFIER [1G] | GROUP IDENTIFIER [2G] |
| NAME ANALYSIS UNIT 2-1 | NAME ANALYSIS UNIT 2-2 | NAME ANALYSIS UNIT 2-3 |
| NAME TRANSLATION UNIT FIG.18(D) 3-1 | NAME TRANSLATION UNIT FIG.18(E) 3-2 | NAME TRANSLATION UNIT FIG.18(F) 3-3 |
| NAME RESOLUTION UNIT 4-1 | NAME RESOLUTION UNIT 4-2 | NAME RESOLUTION UNIT 4-3 |

| GROUP ATTRIBUTE HOLDER 94-6 | GROUP ATTRIBUTE HOLDER 94-7 | GROUP ATTRIBUTE HOLDER 94-8 |
|---|---|---|
| GROUP IDENTIFIER [MONTHLY REPORT] | GROUP IDENTIFIER [PLAN] | GROUP IDENTIFIER [PATENT] |
| NAME ANALYSIS UNIT 2-6 | NAME ANALYSIS UNIT 2-7 | NAME ANALYSIS UNIT 2-8 |
| NAME TRANSLATION UNIT FIG.18(G) 3-6 | NAME TRANSLATION UNIT FIG.18(H) 3-7 | NAME TRANSLATION UNIT FIG.18(I) 3-8 |
| NAME RESOLUTION UNIT 4-6 | NAME RESOLUTION UNIT 4-7 | NAME RESOLUTION UNIT 4-8 |

FIG.31

| IDENTIFIER OF GROUP ATTRIBUTE HOLDER | NAME | RESULT OF NAME SOLUTION |
|---|---|---|
| GROUP ATTRIBUTE HOLDER 0 (/) | "/BY-G/G1/MONTHLY REPORT" | 1-(1-(1-[G1 MONTHLY REPORT]))) |
| GROUP ATTRIBUTE HOLDER 1 (BY-G) | "/G1/MONTHLY REPORT" | 1-(1-([G1 MONTHLY REPORT])) |
| GROUP ATTRIBUTE HOLDER 2 (1G) | "/MONTHLY REPORT" | 1-([G1 MONTHLY REPORT]) |

FIG.32

| IDENTIFIER OF GROUP ATTRIBUTE HOLDER | NAME | RESULT OF NAME SOLUTION |
|---|---|---|
| GROUP ATTRIBUTE HOLDER 0 (/) | "/BY-G/G1" | 1-(1-GROUP(G1))) |
| GROUP ATTRIBUTE HOLDER 1 (BY-G) | "/G1" | 1-(GROUP(G1)) |
| GROUP ATTRIBUTE HOLDER 2 (1G) | "" | GROUP(G1) |

FIG.33

| IDENTIFIER OF GROUP ATTRIBUTE HOLDER | NAME | RESULT OF NAME SOLUTION |
|---|---|---|
| GROUP ATTRIBUTE HOLDER 4 (\) | "/BY-DOCUMENT\MONTHLY REPORT\G1" | 1-(1-(1-[G1 MONTHLY REPORT]))) |
| GROUP ATTRIBUTE HOLDER 5 (BY-DOCUMENT) | "/MONTHLY REPORT\G1" | 1-(1-([G1 MONTHLY REPORT])) |
| GROUP ATTRIBUTE HOLDER 6 (MONTHLY REPORT) | "/G1" | 1-([G1 MONTHLY REPORT]) |

FIG.34

| IDENTIFIER OF GROUP ATTRIBUTE HOLDER | NAME | RESULT OF NAME RESOLUTION |
|---|---|---|
| GROUP ATTRIBUTE HOLDER 10 (/) | "/BY-G/G1/MONTHLY REPORT" | 1-(1-(COMPRESSION EXPANSION ([G1 MONTHLY REPORT]))) |
| GROUP ATTRIBUTE HOLDER 11 (BY-G) | "/G1/MONTHLY REPORT" | 1-(COMPRESSION EXPANSION ([G1 MONTHLY REPORT])) |
| GROUP ATTRIBUTE HOLDER 12 (1G) | "/MONTHLY REPORT" | COMPRESSION EXPANSION ([G1 MONTHLY REPORT]) |

FIG.35

| IDENTIFIER OF GROUP ATTRIBUTE HOLDER | NAME | RESULT OF NAME RESOLUTION |
|---|---|---|
| GROUP ATTRIBUTE HOLDER 0 (/) | "/BY-G/G1/MONTHLY REPORT" | 1-(COMPRESSION/EXPANSION 1-([G1 MONTHLY REPORT]))) |
| GROUP ATTRIBUTE HOLDER 1 (BY-G) | "/G1/MONTHLY REPORT" | (COMPRESSION/EXPANSION {1-[G1 MONTHLY REPORT])) |
| GROUP ATTRIBUTE HOLDER 2 (1G) | "/MONTHLY REPORT" | 1-([G1 MONTHLY REPORT]) |

FIG.36

ELEMENT (SELECT x FROM CONTEXT WHERE
x.PROPERTY. OWNER = "SMITH "
AND x.PROPERTY.MDATE ) 95. 3. 16
AND x.PROPERTY. CATEGORY = "PICTURE "
)

```
STRUCT CONTEXT (
    PARSER: ELEMENT (SELECT x FROM PARSER WHERE
              x. PROPERTY. NAME = " PATH_EXPRESSION "
          ) . PARSER,
    TRANS: ELEMENT (SELECT y FROM TRANS WHERE
              y.PROPERTY. OWNER = "SMITH "
          AND y.PROPERTY.CATEGORY = "PICTURE "
          ) . TRANS,
)
```

FIG.41

| NAME | PRICE |
|---|---|
| PART1 | 1500 |
| PART2 | 300 |
| PART3 | 200 |
| PART4 | 5000 |
| PART5 | 600 |

FIG.44

| NAME | SUPPLIER |
|---|---|
| PART1 | COM1 |
| PART1 | COM2 |
| PART2 | COM1 |
| PART2 | COM3 |
| PART3 | COM4 |
| PART4 | COM4 |
| PART5 | COM5 |

FIG.45

| NAME | TEL | OUTLINE |
|---|---|---|
| COM1 | 11-111-1111 | RES-5 |
| COM2 | 22-222-2222 | RES-4 |
| COM3 | 33-333-3333 | RES-3 |
| COM4 | 44-444-4444 | RES-2 |
| COM5 | 55-555-5555 | RES-1 |

FIG.46

```
STRUCT CONTEXT (
    PARSER: ELEMENT (SELECT x FROM PARSER WHERE
                     x. PROPERTY. NAME = " PATH_EXPRESSION "
                ) . PARSER,
    TRANS: SELECT TRANS (FROM: z.NAME, TO: .OUTLINE)
                FROM x IN PARTS,
                     y IN SUPPLY,
                     z IN COMPANIES
                WHERE x.PRICE) 1000 AND x.NAME = y.NAME
                AND y.SUPPLIER = z.NAME
)
```

| PARTS | | SUPPLY | | COMPANIES | | |
|---|---|---|---|---|---|---|
| NAME | PRICE | NAME | SUPPLIER | NAME | TEL | OUTLINE |
| PART1 | 1500 | PART1 | COM1 | COM1 | 11-111-1111 | RES-5 |
| PART1 | 1500 | PART1 | COM2 | COM2 | 22-222-2222 | RES-4 |
| PART4 | 5000 | PART4 | COM4 | COM4 | 44-444-4444 | RES-2 |

FIG.49

| FROM | TO |
|---|---|
| COM1 | RES-5 |
| COM2 | RES-4 |
| COM4 | RES-2 |

FIG.50

APPARATUS AND METHOD FOR MANAGING RESOURCES IN A NETWORK COMBINING OPERATIONS WITH NAME RESOLUTION FUNCTIONS

BACKGROUND OF THE INVENTION

1. Field of the Invention

The present invention relates to a system for managing resource handled by a plurality of computer systems for performing information processing, which is suitable for use in a network information system wherein the plurality of computer systems are connected to one another by a network.

2. Description of the Related Art

As one of conventional resource management systems, a resource management system for offering clearing house service, which has been proposed by U.S. Xerox corporation, has been described in, for example, a technical literature "Local Area Network, outline of Ethernet," revised second edition, by Akihiro Uetani, published by Maruzen Co., Ltd. The clearing house service corresponds to a distributed data base employed in the resource management system for managing names of resources employed in a distributed system so as to correspond to arbitrary number of attributes.

The clearing house service can handle the type of resource, a password, an alias, name of a file server, name of a mail box, name of a printer, a group, a list of delivery destinations, etc. as the attributes. However, the clearing house service does not provide the function of allowing names based on a plurality of local naming rules according to the uses and needs of individual users as well as global names to be given to the resources employed in the distributed system and enabling their treatment.

As another resource management system, there is known one employed in a GALAXY operating system described in, for example, a technical literature "Distributed Operating System, That Coming Next to UNIX"(UNIX is a trade mark of UNIX System Laboratories, Inc.)" by Kentaro Shimizu, Mamoru Maekawa and Hyo Ashihara, published by Kyoritsu Shuppan Co., Ltd., pp. 243-264 and a technical literature "Computer Software," Vo. 6, No. 3 (1989), pp. 19-34. This is of a system wherein a plurality of contexts corresponding to environments for interpreting names are provided and the contexts are constructed as a set of directories each composed of external names, translation names and a list of attributes.

This type of resource management system holds and manages a corresponding relationship of the external names to the translation names, based on a hash table or a table using a B-tree or the like. Therefore, the resource management system can handle the resources in the distributed system under unified external names given to the resources, thereby improving its operability. Further, since different external names can be given to the same resource in each context, the present system can provide local name spaces capable of giving a plurality of local names according to the uses and needs to the resources in the distributed system and handling the named resources. Since, however, the naming rule and the rule for name interpretation are all the same to each context, the resources in the distributed system cannot be handled by providing different naming rules every users and giving flexible local names according to the resource uses and needs to the resources respectively.

As a further resource management system, there is known a name resolution mechanism used in a distributed system, which has been described in a technical literature "A Model of Name Resolution in Distributed System" by Douglas E. Comer, Larry L. Peterson, in Proceedings The 6th International Conference on Distributed Computing Systems, (1986), pp. 523-530. When a client process makes a request for resolution of a name corresponding to a predetermined resource, the name resolution mechanism starts from an initial context at which the client process is operating and repeatedly performs conversion of the resource into another context and a name defined thereat. While contexts are successively displaced under this repetition, a resource defined in association with the name requested by the client process is finally converted into a final context managed in practice and a resource identifier interpretable under that context.

The use of the name resolution mechanism can realize a resource management system capable of applying local names local every contexts to resources in a distributed system and handling the so-named resources under the control of the resources, names and contexts capable of interpreting the names. At this time, the resource management system includes a single name resolution function for the entire system, for resolving the name while the name is allowed to act on the context and converting it into the final context and resource identifier while recursively performing its resolution. A mechanism of the name resolution function can be realized by a context having a name translation function of looking up a table with a name analysis for analyzing a first name and extracting a second name and a second name as keys so as to extract a pair of a second context and a third name therefrom and moving the process to the second context.

Since the aforementioned resource management system has the inherent name analysis and name translation functions every contexts, a plurality of naming rules can be introduced into the system. Accordingly, the resource management system can prepare a plurality of contexts according to the uses and needs and provide local and flexible name spaces every contexts. Since, however, the name translation function of the resource management system is confined to the conversion of one name into a single name or a set of plurality of names, no reference is made to a method of varying action operating on a resource represented by the third name and the second context. Namely, since the common name resolution function is used in the entire system, the name resolution mechanism cannot change a resource operation at each context.

Further, this literature makes a reference to the fact that the name resolution mechanism provides expansion to resolve the first name so as to fall into a set composed of a plurality of identifiers. In the name resolution mechanism, the first name corresponds to a group of a plurality of names for another context. A description has been made of the case where the name resolution mechanism is activated so that the same operation is applied to the plurality of identifiers using broadcasting communications, for example. In the name resolution mechanism, however, the operation to the first name cannot be implemented by combining different operations relative to the plurality of identifiers resolved by the name resolution mechanism. Further, no reference is made to a contrivance for embodying such a mechanism.

A name management system disclosed in Japanese Patent Laid-Open No. Hei 5-216799 (1993) is of a name associating management system for automatically converting a name in a certain name space into a name in another name space while avoiding the names from overlapping. This type of name management system is basically based on the same mechanism as the name resolution mechanism described in the disclosure of Douglas E. Comer, Larry L. Peterson. Therefore, the present name management system has the same problems as described above.

A method of connecting large-scale distributed computer systems having hierarchical structures, which has been disclosed in Japanese Patent Laid-Open No. Hei 5-189389 (1993), refers to a system for managing object identifiers from identifiers of objects in local name spaces forming a hierarchical structure to identifiers of objects constituting the identifiers of the objects in other local name spaces. The present management system is also basically based on the same mechanism as the name resolution mechanism described in the disclosure of Douglas E. Comer, Larry L. Peterson. Therefore, the present management system involves the same problems as described above.

An apparatus and a method suitable for use in a combined naming system, which is capable of disintegrate or resolving a combined name composed of names employed in several types of dissimilar naming systems disclosed in Japanese Patent Laid-Open No. Hei 5-274274 (1993), refer to an apparatus for and a method of resolving names by a combination of a plurality of different-type naming systems.

The aforementioned apparatus and method are basically based on the same mechanism as the name resolution mechanism described in the disclosure of Douglas E. Comer, Larry L. Peterson. This merely describes both a method of dividing names by a combination of dissimilar naming systems and an interface. Therefore, the apparatus and method involve the same problems as described above.

A name resolving device disclosed in Japanese Patent Laid-Open No. Hei 5-342134 (1993) refers to a parameter setting means for defining or specifying reliability and a name resolving device activated so as to automatically create or erase a duplicate of a directory defined as the result of name resolution depending on the degree of reliability specified by parameters and to request the duplicated directory to resolve a name when the duplicate exists.

The apparatus and method described above are basically based on the same mechanism as the name resolution mechanism described in the disclosure of Douglas E. Comer, Larry L. Peterson. This merely describes the name resolving device activated so as to automatically create the duplicate of the directory using the parameters given by a user and to resolve the name within its own node without requesting other context to resolve the name when the duplicate exists. Therefore, the apparatus and method involve the same problems as described above.

Further, any one of the aforementioned resource management systems does not refer to a mechanism in which contexts are provided as resources indicative of groups that some or all of resolvable names are members. Owing to the absence of the mechanism, group resources having desired members cannot be locally realized when a user fixes a context in which the intended member is regarded as a resolvable name.

SUMMARY OF THE INVENTION

The present invention provides an apparatus for managing resources, which is capable of defining the resources activated so as to differ from each other every contexts realized by applying predetermined operations on global real resources and providing local names based on naming rules different from one another every contexts.

Further, the present invention provides an apparatus for managing a plurality of resources, which is capable of respectively applying different operations on the resources so as to provide the function of accumulating their results of operations to thereby handle virtual resources unrealized in advance on a computer system and having properties desired by a user as if to exist as local resources respectively having local names.

Furthermore, more complex virtual resources can be hierarchically formed by other context, using virtual resources produced under a certain context.

It is thus an object of the present invention to provide an apparatus for and a method of managing resources, which is capable of embodying a high-flexible distributed system which provides name spaces for performing local resource access every users, which reflect preference and intentions for an access method by each individual user.

According to one aspect of the present invention, for achieving the above object, there is provided an apparatus for managing resources, which is suitable for use in a network information system wherein a plurality of computer systems for carrying out information processing are connected to one another by a network, comprising:

at least one first context holding means having a context identifier; and at least one second context holding means having a context identifier;

the first context holding means including:

first name analyzing means receiving a resource name corresponding to a name given to a resource and analyzing the name of the resource name;

first name translating means converting the result of analysis by the first name analyzing means into a first series of resource elements with only resource identifiers inherently held by real resources realized in advance within each computer system as elements;

first name resolving means converting the result of conversion by the first name translating means into a first result of name resolution corresponding to a set of the first series of resource elements converted by the first name translating means and procedure information for processing the first series of resource elements; and first resource implementing means interpreting the procedure information included in the first name resolution result converted by the first name resolving means, effecting the result of interpretation on a real resource corresponding to the first series of resource elements to thereby produce a resource and outputting handle information for operating the resource;

the second context holding means including:

second name analyzing means receiving a resource name therein and analyzing the name of the resource name;

second name translating means converting the result of analysis by the second name analyzing means into a second series of resource elements with individual sets of context identifiers and resource names as elements;

second name resolving means outputting a resource name of the second series of resource elements converted by the second name translating means to the first context holding means associated with the corresponding context identifier and converting the result of conversion by the second name translating means into a second result of name resolution corresponding to a pair of handle information obtained from the first context holding means and procedure information for processing a resource corresponding to the handle information; and second resource implementing means interpreting the procedure information included in the second name resolution result converted by the second name resolving means and effecting the result of interpretation on the resource corresponding to the handle information to thereby produce a resource.

In the present invention, the name resolving means and the resource implementing means constructed so as to be included in the context may be realized as other processes.

By storing the contexts every parts forming each context in advance without realizing the context as a single process and inputting a retrieval expression, the contexts may be suitably constructed in combination.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein:

FIG. 8 is a view for describing one example of a corresponding table employed in a name translation unit of a second context holder in a second specific example of the first embodiment shown in FIG. 1;

FIG. 9 is a view for explaining one example of a corresponding table employed in each name translation unit in a third specific example of the first embodiment shown in FIG. 1;

FIGS. 16(A) to (D) are views for describing examples of corresponding tables held in each name translation unit in the first specific example shown in FIG. 12;

FIGS. 18(A) to (I) are views for describing examples of corresponding tables held in each name translation unit in the second specific example shown in FIG. 17;

FIGS. 22(A) to (D) are views for describing examples of corresponding table held in each name translation unit in the third specific example shown in FIG. 21;

FIGS. 24(A) to (D) are views for describing other examples of corresponding tables held in each name translation unit in the third specific example shown in FIG. 21;

FIGS. 26(A) to (D) are views for describing further examples of corresponding tables held in each name translation unit in the third specific example shown in FIG. 21;

FIG. 31 is a configurational view illustrating one example of a group manager in the first specific example shown in FIG. 29;

FIG. 32 is a view for describing a process of resolving a name "/by-G/G1/monthly report" in the first specific example shown in FIG. 29;

FIG. 33 is a view for describing one example of a process of resolving a name "/by-G/G1" in the first specific example shown in FIG. 29;

FIG. 34 is a view for explaining one example of a process of resolving a name "\by-document\monthly report\G1" in the first specific example shown in FIG. 29;

FIG. 35 is a view for describing another example of the process of resolving the name "/by-G/G1/monthly report" in the first specific example shown in FIG. 29;

FIG. 36 is a view for describing a further example of the process of resolving the name "/by-G/G1/monthly report" in the first specific example shown in FIG. 29;

FIG. 41 is a view for describing one example of a resource retrieval expression employed in the specific example shown in FIG. 40;

FIG. 44 is a view for describing one example of a name translation information set in the specific example shown in FIG. 43;

FIG. 45 is a view for describing another example of the name translation information set in the specific example shown in FIG. 43;

FIG. 46 is a view for describing a further example of the name translation information set in the specific example shown in FIG. 43;

FIG. 49 is a view for describing a specific example of name translation information that satisfies conditions for the resource retrieval expression in the specific example shown in FIG. 43; and FIG. 50 is a view for describing a specific example of a name translation unit produced in the specific example shown in FIG. 43.

DESCRIPTION OF THE PREFERRED EMBODIMENTS

Figure 1:
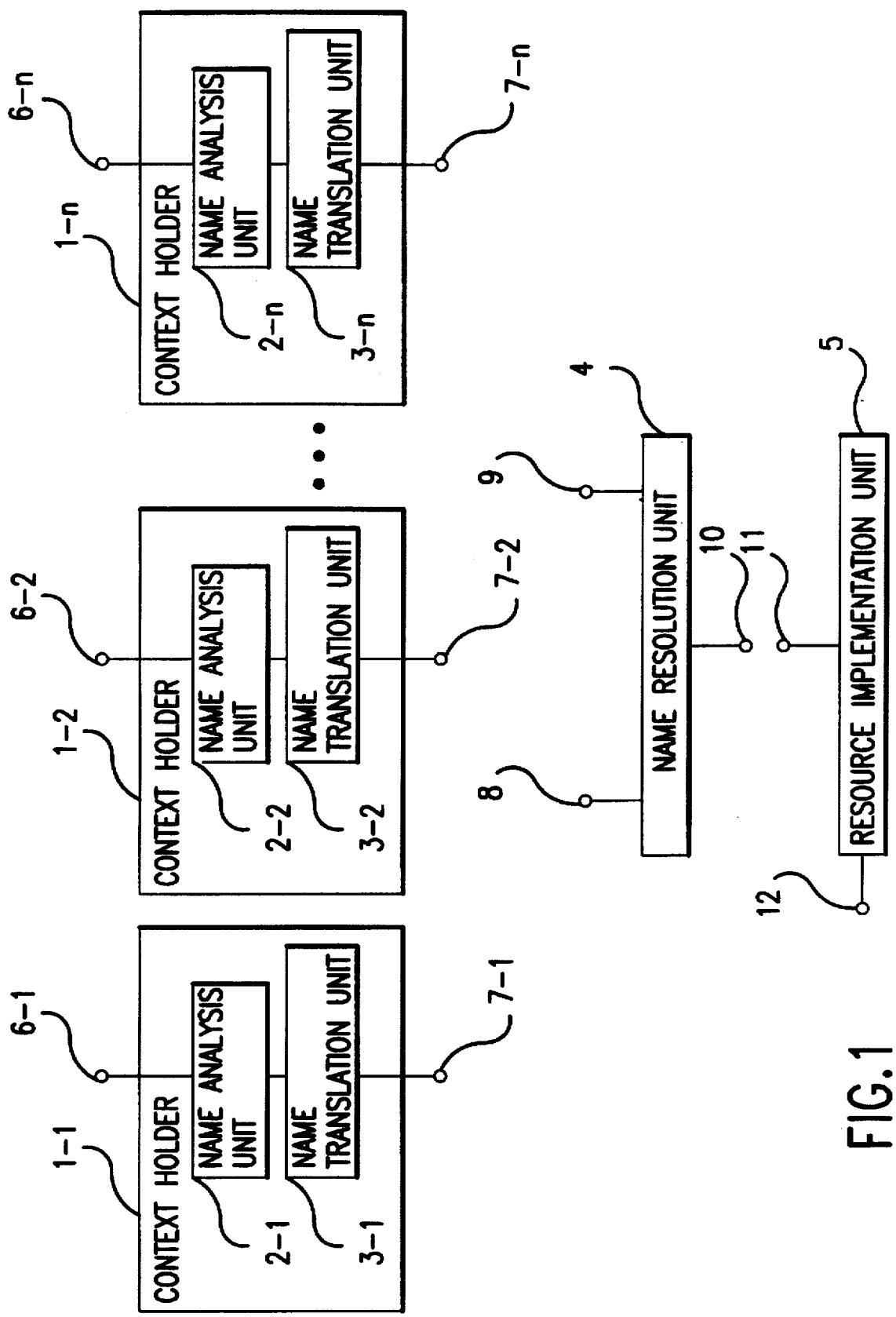
FIG. 1 is a block diagram showing a first embodiment of a resource management apparatus according to the present invention.

Each individual embodiment to be described below shows a resource management system or apparatus wherein a plurality of computer systems which perform information processing, are dispersedly disposed on a network and resources, having properties desired by individual users, of resources locally or extensively managed every computer systems and handled by the computer systems can be handled as resources local to the individual users. Each of the embodiments includes a description of the operation for localizing groups or files typified as resources by a file system, particularly, a directory every users. The resources are not necessarily limited to the files or groups in the file system. For example, the resources may be hyper-text documents expressed by a grammar well known as HTML (Hyper Text Markup Language) in which SGML (ISO8879: Standard Generalized Markup Language) has been extended.

In general, the resource management apparatus according to the present invention may be realized so that the computer systems handle resources that can obtain a handle in which names are respectively given to hosts, memories, files, groups, ports, processes, users, data bases, etc. and operations relative to the resources indicated by the names can be applied to the names. As the operation relative to the file resource, open, read, write or close indicative of a file operation can be applied. However, the operation is not necessarily limited to it. The operation may be a part of them. Alternatively, seeks may be done.

The operation relative to the group resource is by-member represented but is not necessarily limited to this. A member-addition or member-deletion may be performed. As an operation with respect to HTML, may be any of operations which have been provided based on the protocol well known as HTTP (Hyper Text Transfer Protocol).

In the case of the file resource, for example, the handle is defined as a file ID obtained by opening a file. However, a pointer relative to a file structure in which the attribute of the opened file is stored, may be used as the handle. As the handle, may be a pointer relative to a socket ID or a socket structure to which the operation to the file can be applied. If ports for applying the operations relative to the resources thereto are used, then any ones may be generally used.

Each of the embodiments to be described below includes a description of a resource management apparatus realized as a single process of a single computer system. It is however not essential to realize it as the single process. Generally, the resource management apparatuses according to the present invention may be realized as a plurality of processes operated by performing mutual communications over a single or a plurality of computer systems.

Further, the embodiments to be described below include a resource management apparatus realized in accordance with procedure orientations. It is however not essential to realize it in accordance with the procedure orientations. The resource management apparatus may be realized in accordance with object orientations. Generally, the resource management apparatus of the present invention may use any implementation methods including the procedure orientations and the object orientations.

Furthermore, the embodiments to be described below include a resource management apparatus realized as a message communication using a port. It is however not essential to materialize it as the message communication using the port. Generally, the resource management apparatuses according to the present invention may be realized using communications among all processes including a remote program, a remote procedure, a socket and a shared memory.

Still further, the embodiments to be described below include a resource management apparatus having a cache relative to an access to each resource. It does not necessarily require the cache.

FIG. 1 is a block diagram showing a first embodiment of a resource management apparatus according to the present invention. In the drawing, reference numerals 1-1 through 1-n indicate context holders respectively, reference numerals 2-1 through 2-n indicate name analysis units respectively, reference numerals 3-1 through 3-n indicate name translation units respectively, reference numeral 4 indicates a name resolution unit, reference numeral 5 indicates a resource implementation unit, and reference numerals 6-1 through 6-n, 7-1 through 7-n and 8 through 12 indicate terminals respectively. The first embodiment comprises n context holders ranging from the context holder 1-1 to the context holder 1-n, the single name resolution unit 4 and the single resource implementation unit 5. The number of the context holders may be one. The first embodiment may normally include a desired number of context holders. Similarly, the name resolution unit may be one and the first embodiment may normally include a desired number of name resolutions units. Similarly as well, the resource implementation unit may be one and the first embodiment may normally include a desired number of resource implementation units.

The context holders 1-1 through 1-n respectively have inherent context identifiers. Further, the context holders 1-1 through 1-n have the terminals 6-1 through 6-n and the terminals 7-1 through 7-n respectively. The terminals 6-1 through 6-n are respectively of input terminals used for the context holders 1-1 through 1-n. Resource names are inputted to the terminals 6-1 through 6-n respectively. Further, the terminals 7-1 through 7-n are respectively of output terminals used for the context holders 1-1 through 1-n. The terminals 7-1 through 7-n respectively output resource implementation representations corresponding to the resource names input to the terminals 6-1 through 6-n.

Further, the context holders 1-1 through 1-n are respectively provided with the name analysis units 2-1 through 2-n and the name translation units 3-1 through 3-n. The name analysis units 2-1 through 2-n respectively analyze the names of the resources, which are inputted from the terminals 6-1 through 6-n. In response to the results of analysis by the name analysis units 2-1 through 2-n, the name translation units 3-1 through 3-n respectively convert the results thereof into first or second resource implementation representations. Each first resource implementation representation is composed of a combination or set of a first list or series of resource elements in which resource identifiers are defined as elements and a first list or series of implementation elements indicative of procedure information for processing the first series of resource elements. Now, the resource identifier is called an identifier inherently held by an actual resource which has been realized in advance in each computer system. Further, each second resource implementation representation is composed of a combination or set of a second list or series of resource elements in which individual sets of context identifiers and resource names are defined as elements and a second list or series of implementation elements indicative of procedure information for processing the second series of resource elements. The converted first and second resource implementation representations are respectively outputted from the terminals 7-1 through 7-n to the name resolution unit 4.

The name resolution unit 4 has the terminals 8 through 10. The terminal 8 is of an output terminal used for the name resolution unit 4 and outputs a resource name to any one of the context holders 1-1 through 1-n. The terminal 9 is of an input terminal used for the name resolution unit 4 and is supplied with the first or second resource implementation representation corresponding to the resource name outputted to any of the context holders 1-1 through 1-n from the terminal 8. The terminal 10 is of an output terminal used for the name resolution unit 4. The terminal 10 outputs the result of name resolution corresponding to any one of the first resource implementation representations inputted to the terminal 9. Namely, the name resolution unit 4 receives the first or second resource implementation representations outputted from the terminals 7-1 through 7-n of the context holders 1-1 through 1-n from the terminal 9. When the second resource implementation representations are received therein at this time, the name resolution unit 4 outputs a resource name of the second series of resource elements included in the second resource implementation representations to its corresponding context holder designated by a context identifier corresponding to the resource name from the terminal 8 thereof. The context holder, which has output the resource name, sends back the first or second resource implementation representations to the terminal 9. Thus, the first resource implementation representations can be obtained by suitably using the context holder on a linkage basis. The name resolution unit 4 outputs the result of name resolution corresponding to all or any of the resultant first resource implementation representations from the terminal 10.

The resource implementation unit 5 has the terminals 11 and 12. The terminal 11 is of an input terminal to which the result of name resolution outputted from the name resolution unit 4 is inputted. The terminal 12 is of an output terminal from which a handle of a resource associated with the result of name resolution outputted from the name resolution unit 4 is outputted. By using the handle outputted from the terminal 12 of the resource implementation unit 5, a user can effect access to and processing on a virtual resource corresponding to an input local resource name.

Figures 2, 3:
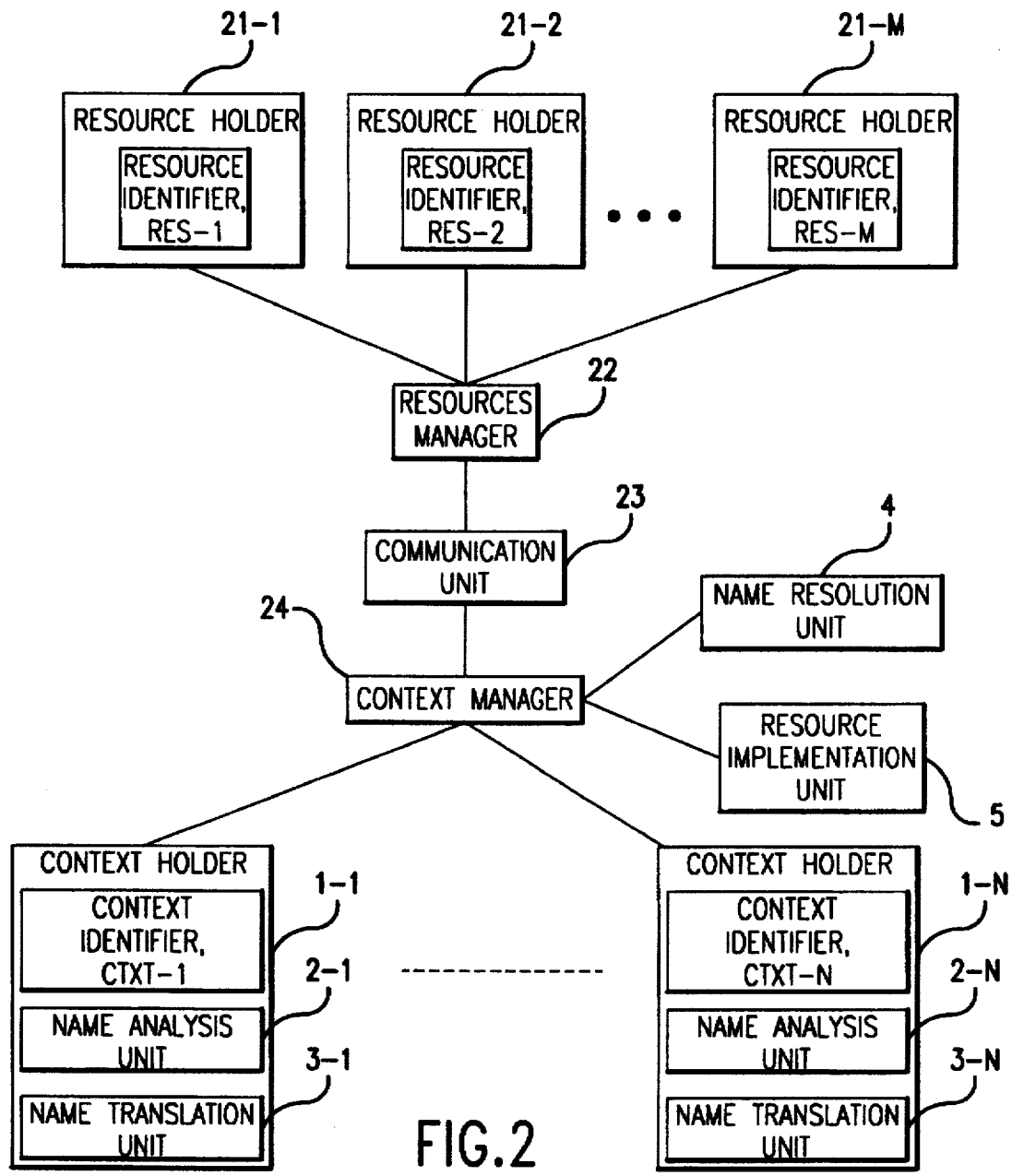
FIG. 2 is a configurational view showing a first specific example of the first embodiment shown in FIG. 1.
FIG. 3 is a view for describing one example of a corresponding table showing the relationship between a series of resource elements and resource implementation representations employed in each name translation unit of the first specific example of the first embodiment shown in FIG. 1.

FIG. 2 is a configurational view showing a first specific example of the first embodiment of the resource management apparatus according to the present invention. In the drawing, the same elements of structure as those shown in FIG. 1 are identified by like reference numerals and their description will therefore be omitted. Reference numerals 21-21 through 21-n indicate resource holders respectively, reference numeral 22 indicates a resource manager, reference numeral 23 indicates a communication unit, and reference numeral 24 indicates a context manager. The resource management apparatus described in accordance with this specific example comprises M resource holders 21-1 through 21-M, a resource manager 22, a communication unit 23, a context manager 24, N context holders 1-1 through 1-N, a name resolution unit 4 and a resource implementation unit 5.

The resource holders 21-1 through 21-n hold actual resources therein respectively and are respectively provided with resource identifiers res-1 through res-M. The resource manager 22 controls or manages the resources held in the resource holders 21-1 through 21-M extensively or locally to a specific computer system. The communication unit 23 performs communications between the resource manager 22 and the context manager 24 and performs communications with other computer systems.

The context manager 24 controls the context holders 1-1 through 1-N. Further, the context manager 24 solves a name and acquires a handle using the name resolution unit 4 and the resource implementation unit 5. In the present specific example, context identifiers ctxt-1 through ctxt-N of the context holders 1-1 through 1-N and numbers of ports indicative of handles effecting communications on the context holders 1-1 through 1-N are constructed so as to be managed in sets by tables Upon retrieval, all the tables are scanned to search or find out an entry of a table coincident with a context identifier of a context holder to be retrieved, thus realizing the retrieval such that a handle for communicating with a context holder having the context identifier of the retrieved context holder is send back or returned. As the retrieval, a retrieval method known as the hash retrieval using a hash table without using a simple table may be used. In the present embodiment, the context manager 24 may acquire the handle for communicating with the context holder from the context identifiers. Therefore, if, for example, character strings or numbers defined as context identifiers and numbers defined as handle identifiers are managed so as to correspond to one another and a data base that provides a retrieval function based on a context identifier is used, the retrieval may be realized even in the form of any modes.

The context holders 1-1 through 1-N also have the context identifiers ctxt-1 through ctxt-N respectively and are respectively composed of name analysis units 2-1 through 2-N and name translation units 3-1 through 3-N.

Each of the name analysis units 2-1 through 2-N performs a lexical analysis and a syntax analysis of each name, for example and can be constructed so as to output an analysis tree as the result of name analysis. Algorithms of the lexical analysis and the syntax analysis have been described in the "Compilers", Addison-Wesley Publishing Co., Ltd. by A. V. Aho, R. Sethi, J. D. Ullman, Chapters 1 to 4, 1986, for example. Alternatively, all the input names may be constructed so as to be outputted to their corresponding name translation units as the results of name analyses as they are. In the following description of specific operations, the name analysis units will be described as having the construction of the latter.

Each of the name translation units 3-1 through 3-N outputs resource implementation representations that are a pair of a series of resource elements and a series of implementation elements, to each input name. The name translation units 3-1 through 3-N can be constructed as follows: For example, sets of names, a series of resource elements and a series of implementation elements are managed as a table. A series of resource elements and a series of implementation elements are acquired by referring to the table from the input name. Thereafter, resource implementation representations are produced and outputted in the form of sets.

Elements in the series of implementation elements for the resource implementation representations show procedures which allow handles for predetermined kinds of resources to be produced, directions for predetermined operations to be received from the resource handles and data to be input or output based on the resource handles. Further, the elements may be names or identifiers for procedures realized by using any of a process of providing each of resource identifiers given in resource implementation representations for a procedure input and effecting predetermined operations on a resource defined based on the provided resource identifier; a process of inputting or outputting data to the resource given based on the resource identifier; a process of referring to the contents of a predetermined memory; a process of changing the contents of the predetermined memory; and a process of processing desired data or by using the plurality of processes in combination.

FIG. 3 is a view for describing one example of a corresponding table showing the relationship between a series of resource elements and resource implementation representations employed in each of name translation units in the first specific example of the first embodiment according to the present invention. FIG. 3 shows a corresponding table in which four names composed of a name1, a name2, a name3 and a name4 are represented as table entries. In the table, the name1 is realized by a resource of a resource identifier res-1, a resource of a resource identifier res-2 and a procedure concat. Similarly, the name2 is materialized by the resource of the resource identifier res-1, a resource of a resource identifier res-3 and the procedure concat. The name3 is realized by the resource of the resource identifier res-1, a procedure archive and a procedure unarchive. Further, the name4 is realized by the resource of the resource identifier res-2, a procedure crypt and a procedure decrypt.

In the following description, the name translation unit 3-1 outputs resource implementation representations <{concat}, {res-1, res-2}> that show a pair of a series of resource elements {res-1, res-2} and a series of implementation elements {concat} to the input name name1. When the input name is other than the name1, the name translation unit 3-1 sends back an empty resource implementation representation { }. Now, the "concat" shows a name for a coupling procedure.

The aforementioned resource implementation representations <{concat}, {res-1, res-2}> means resources obtained by supplying the resources given to the name name1 by the resource identifiers res-1 and res-2, as first and second arguments for the procedure concat.

For example, the resources represented by the resource identifiers res-1 and res-2 are of normal files. The handle shows a socket for a UNIX operating system. The procedure concat can be realized as a process of swapping data obtained by reading and writing two files with the socket. In the present example, the procedure concat is realized so that the socket is produced as a handle corresponding to the resources having the name name1. As a result of name resolution with open instructions to the resources of the name name1 as a momentum, the handle is produced based on the procedure concat.

When, for example, a read operation is further applied to the handle produced by the procedure concat, the procedure concat serves so as to read the contents obtained by coupling the contents of a file supplied to the first argument and the contents of a second file applied thereto to one another. Further, when, for example, a write operation is applied to the handle, the procedure concat is operated so that data having a predetermined number of bytes alone is written into the resource having the resource identifier res-1 from the head and the remainder is written into the resource having the resource identifier res-2. In the present example, the contents of the two files given as the arguments are simply coupled to each other with the contents as the former portion and the latter portion. However, a plurality of files may be coupled to one another in any form.

Figure 4:
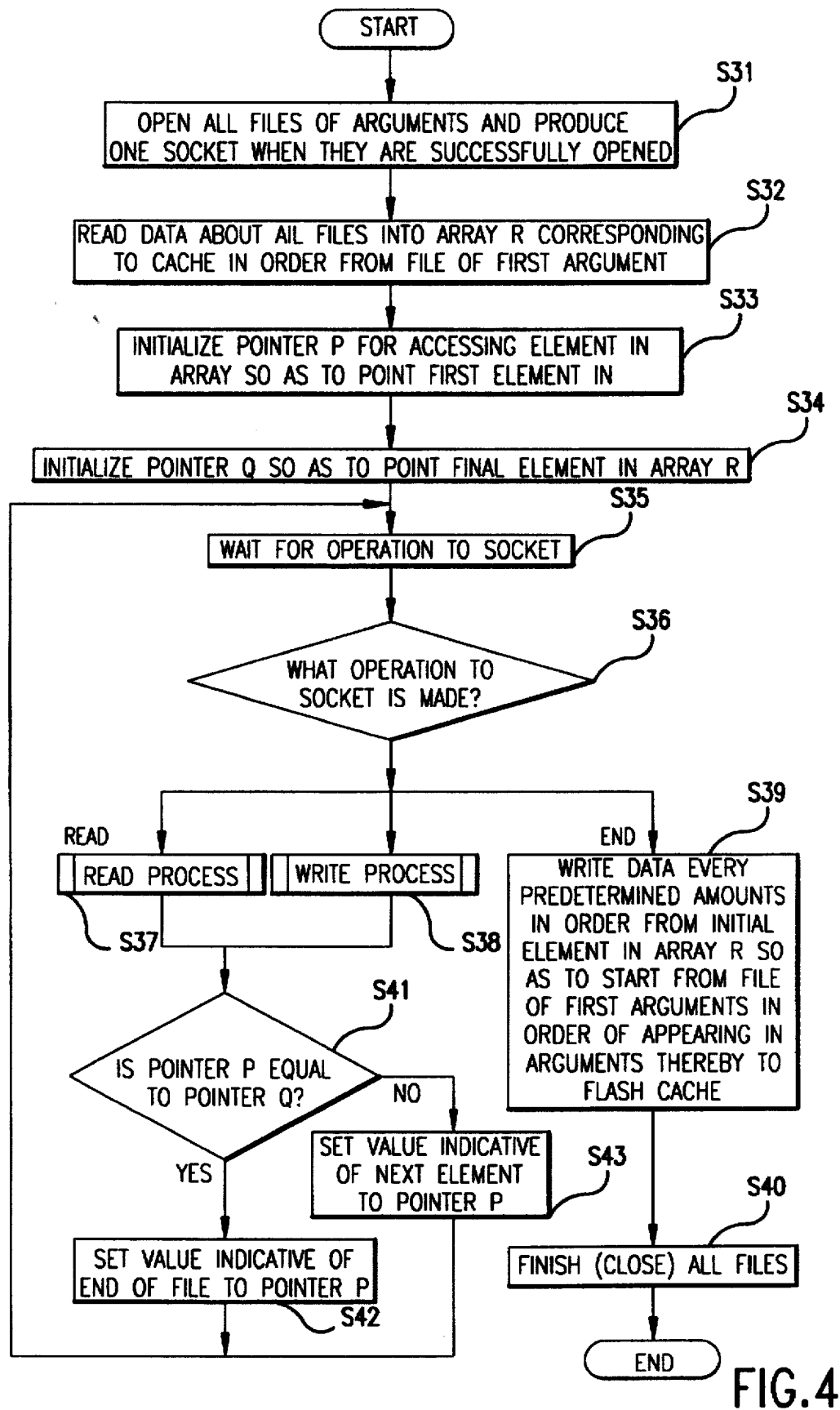
FIG. 4 is a flowchart for describing one example of a procedure concat operation.
Figure 6:
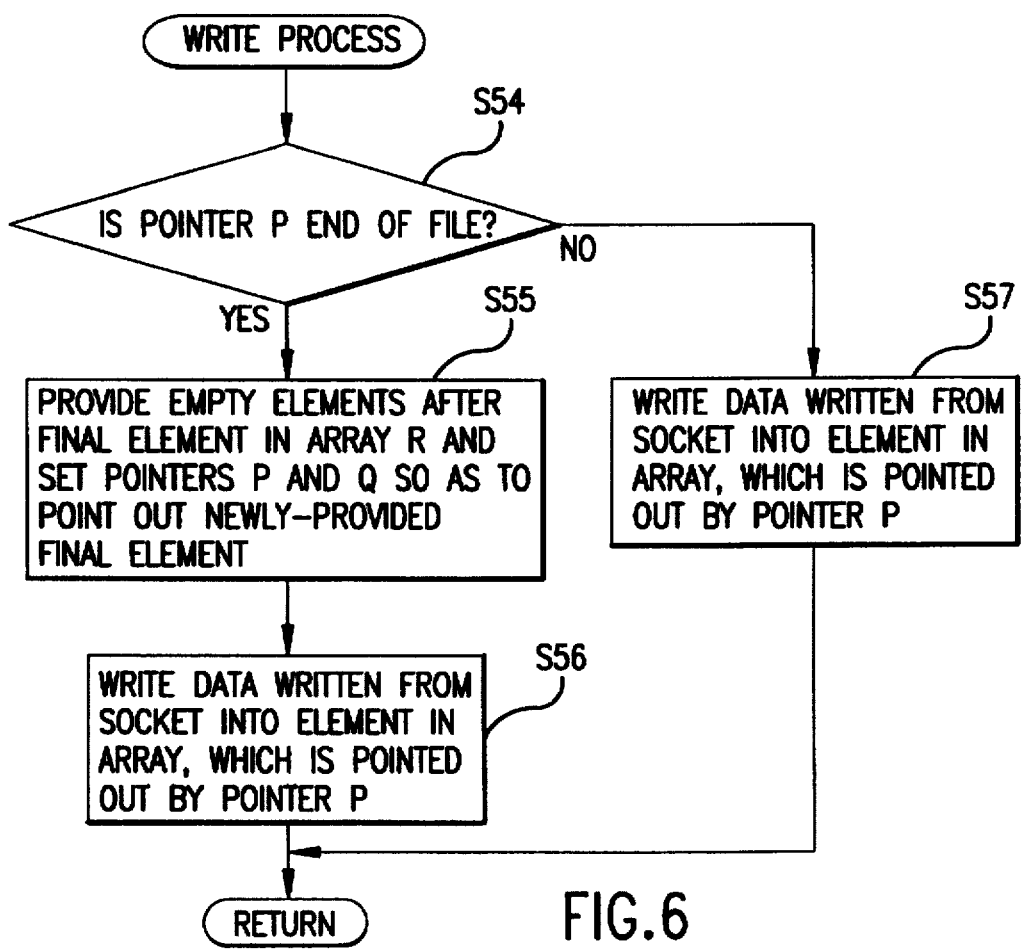
FIG. 6 is a flowchart for explaining one example of a write operation in the example of the procedure concat operation shown in FIG. 4.

FIGS. 4 and 6 are flowcharts for describing one example of a procedure concat operation. At S31, all the files given as arguments are first opened. When they are successfully opened, one socket is produced. At S32, data about all the files are read into an array R indicative of a cache in order from the file of the first argument. At S33, a pointer P for accessing each of elements in the array R is initialized so as to point out a first element in the array R. At S34, a pointer Q is initialized so as to point out the final element in the array R.

Figure 5:
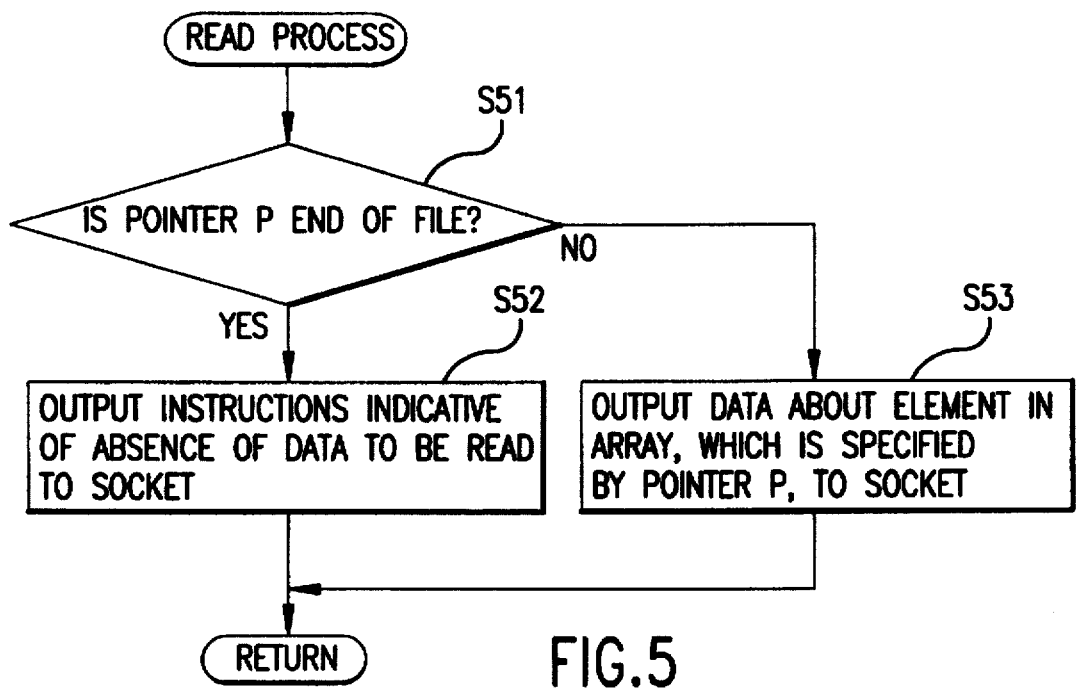
FIG. 5 is a flowchart for explaining one example of a read operation in the example of the procedure concat operation shown in FIG. 4.

At S35, an operation effected on the socket is placed in a waiting state. When the operation is executed, it is determined at S36 which operation would be done. Thereafter, the corresponding processes are successively executed from the result of determination. If the operation to the socket is found to be "read" at S36, then a read process is executed at S37. The read process is shown in FIG. 5. It is judged at S51 of FIG. 5 whether the pointer P shows the end of a file. If the pointer P is found to be the termination of the file, then instructions indicative of absence of data to be read are outputted to the socket at S52. If the pointer P is found not to be the end of the file at S51, then data about an element in the array R, which is specified by the pointer P, is outputted to the socket at S53. Thereafter, the routine procedure proceeds to S41 in FIG. 4.

If the operation to the socket is found to be "write" at S36, then a write process is executed at S38. The write process is shown in FIG. 6. It is further judged at S54 of FIG. 6 whether the pointer P indicates the end of a file. If the answer is found to be Yes at S54, then an empty element is provided subsequent to the final element in the array R and the pointers P and Q are set so as to point out the newly-provided final element at S55. At S56, data written from the socket is written into an element in the array R, which is pointed out by the pointer P. If the answer is found to be No at S54, then the data written from the socket is written into the element in the array, which is pointed out by the pointer P at S57. Thereafter, the routine procedure proceeds to S41 in FIG. 4.

If the operation to the socket is found to be "end (close)" at S36, then data are written every predetermined amounts in order from the initial element in the array R so as to start from the file of the first argument in order of appearing in arguments at S39, thereby flashing the cache. Thereafter, all the files are closed at S40, followed by proceeding to the end of the routine procedure.

It is judged at S41 whether the pointer P is equal to the pointer Q. If they are found to be equal to each other at S41, then a value indicative of the end of the file is set to the pointer P at S42. If the answer is found to be No at S41, then the pointer P is set so as to point out the next element at S43. Thereafter, the routine procedure is returned to S35 from which the processing is repeated.

The present embodiment describes the case where the handle produced by the procedure concat is allowed to carry out both the read and write operations. However, the handle may be caused to carry out either one of them. A file operation other than the read and write operations may be carried out by the handle. For example, a seek process as well as the open process and the close process may be carried out.

If resource implementation representations are input to the name resolution unit 4 and a pair of an identifier for a context holding means and a name is included in the input resource implementation representations, then the name resolution unit 4 outputs a name constituting the set to a context holder determined by the identifier of the context holding means, which constitutes the set, thereby obtaining a second resource implementation representation associated with the name constituting the set. Next, the set is replaced by the so-obtained second resource implementation representation. Thus, the above operation is repeated until the identifier for the context holding means is not included in the input resource implementation representations. Alternatively, respective sets of identifiers in context holders and names, which are recursively included in resource implementation representations, are successively replaced by their corresponding resource implementation representations as in the case where a second set is replaced by a third resource implementation representation, a third set is replaced by a fourth resource implementation representation, . . . , an n–1th set is replaced by a nth resource implementation representation to thereby finally obtain the result of name resolution excluding the sets of the identifiers for the context holding means and the names.

Figure 7:
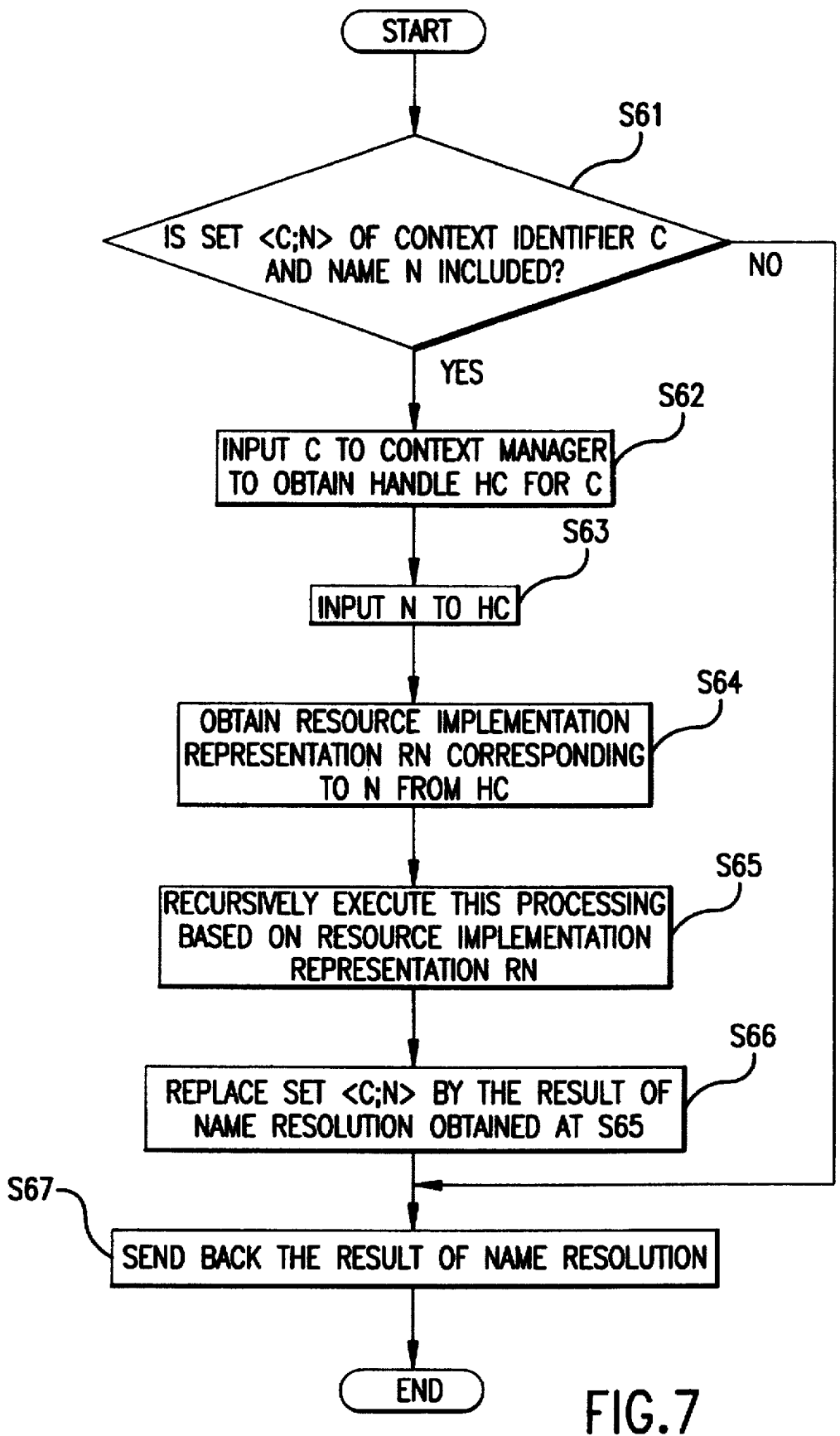
FIG. 7 is a flowchart for describing one example of the operation of a name resolution unit 4 employed in the first specific example of the first embodiment shown in FIG. 1.

FIG. 7 is a flowchart for describing one example of the operation of the name resolution unit 4 in the first specific example of the first embodiment according to the present invention. It is first judged at S61 whether a pair <C; N> of a context identifier C and a name N is included in resource implementation representations given as arguments. If the answer is found to be Yes at S61, then processes of next S62 through S66 are executed. At S62, the context identifier C is inputted to the context manager 24 to obtain a handle HC for the context identifier C. Further, the name N is inputted to the so-obtained handle HC at S63 and a resource implementation representation RN corresponding to the name N is obtained from the handle HC at S64. The processing of the name resolution unit 4 is recursively executed based on the resultant resource implementation representation RN at S65. At S66, the pair <C; N> is replaced by the result of name resolution I obtained at S65.

At S67, the resource implementation representation obtained from the result of replacement at S66 is sent back or returned as the result of name resolution. If it is judged at S61 that the pair <C; N> has not been included, i.e., the above replacement has not been made, then the resource implementation representations given as the arguments are returned as the result of name resolution as they are.

One example of the operation of the first specific example of the first embodiment will be described below. Here, the operation for designating or specifying the context identifier ctxt-1 and making a resolution request for the name name1 to the communication unit 23 will be described. When the resolution request for the name name1 under the designation of the context identifier ctxt-1 is received, the communication unit 23 requests the context manager 24 to search or retrieve the context holder with the context identifier as ctxt-1 from the context holders 1-1 through 1-N held and managed by the context manager 24.

The context manager 24 retrieves the context holder with ctxt-1 held as the context identifier. As described above, the context manager 24 represents the context identifiers of the context holders and the numbers of the ports indicative of the handles effecting communications on the context holders in the form of the sets and manages them by the table. By referring to the table, the number of the port indicative of the handle that communicates with the context holder 1-1 held associated with the context identifier ctxt-1 is obtained. In the following description, the resultant number of port is often called "handle".

Thus, the communication unit 23 inputs the name name1 to the context manager 24 to obtain a handle corresponding to the context holder 1-1. Next, the communication unit 23 requests the context holder 1-1 based on the handle to perform a name resolution process. The context holder 1-1 inputs the name name1 to the name analysis unit 2-1 and requests the name analysis unit 2-1 to analyze the same. The name name1 inputted to the name analysis unit 2-1 is outputted to the name translation unit 3-1 as it is.

The name translation unit 3-1 outputs the resource implementation representations <{concat}, {res-1, res-2}> indicative of the pair of the series of resource elements {res-1, res-2} and the series of implementation elements {concat} to the input name name1 and sends it back to the context manager 24.

The context manager 24 inputs the resource implementation representations <{concat}, {res-1, res-2}> returned from the name translation unit 3-1 to the name resolution unit 4. Since no context identifier is included in the resource implementation representations <{concat}, {res-1, res-2}> in the present example, the name resolution unit 4 returns the input resource implementation representations to the context manager 24 as the result of name resolution as they are.

The resource implementation unit 5 receives therein the result of name resolution <{concat}, {res-1, res-2}>, starts up the procedure concat as a process, assigns a handle identifier h1 to the handle produced by the procedure concat and outputs the handle identifier h1 to the context manager 24. The context manager 24 associates the name name1 and the handle identifier h1 with each other through the communication unit 23 and returns the handle identifier h1 to a client that issued the request for the resolution of the name name1. The client performs operations such as a data read operation, a data write Operation, etc. using the handle identifier h1.

As described above, the user gives a local name called name name1 to a local resource having properties equivalent to those of a hypothetical file obtained by coupling the file res-1 and the file res-2 to one another and can handle the name name1 as if the name name1 would be an actually-existing single file.

Since the resource management apparatus according to the first embodiment is constructed such that each of the name translation units outputs the resource implementation representations including the series of implementation elements as described above, the user can set the name name1 to the context holder 1 as the local resource, e.g., "the name1 is a resource obtained by coupling the res-1 and the res-2 to one another in accordance with the procedure concat". Thus, since the resource having the properties desired by the user can be locally realized, the resource management apparatus according to the first embodiment is able to solve the aforementioned problems.

A second specific example of the first embodiment according to the present invention will now be described. The second specific example is identical in structure to the first specific example except for the provision of second context holders as well as inclusive of the first specific example. The second context holders are identical in structure to the context holders 1-1 through 1-N in the configuration shown in FIG. 2. The second context holders are managed by the context manager 24. Namely, some of the context holders 1-1 through 1-N shown in FIG. 2 may be constructed as the second context holders. In the present example, the context holder 1-2 will be described as being regarded as the second context holder. A description will be specifically made of an example of a context holder in which the name name2 is used as a character string of "name1.Z" and which is activated such that when a read access is made under the name "name1.Z", a result obtained by expanding a resource of the name name1 in accordance with a predetermined compression/expansion method is read, whereas when a write access is made under the name "name1.Z", a result compressed by the predetermined compression/ expansion method is written into the resource of the name name1.

The name analysis unit 2-2 of the context holder 1-2 indicative of the second context holder analyzes the input second name name2 in accordance with a lexical analysis or a syntax analysis and divides it into a name "Z" and a name "name1" in the form of symbols. Thereafter, the name analysis unit 2-2 outputs the name "Z" and the name "name1" to the name translation unit 3-2.

FIG. 8 is a view for describing one example of a corresponding table employed in a name translation unit of a second context holder in the second specific example of the first embodiment according to the present invention. The name translation unit 2-2 has the corresponding table shown in FIG. 8. A name "Z", a resource implementation element {compress} composed of a procedure compress, and a context identifier ctxt-1 are set in the corresponding table shown in FIG. 8 so as to correspond to one another.

The name translation unit 3-2 obtains the resource implementation element {compress} and the context identifier cntx-1 by referring to the corresponding table shown in FIG. 8 under the name "Z" inputted from the name analysis unit 2-2 and outputs resource implementation representations <{compress}, {<ctxt-1, name1>}>. Based on the resource implementation representations, the name "name1.Z" is able to show a local resource realized by both a resource represented by the local name name1 of the context identifier cntx-1 and the procedure compress.

The resource implementation representations <{compress}, {<ctxt-1, name1>}> are delivered to a name resolution unit 4. The name resolution unit 4 is activated in a manner similar to the first specific example. Namely, the name resolution unit 4 is operated in accordance with the flowchart shown in FIG. 7. In this case, each individual set of a context identifier and a name is included in the resource implementation representations. Therefore, the processes of S62 to S66 shown in FIG. 7 are executed. According to the processes, the context holder 1-1 having the context identifier ctxt-1 is called up to perform the resolution of the name name1. If, for example, the context holder 1-1 sends back the resource implementation representations <{concat}, {res-1, res-2}> as in the aforementioned first specific example, then {<ctxt-1, name1>} in the resource implementation representations is replaced by the above resource implementation representations and <{compress}, {<{concat}, {res-1, res-2}>}> are outputted as the result of name resolution by the name resolution unit 4. Further, a resource implementation unit 5 receives the result of name resolution therein so as to start up the procedure compress. The resource implementation unit 5 is identical in operation to that employed in the first specific example except for the startup of the procedure compress used as an alternative to the procedure concat.

Thus, the user gives a local name called name name2 to a local resource having such properties that upon reading, data obtained by expanding data about the resource represented by the name name1 in a predetermined mode is read, whereas upon writing, written data is compressed in the predetermined mode and the compressed data is written into the data about the resource represented by the name name1. Further, the user is able to handle the name name2 as if it would be an actually-existing single file.

Thus, since the resource management apparatus according to the first embodiment is able to have a plurality of context holders, a context holder capable of resolving the name name2 corresponding to a character string including the name name1 is constructed so as to solve a portion that do not include the name name1, whereas a context holder capable of resolving the name name1 is constructed so as to solve the remaining portions, thereby making it possible to hierarchically solve names. Consequently, the name name2 can be set to the context holder 2 as /name name2 is a resource obtained by compressing the name name1 of the context identifier cntx-1 in accordance with the procedure compress/, for example. Thus, since the resources having the properties desired by the user can be hierarchically designed and locally realized, the aforementioned problems of the resource management apparatus can be resolved. Since the design of name resolution can be hierarchically carried out under the above construction, each name space can be easily designed and new context holders can be constructed so as to use the already-existing context holders, thereby making it possible to easily re-use the name space.

A third specific example of the first embodiment according to the present invention will now be described. The third specific example is substantially identical in structure and operation to the first specific example. As the present specific example, an example will be described in which procedures for performing interpolation and extrapolation processes are carried out in combination to solve each of names. Here, the name will be represented in the form of "data name—resolution". The resolution is regarded as a character string indicative of positive real numbers.

In the following description, the data name is regarded as a name3 and represents image data. The resolution of the image data is regarded as 17.5.1. Namely, an input resource name is shown as "name3175.1". A resource res-1 is of image data whose resolution is regarded as a value scan-inputted on a 400 pixels-per-inch (=25.4 mm which will be the same below) basis. Further, a resource res-2 is also of image data whose resolution is regarded as a value scan-inputted on a 100 pixels-per-inch basis.

In the third specific example, the context holder 1-3 will be called up. The name analysis unit 2-3 in the context holder 1-3 analyzes an input name in accordance with a lexical analysis and a syntax analysis in a manner similar to the aforementioned second specific example. Here, implementation elements are separated into a character string on the left side as seen from a symbol "_" used in place of the separator " " and a character string on the right side as seen from the same symbol.

FIG. 9 is a view for describing one example of a corresponding table employed in each of name translation units in the third specific example of the first embodiment according to the present invention. A name translation unit 3-3 has the corresponding table shown in FIG. 9. A series or string of resource implementation elements interpolate_300_100 and a series or string of resource elements res3 and res2 are registered in the corresponding table shown in FIG. 9 so as to correspond to a name name1. A series of resource implementation elements interpolate_800_100 and a series of resource elements res4 and res2 are registered in the corresponding table so as to correspond to a name name2. Further, a series of resource implementation elements interpolate_400_100 and a series of resource elements res1 and res2 are registered in the corresponding table so as to correspond to a name name3.

The name translation unit 3-3 receives therein a pair of the name name3 and a character string "175.1" indicative of a real number and acquires a procedure interpolate_400_100, a resource identifier res-1 and a resource identifier res-2 from the name name3 by referring to the corresponding table shown in FIG. 9. As a result, the name translation unit 3-3 outputs resource implementation representations <{interpolate_400_100 (175.1)}, res-1, res-2> therefrom. Now, the interpolate_400_100 (175.1) is defined as a procedure for forming or constituting images of 400 pixels per inch and 100 pixels per inch by an interpolation process and an image having a resolution of 175.1 pixels per inch by an interpolation process. Since the character string "175.1" indicative of the resolution is of a character string determined from an input name, it is constructed so as to be inputted to the procedure interpolate_400_100 as an argument for the procedure interpolate_400_100. Further, a character string indicative of a resolution of "400" or "100" or the like in the procedure name may be constructed so as to be inputted to the procedure interpolate as an argument for the procedure interpolate.

A name resolution unit 4 is activated in a manner similar to the first specific example. Further, a resource implementation unit 5 is activated in a manner similar to the resource implementation unit 5 of the first specific example upon starting up the procedure interpolate_400_100 except that 175.1 is inputted as the argument.

Since some of the names is given to the procedure as the argument in the third specific example as described above, a context holder can solve an infinite number of names different from one another. Accordingly, groups having an infinite number of members and groups capable of approximately handling names having continuity corresponding to real numbers as members so long as the accuracy of expression of data by a computer is allowed, can be constructed. Now, the handling of the names having the continuity as the members means that, for example, a name A-100. x constructed by a resolution x that satisfies 100.1<x<100. 2 between A-100. 1 and A-100. 2 is included as a member and can be resolved.

Thus, since the names and the procedures are respectively managed in combination, the conventional problem that the groups having the infinite number of members cannot be realized, can be resolved. By selecting a name having properties necessary for each individual user from the names having the continuity and enabling the resolution of the selected name, a high-flexible distributed system providing name spaces for resource access, which include local group resources reflecting preference and intentions for an access method by the individual users every users, is embodied.

Figure 10:
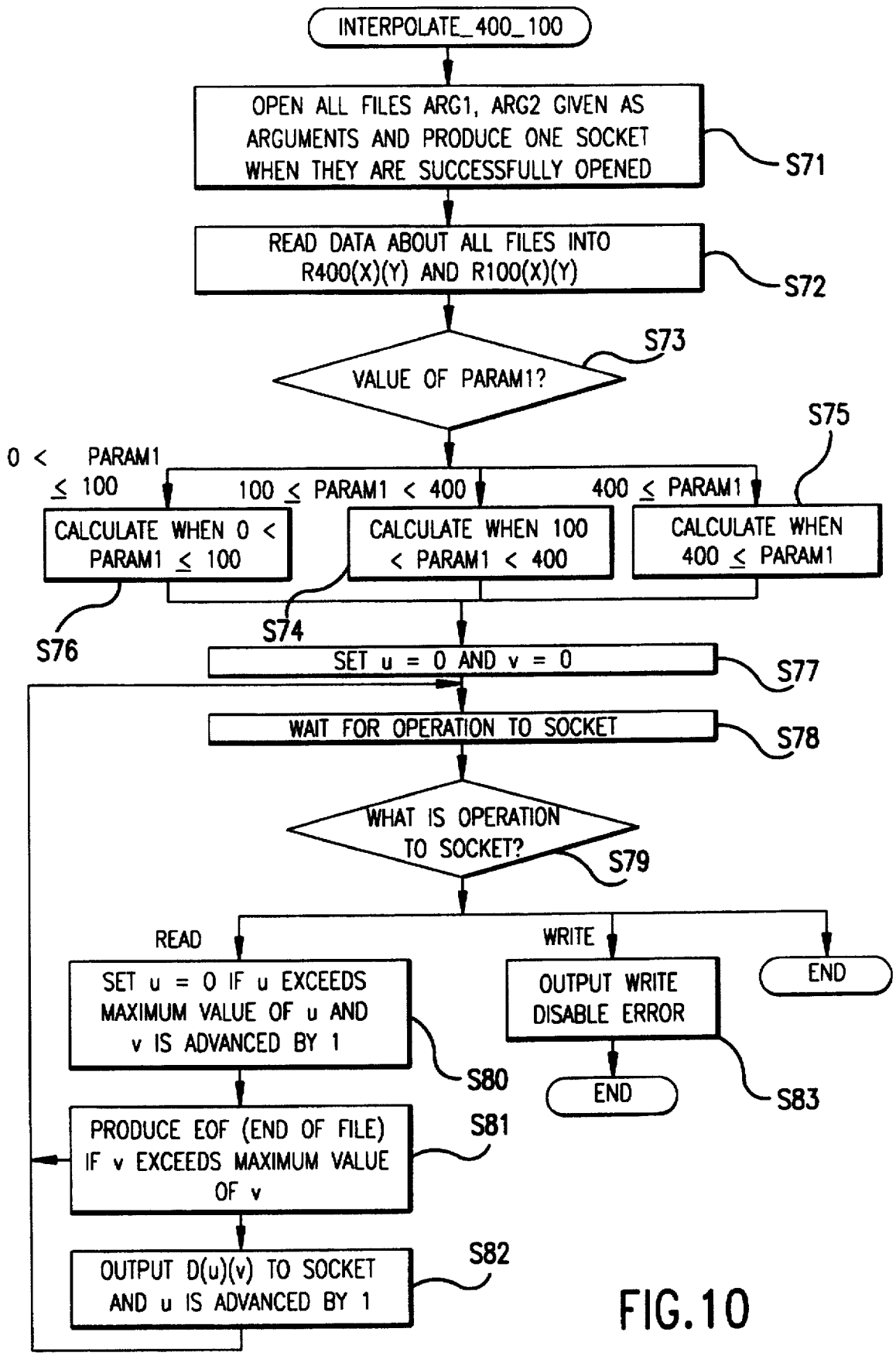
FIG. 10 is a flowchart for describing one example of a operation of a procedure interpolate_400_100.

One example of a process for the procedure interpolate_400_100 will be described as the last of the third specific example. FIG. 10 is a flowchart for describing one example of the process of the procedure interpolate_400_100. Now, the procedure interpolate_400_100 will take a format of "interpolate_400_100 (Param1)(ARG1, ARG2)".

At S71, files given as arguments ARG1 and ARG2 are all opened. When they are successfully opened, one socket is produced. At S72, data about all the files are read into two-dimensional arrays R400[x][y] and R100[X][Y] indicative of caches in order from a file given as a first argument.

At S73 through S76, arrays D[u][v] are produced. Firstly, u=0 and v=0 at S73. Calculations of D[u][v] at S74 through S76 are selected every Param1 steps according to the value of Param1 from combinations of all the u at which int(u*100/Param1)+1 does not exceed the maximum value of X and all the u at which int(v*100/Param1)+1 does not exceed the maximum value of Y. Here, the term int(x) will be regarded as a whole number of x, and the term frac(x) will be regarded as a decimal fraction of x.

When 100<Param1 <400, D[u][v] is calculated at S74 as follows:

$$D[u][v] = (1 - (Param1 - 100)/(400 - 100)) \{(1- frac(u*100/Param1))*(1 - frac(v*100/Param1))*R100[int(u*100/Param1)][int(v*100/Param1)] + 1] + frac(u*100/Param1)*(1 - frac(v*100/Param1))*R100[int(u*100/Param1) + 1][int(v*100/Param1)] + (1- frac(u*100/Param1)*frac(v*100/Param1)*R100[int(u*100/Param1)][int(v*100/Param1) + 1] + frac(u*100/Param1)*frac(v*100/Param1)*R100[int(u*100/Param1) + 1][int(v*100/Param1) + 1] + (Param1 - 100)/(400 - 100)*\{(1 - frac(u*400/Param1))*(1 - frac(v*400/Param1))*R400[int(u*400/Param1)][int(v*400/Param1) + 1] + frac(u*400/Param1)*(1 - frac(v*400/Param1))*R400[int(u*400/Param1) + 1][int(v*400/Param1)] + (1 - frac(u*400/Param1))*frac(v*400/Param1)*R400[int(u*400/Param1)][int(v*400/Param1) + 1] + frac(u*400/Param1)*frac(v*400/Param1)*R400[int(u*400/Param1) + 1][int(v*400/Param1) + 1]\}$$

When Param1 >=400, D[u][v] is calculated at S75 as follows:

$$D[u][v] = (1 - \text{frac}(u*400/\text{Paraml}))*(1 - \\ \text{frac}(v*400/\text{Paraml}))*R400[\text{int}(u*400/\text{Paraml})][\text{int} \\ (v*400/\text{Paraml}) + 1] + \text{frac}(u*400/\text{Paraml})*(1 - \\ \text{frac}(v*400/\text{Paraml}))*R400[\text{int}(u*400/\text{Paraml}) + \\ 1][\text{int}(v*400/\text{Paraml})] + (1 - \\ \text{frac}(u*400/\text{Paraml}))*\text{frac}(v*400/\text{Paraml})*R400[\text{int}(u*400/\text{Pa} \\ \text{raml})][\text{int}(v*400/\text{Paraml}) + 1] + \\ \text{frac}(u*400/\text{Paraml})*\text{frac}(v*400/\text{Paraml})*R400[\text{int}(u*400/\text{Par} \\ \text{aml}) + 1][\text{int}(v*400/\text{Paraml}) + 1]$$

When 0<Paraml <=100, D[u][v] is calculated at S76 as follows:

$$D[u][v] = (1 - \text{frac}(u*100/\text{Paraml}))*(1 - \\ \text{frac}(v*100/\text{Paraml}))*R100[\text{int}(u*100/\text{Paraml})][\text{int}(v* \\ 100/\text{Paraml}) + 1] + \text{frac}(u*100/\text{Paraml})*(1 - \\ \text{frac}(v*100/\text{Paraml})*R100[\text{int}(u*100/\text{Paraml}) + 1][\text{int}(v* \\ 100/\text{Paraml})] + (1 - \\ \text{frac}(u*100/\text{Paraml}))*\text{frac}(v*100/\text{Paraml})*R100[\text{int}(u*100/\text{Pa} \\ \text{raml})][\text{int}(v*100/\text{Paraml}) + 1] + \\ \text{frac}(u*100/\text{Paraml})*\text{frac}(v*100/\text{Paraml})*R100[\text{int}(u* \\ 100/\text{Paraml}) + 1][\text{int}(v*100/\text{Paraml}) + 1]$$

At S77, u=0 and v=0. At S78, an operation relative to the socket is placed in a waiting state. It is judged at S79 what is the operation to the socket. If the operation is found to be "read" at S79, then u=0 if u exceeds the maximum value of u and v is advanced or incremented by 1 at S80. Further, an EOF (end of file) is produced if v exceeds the maximum value of v at S81 and the routine procedure is returned to S78 from which the processing is repeated. Furthermore, D[u][v] is outputted to the socket and u is advanced by 1 at S82. Thereafter, the routine procedure is returned to S78 from which the processing is repeated.

If the operation to the socket is found to be "write" at S79, then a write-disable error is outputted and the routine procedure is completed. If the operation is found to be "end (close)" at S79, then the routine procedure is finished as it is.

Figure 11:
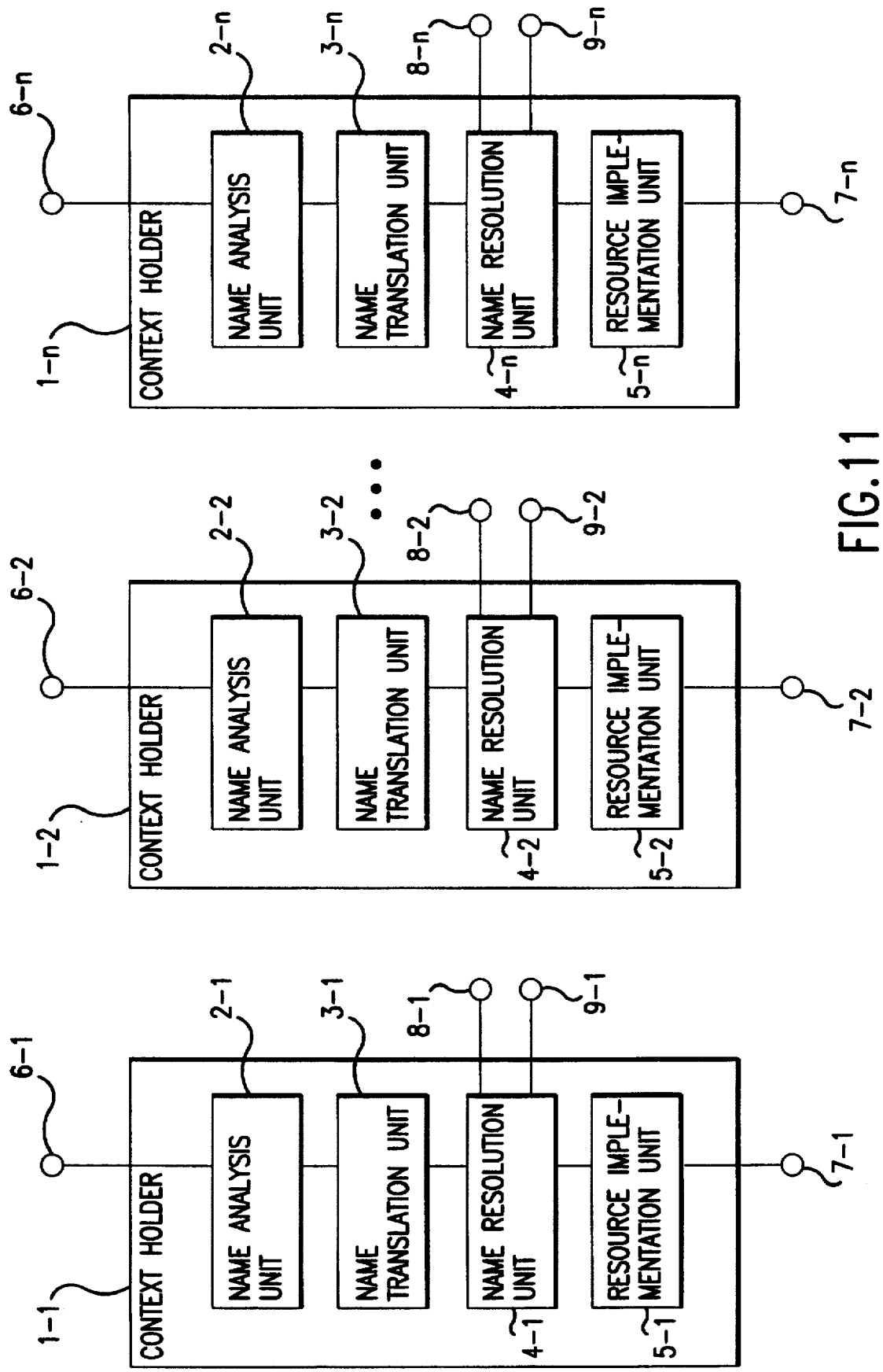
FIG. 11 is a block diagram showing a second embodiment of a resource management apparatus according to the present invention.

FIG. 11 is a block diagram showing a second embodiment of a resource management apparatus according to the present invention. In the drawing, the same elements of structure as those shown in FIG. 1 are identified by like reference numerals and their description will therefore be omitted. Reference numerals 4-1 through 4-n indicate name resolution units respectively. Reference numerals 5-1 through 5-n indicate resource implementation units respectively. Reference numerals 8-1 through 8-n and 9-1 through 9-n indicate terminals respectively. In the second embodiment, the name resolution unit 4 and the resource implementation unit 5 employed in the first embodiment are provided within their corresponding context holding means. The second embodiment comprises n context holders from a context holder 1-1 to a context holder 1-n. The number of the context holders may be one. Alternatively, the present embodiment may be composed of a desired number of context holders.

The context holders 1-1 through 1-n have inherent context identifiers respectively. Further, the context holders 1-1 through 1-n have terminals 6-1 through 6-n and terminals 7-1 through 7-n respectively. The terminals 6-1 through 6-n are respectively of input terminals of the context holders 1-1 through 1-n. The terminals 6-1 through 6-n are respectively supplied with names of resources. The terminals 7-1 through 7-n are respectively of output terminals of the context holders 1-1 through 1-n. In the second embodiment, handles for resources corresponding to the resource names inputted to their corresponding terminals 6-1 through 6-n are respectively outputted to the terminals 7-1 through 7-n.

Further, the context holders 1-1 through 1-n employed in the second embodiment are respectively provided with name analysis units 2-1 through 2-n, name translation units 3-1 through 3-n, name resolution units 4-1 through 4-n and resource implementation units 5-1 through 5-n. The name analysis units 2-1 through 2-n and the name translation units 3-1 through 3-n are identical to those employed in the first embodiment.

The name resolution units 4-1 through 4-n have terminals 8-1 through 8-n and terminals 9-1 through 9-n respectively. The terminals 8-1 through 8-n are respectively of output terminals of the name resolution units 4-1 through 4-n. Each of the terminals 8-1 through 8-n outputs the name of a resource to any one of the context holders 1-1 through 1-n. The terminals 9-1 through 9-n are respectively of input terminals of the name resolution units 4-1 through 4-n and are respectively supplied with handles for resources corresponding to the resource names outputted to the context holders 1-1 through 1-n from the output terminals 8-1 through 8-n. Namely, when context identifiers are included in resource implementation representations received from the name translation units 3-1 through 3-n, the name resolution units 4-1 through 4-n output the resource names to their corresponding context holders indicated by the context identifiers through the output terminals 8-1 through 8-n and receive their corresponding handles from the terminals 9-1 through 9-n. Thus, the context holders are applied on a chain basis until the context identifiers are not included in the resource implementation representations. The result of name resolution corresponding to all or any of the resultant resource implementation representations is outputted to each of the resource implementation units 5-1 through 5-n.

Each of the resource implementation units 5-1 through 5-n is inputted with the result of name resolution outputted from each of the name resolution units 4-1 through 4-n and outputs a handle corresponding to the input result of name resolution from each of the terminals 7-1 through 7-n. By using the handles outputted from the terminals 7-1 through 7-n, a user can effect access and processing onto virtual resources corresponding to the input local resource names.

Figure 12:
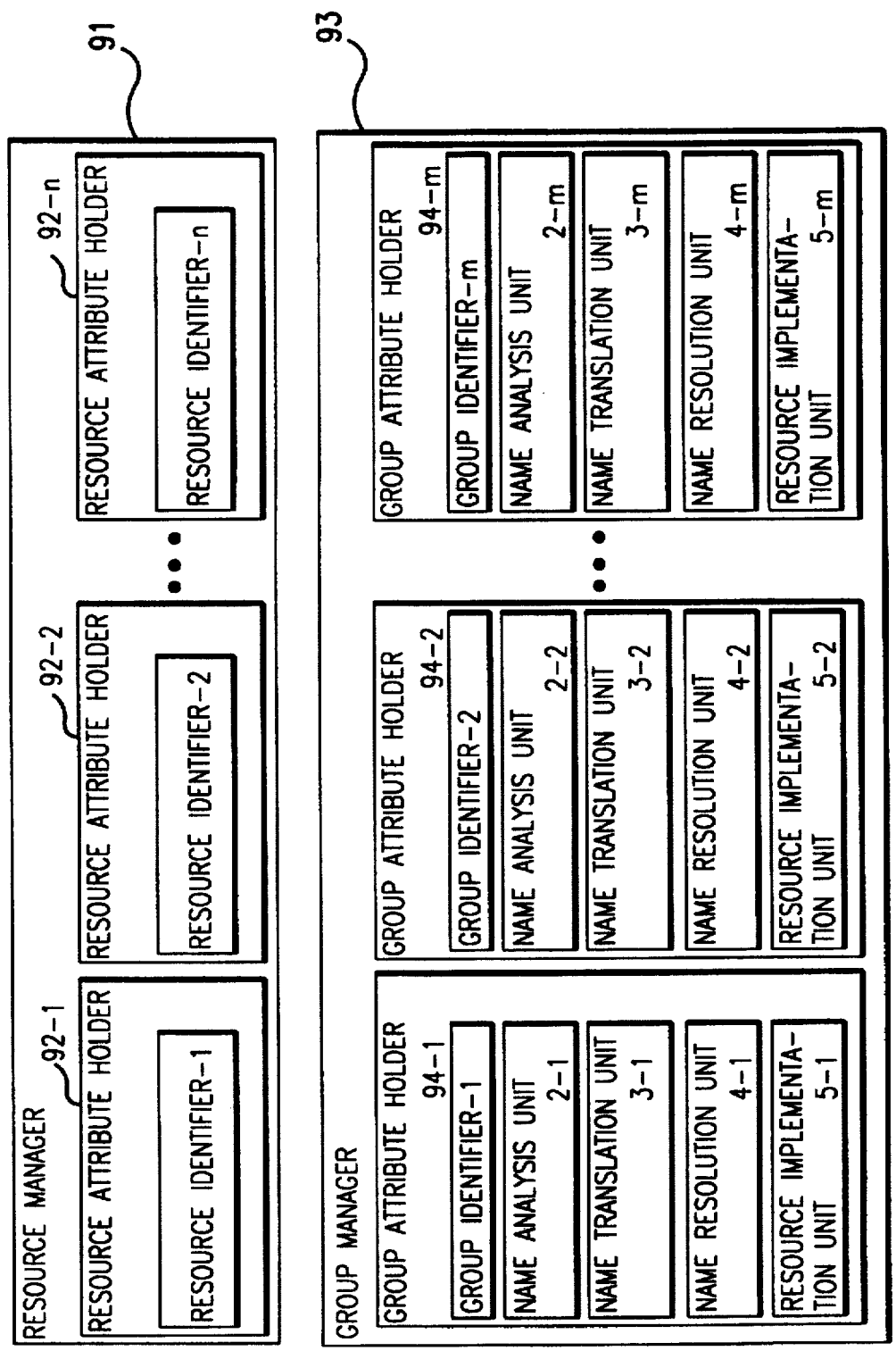
FIG. 12 is a configurational view illustrating a first specific example of the second embodiment shown in FIG. 11.

FIG. 12 is a configurational view illustrating a first specific example of the second embodiment according to the present invention. In the drawing, the same elements of structure as those shown in FIG. 11 are identified by like reference numerals and their description will therefore be omitted. Reference numeral 91 indicates a resource manager, reference numerals 92-1 through 92-n indicate resource attribute holders respectively, reference numeral 93 indicates a group manager and reference numerals 94-1 through 94-m indicate group attribute holders respectively. As the present specific example, an example will be described wherein a local file system, which reflects user's directions and intentions, is realized by providing local groups respectively supplied with local names in accordance with corresponding tables determined or set by individual users.

The local groups described in the present specific example are of local directories. The file system having the local directories comprises the resource manager 91 and the group manager 93. In the present embodiment, each of resources corresponds to a file and a directory. The file is provided by each of the resource attribute holders 92-1 through 92-n. The resource attribute holders 92-1 through 92-n respectively hold intently-identifiable resource identifiers and resource data indicative of the contents of the files. Each resource identifier is of a handle under which an operation can be applied to a resource. Since the resources provided by the resource attribute holders 92-1 through 92-n are of files, for example, open, read, write and close operations of each file can be given to each file handle.

In the present specific example, the resources are managed extensively or locally to a specific computer system by the resource manager 91. The resource manager 91 includes the n resource attribute holders 92-1 through 92-n and unillustrated procedure application units and communicates with the outside or the group manager 93.

The m group attribute holders 94-1 through 94-m correspond to the context holders 1-1 through 1-n shown in FIG. 11. The group attribute holders 94-1 through 94-n include group identifiers -1 through -m, name analysis units 2-1 through 2-m, name translation units 3-1 through 3-m, name resolution units 4-1 through 4-m and resource implementation units 5-1 through 5-m respectively. The group identifiers -1 through -m correspond to the context identifiers. The group attribute holders 94-1 through 94-n are respectively intently identified by the group manager 93. The group manager 93 identifies, holds and manages the group attribute holders 94-1 through 94-m.

The group identifiers -1 through n are constructed so as to produce groups in which subsets of names solvable by contexts are defined as members, from these group identifiers and thereby to realize local groups. In the present example, the group identifiers are constructed so as to include procedures for behaving as groups, depending on the handles under which the operations are applied to the groups. However, the group identifiers are not necessarily limited to this construction. Alternatively, the group identifiers may double as the handles under which the operations are applied to the groups. The group attribute holding means may be realized so as to output lists of solvable names extracted from entries in a name conversion or translation table to list members applied to the handles represented by the group identifiers, respectively or output a character string based on language indicative of sets of the solvable names to each list member.

One example of a specific operation will be described below. A description will be made here of an operation of a file system for constituting a tree structure, wherein a local tree structure having local names is produced and provided at each individual user.

FIG. 13A–B is a view for describing a local file system. Let's now consider a directory having a tree structure shown in FIG. 13(A). For example, a resource stored in the form of a path name called "/by-G/1G/monthly report" and a resource stored in the form of a path name called "/by-G/2G/monthly report" are normally clearly distinguished from each other. In the conventional file system, they cannot be handled as a single resource. However, there may be cases where one would like to handle a plurality of resources as if to be set as a single resource. In order to cope with such a case, the present first specific example handles the resources in the form of the groups.

Figure 13:
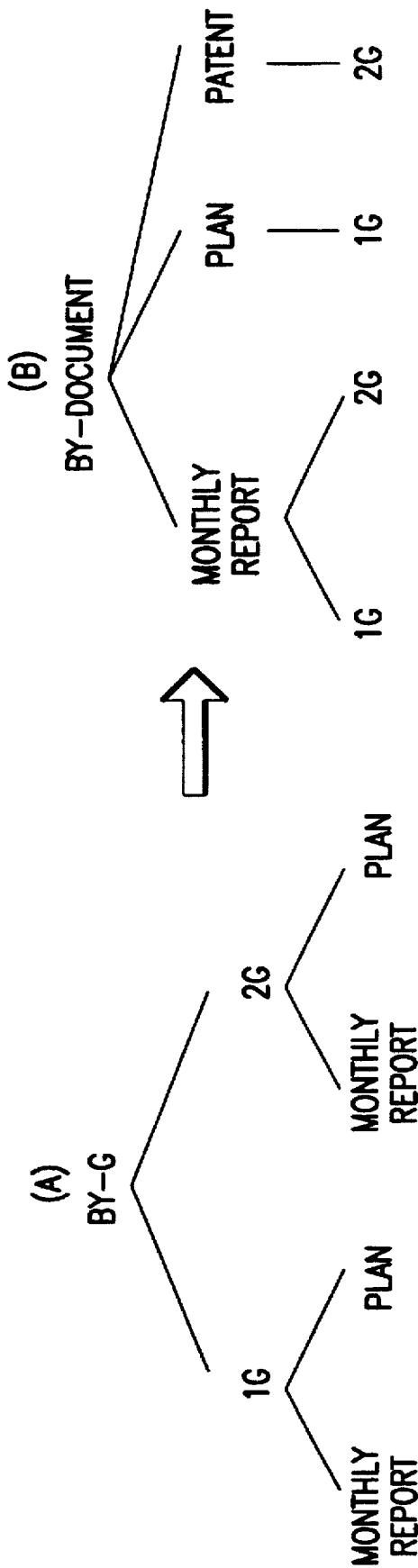
FIG. 13A-B is a view for describing a local file system.
Figure 14:
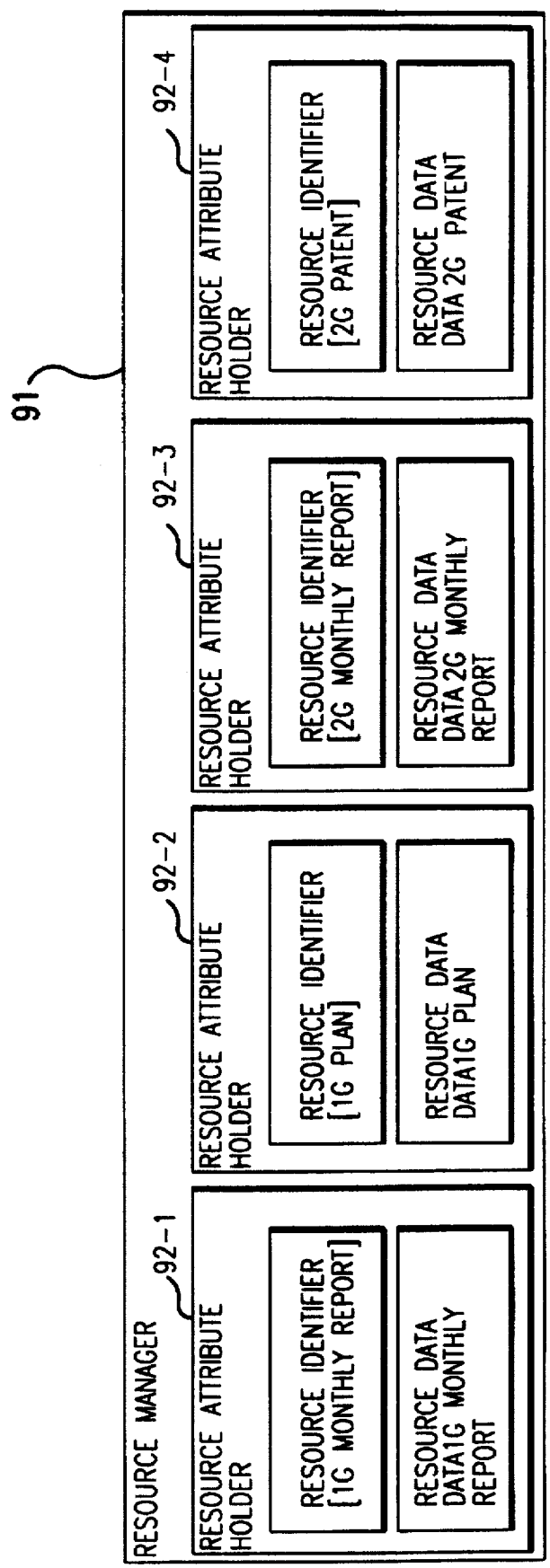
FIG. 14 is a configurational view showing one example of a resource manager in the first specific example shown in FIG. 12.

FIG. 14 is a configurational view showing one example of a resource manager in the first specific example of the second embodiment according to the present invention. A resource manager 91 corresponding to one employed in the example shown in FIG. 13 is illustrated in FIG. 14. Resource attribute holders 92-1 through 92-4 respectively hold resource identifiers [1G monthly report], [1G plan], [2G monthly report] and [2G patent], and resource data DATA1Gmonthly-report, DATA1Gplan, DATA2Gmonthly-report and DATA2Gpatent.

Figure 15:
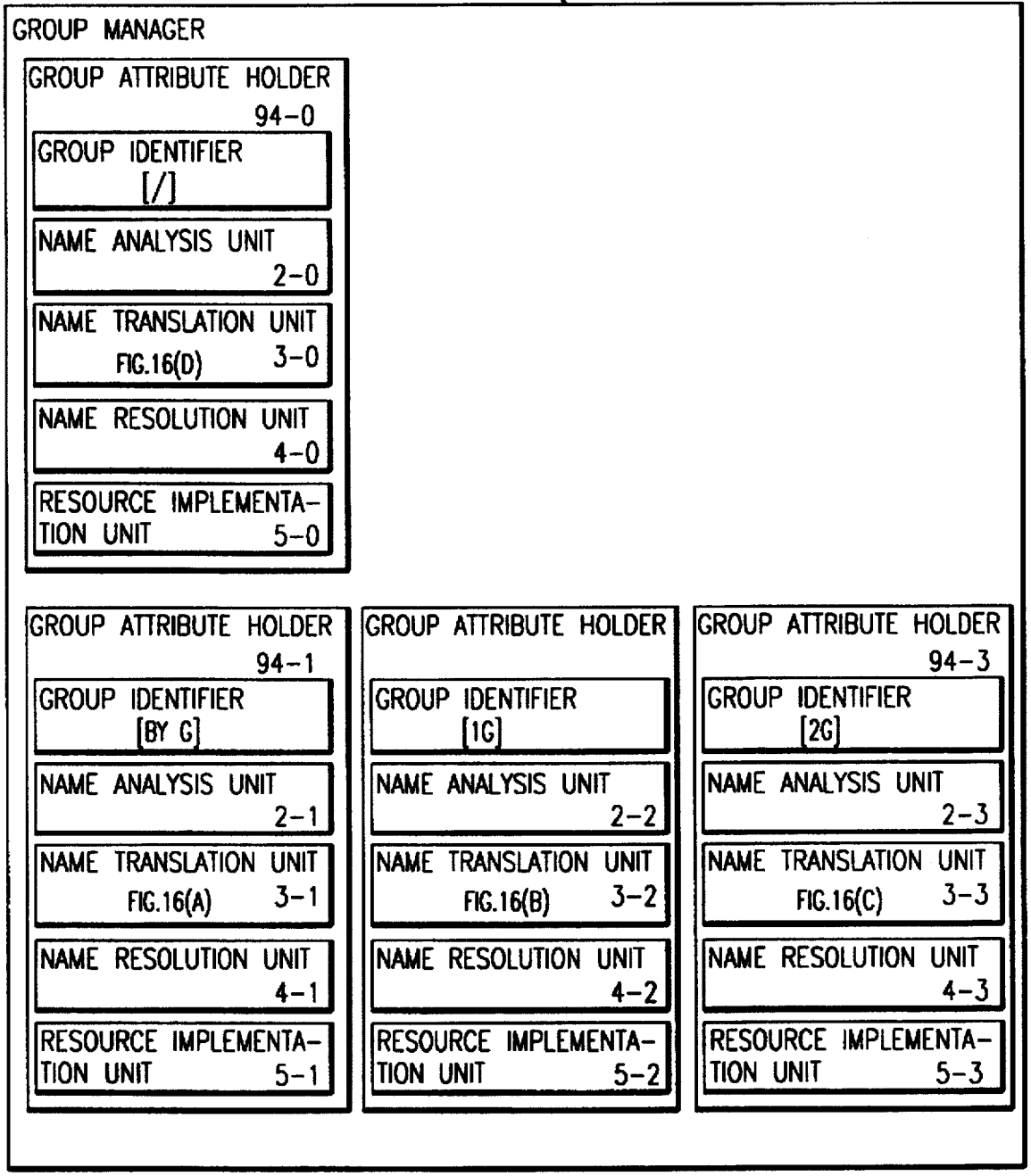
FIG. 15 is a configurational view showing one example of a group manager in the first specific example shown in FIG. 12.

FIG. 15 is a configurational view showing one example of a group manager in the first specific example of the second embodiment according to the present invention. FIGS. 16(A) to (D) are views for explaining examples of corresponding tables held in the name translation units employed in the first specific example. A group manager 93 corresponding to one employed in the example shown in FIG. 13 is illustrated in FIG. 15. The group manager 93 has group attribute holders 94-0 through 94-3. The group attribute holders 94-0 through 94-3 respectively hold [/], [by-G], [1G] and [2G] corresponding to group identifiers 1 through 3, name analysis units 2-0 through 2-3, name translation units 3-0 through 3-3, name resolution units 4-0 through 4-3, and resource implementation units 5-0 through 5-3.

When names represented by character strings including a symbol "/" are inputted, the name analysis units 2-0 through 2-3 are respectively activated so as to separate them into a character string on the left side as seen from the suitable symbol "/" and a character string on the right side, which includes the symbol "/".

The name translation unit 3-1 holds therein such a corresponding table as shown in FIG. 16(A). The name translation unit 3-1 refers to the corresponding table so as to translate or convert the intended name. When a name called "iG" is inputted, the group identifier [1G] is outputted from the corresponding table. On the other hand, when a name called "2G" is inputted, the group identifier [2G] is outputted from the corresponding table.

Similarly, the name translation unit 3-2 holds therein such a corresponding table as shown in FIG. 16(B). The name translation unit 3-2 refers to the corresponding table so as to translate or convert the intended name. When a name called "monthly report" is inputted, the group identifier [1G monthly report] is outputted from the corresponding table. On the other hand, when a name called "plan" is inputted, the group identifier [1G monthly report] is outputted from the corresponding table.

The name translation unit 3-3 holds therein such a corresponding table as shown in FIG. 16(C). The name translation unit 3-3 refers to the corresponding table so as to translate or convert the intended name. When a name called "monthly report" is inputted, the group identifier [2G monthly report] is outputted from the corresponding table. On the other hand, when a name called "patent" is inputted, the group identifier [2G patent] is outputted from the corresponding table.

The name translation unit 3-0 holds therein such a corresponding table as shown in FIG. 16(D). The name translation unit 3-0 refers to the corresponding table so as to translate or convert the intended name. When a name called "by-G" is inputted, the group identifier [by-G] is outputted from the corresponding table.

The name translation units employed in the present specific example are constructed so as to refer to the corresponding tables to thereby output the representations for the name resolution. However, the name translation units may convert names using a hash table, an associative array, a linked list or a relational data base. Generally speaking, any implementation means may be used if capable of holding the corresponding relationship between character strings and numbers and performing retrieval.

When a user obtains access to the resource specified by the path name called "/by-G/1G/monthly report", the user requests the group manager 93 to input a set <[/], "/by-G/1G/monthly report"> produced from the group identifier [/] indicative of the group attribute holder 94-0 and the name "/by-G/1G/monthly report" to the group attribute holder 94-0.

The name analysis unit 2-0 of the group attribute holder 94-0 analyzes the name "/by-G/1G/monthly report" and divides it into the name "by-G" and the remaining conversion or translation name "/1G/monthly report". The analysis of each name is performed in dependence on a naming rule. Here, the path name is regarded as a series or string of element names separated by the symbols "/". Thus, the name analysis can be realized by checking character strings prior to the appearance of the next separate symbol "/". Broadly speaking, the name analysis may be realized by the lexical analysis and syntax analysis described in the aforementioned "Compilers", Addison-Wesley Publishing Co., Ltd. by A. V. Aho, R. Sethi, J. D. Ullman, Chapters 1 to 4, 1986, for example.

The name translation unit 3-0 converts the name "by-G" to obtain the group identifier [by-G]. Further, the name translation unit 3-0 makes a pair of the translation name "/1G/monthly report" outputted from the name analysis unit 2-0 and the group identifier and outputs a series of resource elements {<[by-G], "/1G/monthly report">} constructed as one element.

Since the set of the group identifier and the name <[by-G], "/1G/monthly report"> is included in the series of resource elements {<[by-G], "/1G/monthly report">}, the name resolution unit 4-0 requests the group attribute holder 94-1 having the group identifier [by-G] to solve the name "/1G/monthly report".

The group attribute holder 94-1 activates the name analysis unit 2-1, the name translation unit 3-1 and the name resolution unit 4-1 in a manner similar to the name analysis unit 2-0, the name translation unit 3-0 and the name resolution unit 4-0. As a result, the name resolution unit 4-1 can obtain a second series or string of resource elements {<[1G], "/monthly report">}. Since a pair of a group identifier and a name <[1G], "/monthly report"> is included in the second series of resource elements, the name resolution unit 4-1 requests the group attribute holder 94-2 having the group identifier [1G] to solve the name "/monthly report".

The group attribute holder 94-2 activates the name analysis unit 2-2, the name translation unit 3-2 and the name resolution unit 4-2 in a manner similar to the name analysis unit 2-0, the name translation unit 3-0 and the name resolution unit 4-0. As a result, the name resolution unit 4-2 can obtain a series of resource elements {[1Gmonthly report]} composed of a resource identifier [1Gmonthly report]. Since no pairs of a group identifier and a name is included in the series of resource elements, the name resolution unit 4-2 no longer requests other group attribute holders to solve the names.

In the above operations, the resource identifiers are regarded as being able to be distinguishable from the group identifiers. For example, a specific string for making a distinction between the resource identifiers and the group identifiers may be included in a table. Alternatively, if identifiers are of numbers or a character string, then a character string that starts from a number larger than a specific number, may be constructed so as to be distinguished as a resource identifier.

The name resolution unit 4-2 outputs a resource identifier [1Gmonthly report] corresponding to a handle for a file resource to the resource implementation unit 5-2 as a name resolution representation. Since the procedure is vacant in this case, the name resolution representation is described under the omission of the procedure on the name resolution representation.

When the name resolution unit 4-2 inputs the name resolution representation including the procedure to the resource implementation unit 5-2, the resource implementation unit 5-2 produces such a new handle that the result of execution of the procedure is applied to the handle for the file resource. Since the name resolution representation including the vacant procedure is inputted in this case, the resource implementation unit 5-2 outputs the resource identifier [1Gmonthly report] as it is.

The name resolution unit 4-1 requests the group attribute holder 94-2 having the group identifier [1G] to solve a name "/monthly report". As a result of its request, the name resolution unit 4-1 receives a resource identifier [1Gmonthly report] corresponding to a handle for a resource therein. The name resolution unit 4-1 replaces a pair of the group identifier and the name <[1G], "/monthly report"> with the resource identifier [1Gmonthly report] to thereby obtain a name resolution representation {[1Gmonthly report]} in which no pairs of group identifiers and names are included. The resource implementation unit 5-1 is inputted with the name resolution representation {[1Gmonthly report]} in the same manner as the resource implementation unit 5-2 and outputs the resource identifier [1Gmonthly report] as it is.

Similarly, the name resolution unit 4-0 requests the group attribute holder 94-1 having the group identifier [by-G] to solve a name "1G/monthly report". As a result, the name resolution unit 4-0 receives a resource identifier [1Gmonthly report] corresponding to a handle for a resource therein. The name resolution unit 4-0 replaces a pair of the group identifier and the name <[by-G], "/1G/monthly report"> with the resource identifier [1Gmonthly report] to thereby obtain a name resolution representation {[1Gmonthly report]} in which no pairs of group identifiers and names are included. The resource implementation unit 5-0 is inputted with the name resolution representation {[1Gmonthly report]} in a manner similar to the resource implementation unit 5-2 and outputs the resource identifier [1Gmonthly report] as it is.

As a result, the user can obtain the resource identifier [1Gmonthly report] as a result of resolution of the name "/by-G/1G/monthly report" from the group attribute holder 94-0. Since the resource identifier [1Gmonthly report] is of the handle for the file, the user can operate a file relative to the resource data DATA1Gmonthly-report based on the resource identifier [1Gmonthly report].

A process of resolving a name "/by-G/1G" will now be described. The name analysis unit 2-0 of the group attribute holder 94-0 analyzes the name "/by-G/1G" and divides it into the name "by-G" and the remaining translation name "/1G". The name translation unit 3-0 outputs a series or string of resource elements {<[by-G], "/1G">}. The name resolution unit 4-0 requests the group attribute holder 94-1 having the group identifier [by-G] to solve the name "/1G".

The name analysis unit 2-1 of the group attribute holder 94-1 sets the name as "1G" and the translation name as "/". The name translation unit 3-1 outputs a series of resource elements {<[1G], "/">} therefrom. The name resolution unit 4-1 requests the group attribute holder 94-2 having the group identifier [1G] to solve the name "/".

The name analysis unit 2-2 of the group attribute holder 94-2 sets a name for a vacant character string and a translation name for the vacant character string, i.e., "". The name translation unit 3-2 outputs a vacant or empty series of resource elements to the name for the vacant character string. The name resolution unit 4-2 obtains a name resolution representation {group}.

Now, a procedure "group" corresponds to a procedure of allowing an operation to be applied to a group resource. In the present example, the identifiers of the group attribute holders are set as arguments and names solvable by group attribute holders designated or specified by the arguments are defined as members. When an operation list member is applied, a handle for each group resource that outputs a member list, is produced. For example, the procedure "group" produces one socket as a handle for a resource group treatable as a directory. Next, a name list is calculated from items of names in all lines of each corresponding table of names and a series of resource elements, which is managed by each individual name translation unit of the group attribute holders designated by the arguments. The procedure group may be varied at each context. When a common-member management system is used, the same procedure group may be used among a plurality of contexts. When the operation list member is applied to the socket, the name list is outputted.

In the present specific example as described above, the procedures for realizing that the contexts are respectively behaved as the group resources, are tied up with the local names indicative of the group resources so as to be constructed as the translation table for each name translation unit, thereby resolving the names. Therefore, each individual user can constitute a local group including a resource desired by the user as a member by specifying a name translatable by each name translation unit.

Thus, the aforementioned specific example can embody a high-flexible distributed system capable of resolving the problems that the already-known structures of filing groups cannot be changed and of providing resource-accessing name spaces having local group resources every users, which reflect preference and intentions for an access method by each individual user.

A second specific example of the present invention will now be described. Let's now consider the directories of the aforementioned tree structures shown in FIG. 13. Now, consider the directory having the tree structure shown in FIG. 13(B) in association with the resource data DATA1Gmonthly-report stored in the form of the path name called, for example, "/by-G/1G/monthly report" in the directory having the tree structure shown in FIG. 13(A). It is further considered that access is made to the resource data under a local path name called "/by-document/monthly report/1G". In this case, the resource accessed under the path name called "/by-G/1G/monthly report" by a certain user and the resource accessed under the local path name called "/by-document/monthly report/1G" by another user are the same and the directories are simply different in structure from each other. In the present specific example as described above, the directories having the local tree structures every individual users are produced.

In the present example, a first user and a second user obtain access to the same resource under different path names. In the example shown in FIG. 13, for example, the second user obtains access to a resource specified by a path name called "/by-G/1G/monthly report" for the first user under a path name called "\by-document\monthly report\1G". Similarly, the second user obtains access to a resource specified by a path name called "/by-G/1G/plan" under a path name called "\by-document\plan\1G", a resource specified by a path name called " /by-G/2G/monthly report" under a path name called "\by-document\monthly report\2G", a resource designated by a path name called "/by-G/2G/patent" under a path name called "\by-document\patent\2G", respectively. Therefore, local directories having names local to the second user, i.e., "\", "\by-document", "\by-document\plan", "\by-document\monthly report" and "\by-document\patent" are realized. Described specifically, "\", "by-document", "plan", "patent" and "monthly report" may be prepared as group attribute holders.

Figure 17A:
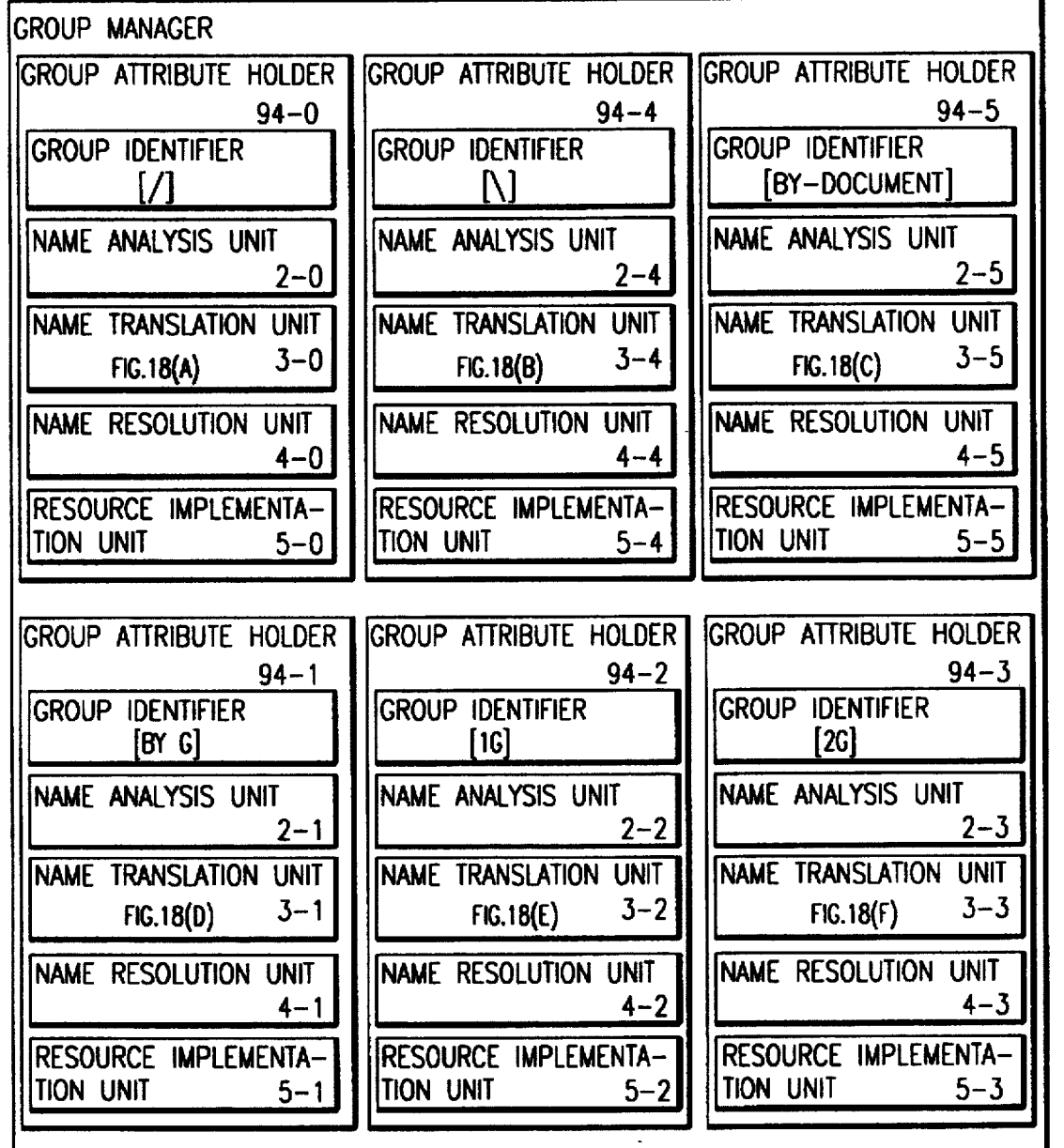
FIG. 17 is a configurational view showing one example of a group manager in a second specific example of the second embodiment shown in FIG. 11.
Figure 17B:
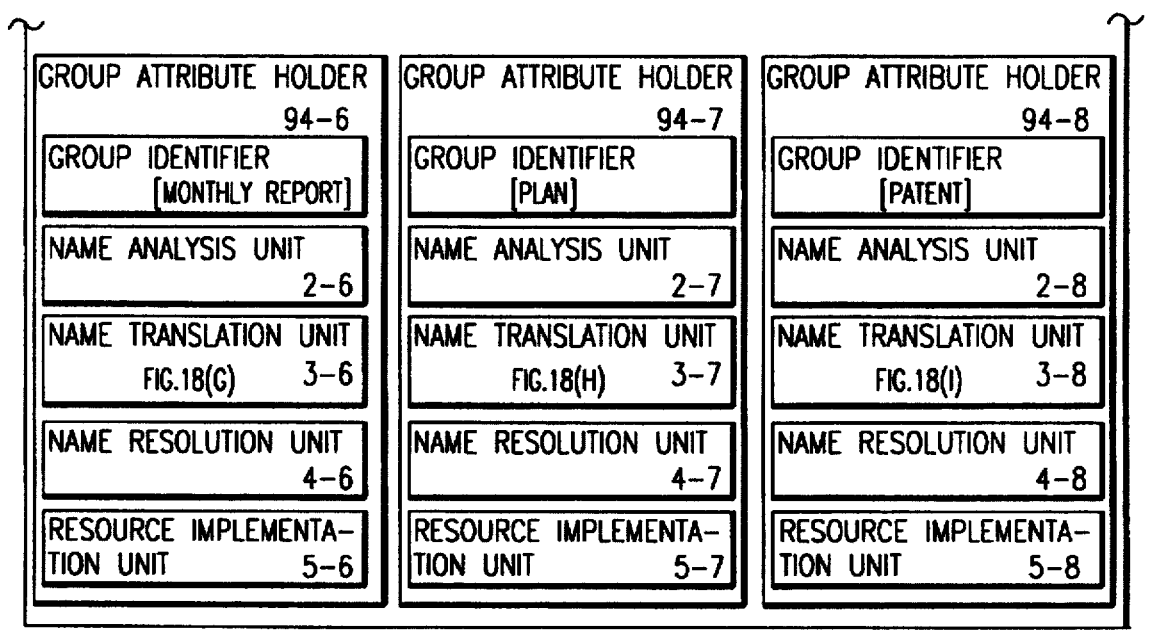

FIG. 17 is a configurational view showing one example of the group manager employed in the second specific example of the second embodiment according to the present invention. FIGS. 18(A) to (I) are views for describing examples of corresponding tables held by the name translations units employed in the same second specific example. Group attribute holders 94-4 through 94-8 are added to the group manager as well as the group attribute holders shown in FIG. 15. These group attribute holders 94-4 through 94-8 have [\], [by-document], [monthly report], [plan] and [patent] respectively. The corresponding tables respectively held by the name translation units 3-0 through 3-8 are shown in FIGS. 18(A) to (I). Incidentally, the symbols (A) through (I) illustrated in the name translation units 3-0 through 3-8 of FIG. 17 correspond to FIGS. 18(A) through 18(I).

When names of character strings including "\" are inputted, name analysis units 2-4 through 2-8 are respectively activated so as to separate them into a character string on the left side as seen from a suitable "\" and a character string on the right side, which includes "\".

In the present specific example, the group attribute holders, which firstly provide names, are different in first and second users from each other. However, the first and second users hold such group attribute holders in common respectively and may access the same resource under different names. For example, "\" is held in common and resources accessed under a path name called "/by-G/1G/monthly report" and a path name called "/by-document/monthly report/1G" may be constructed so as to be made identical to each other. Similarly, resources accessed under a path name called "/by-G/1G/plan" and a path name called "/by-document/plan/1G", resources accessed under a path name called "/by-G/2G/monthly report" and a path name called "/by-document/monthly report/2G", and resources accessed under a path name called "/by-G/2G/patent" and a path name called "/by-document/patent/2G" may be constructed so as to be made identical to one another, respectively.

The operation of accessing each resource under a path name called "\by-document\monthly report\1G" by the second user will be described below with reference to FIGS. 17 and 18. The second user firstly requests the group manager 93 to create new group attribute holders. The group manager 93 newly produces a group attribute holder 94-4. Further, the group manager 93 sets a group identifier for the group attribute holder 94-4 to [\] and sends back the group identifier [\]. Next, the group manager 93 creates a new group attribute holder 94-5, sets a group identifier for the group attribute holder 94-5 to [by-document] and returns the group identifier [by-document]. Further, the second user requests the group attribute holder 94-4 having the group identifier [\] to register the group identifier [by-document] in the form of a name called [by-document]. Thus, the corresponding table shown in FIG. 18(B) is created in the name translation unit 3-4 of the group attribute holder 94-4. The same processing as described above is repeated to form new group attribute holders 94-6 through 94-8.

A name resolution unit 4-5 of the group attribute holder 94-5 having the group identifier [by-document] calculates elements of sum-set of names solvable by the group attribute holders 94-2 and 94-3 respectively having the group identifiers [1G] and [2G] resolved by the group attribute holder 94-1. The calculated elements are associated with the identifiers for the newly-produced group attribute holders 94-6 through 94-8 so as to be stored in the corresponding table held by the name translation unit 3-5 of the group attribute holder 94-5. Here, the calculated names are respectively of "monthly report", "plan" and "patent" and the associated identifiers for the group attribute holders 94-6 through 94-8 are respectively of [monthly report], [plan] and [patent]. The corresponding table created in this way is shown in FIG. 18(C). The same processing as described above is executed below to create corresponding tables held by the name translation units of the group attribute holders 94-6 through 94-8. These created corresponding tables are shown in FIGS. 18(G) through 18(I).

Figure 19:
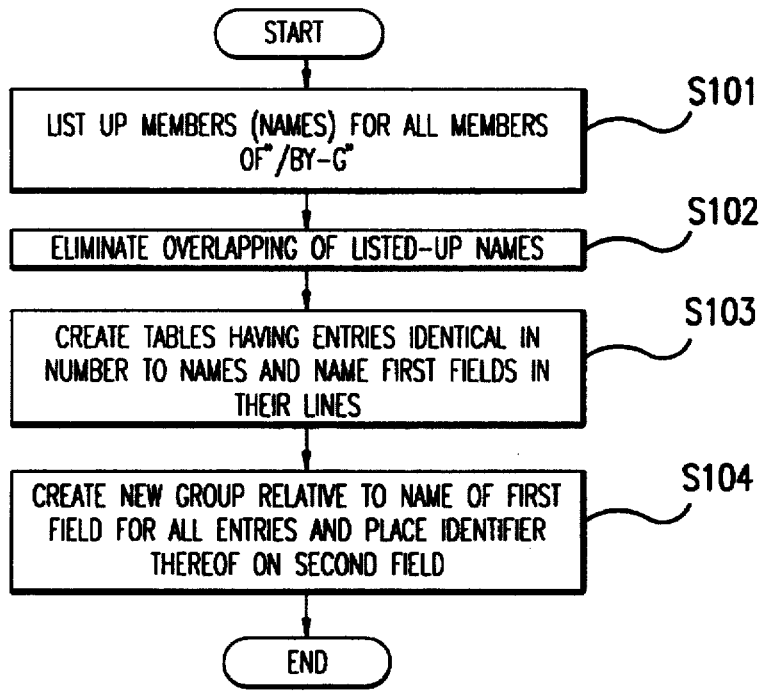
FIG. 19 is a flowchart for describing one example of a procedure for creating each corresponding table in the second specific example shown in FIG. 17.
Figure 20:
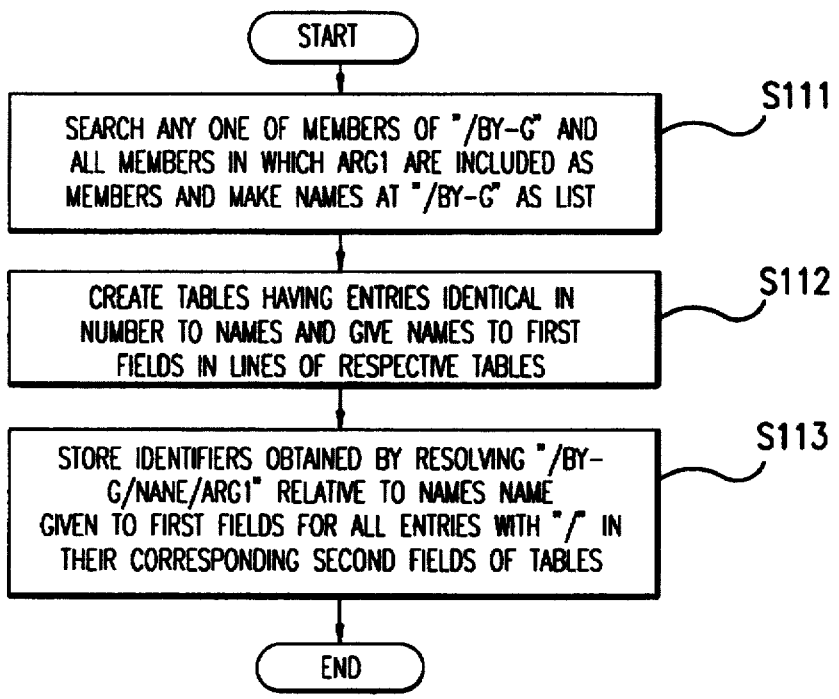
FIG. 20 is a flowchart for describing another example of the corresponding-table creating procedure shown in FIG. 19.

Prior to the resolution of each name, the corresponding tables are created in accordance with the following procedures in advance. FIGS. 19 and 20 are flowcharts for describing examples of procedures of creating the corresponding tables employed in the second specific example of the second embodiment according to the present invention. Firstly, the corresponding table for the group attribute holder 94-5 is produced in accordance with the procedure shown in FIG. 19. At S101, members (names) for all the members of "/by-G" are listed up. At S102, the overlapping of the listed-up names is eliminated. Further, tables each having entries identical in number to the names are created at S103 and the names are placed on or entered into first fields in lines of the respective tables. Finally, at S104, a new group relative to the names placed on each first field for all the entries is created and an identifier for the group is entered into a second field. Thus, the intended corresponding table is produced in the name translation unit 3-5 of the group attribute holder 94-5.

The corresponding tables for the group attribute holders 94-6 through 94-8 are created in accordance with the procedure shown in FIG. 20. In this case, the name is given to ARG1. In the present specific example, ARG1 corresponds to any one of "monthly report", "plan" and "patent".

At S111, any one of members of "/by-G" and all the groups in which ARG1 are included as members, are searched and names at "/by-G" are made as a list (including "1G" or "2G" in the present embodiment). At S112, tables each having entries identical in number to the names are created and the names are given to first fields in lines of the respective tables. Finally, at S113, identifiers obtained by resolving "/by-G/NAME/ARG1" relative to names NAME given to the first fields for all the entries with "/" are stored in their corresponding second fields of the tables.

As a result of such processing, a corresponding table for respectively resolving the names "1G" and "2G" as [1Gmonthly report] and [2Gmonthly report] is created in the name translation unit 3-6 of the group attribute holder 94-6. Similarly, a corresponding table for resolving the name "iG" as [1Gplan] is produced in the name translation unit 3-7 of the group attribute holder 94-7. Further, a corresponding table for resolving the name "2G" as [2Gpatent] is created in the name translation unit 3-8 of the group attribute holder 94-8. The corresponding tables shown in FIGS. 18(G) through 18(I) are created in this way.

Thus, such group attribute holders 94-4 through 94-8 as shown in FIGS. 17 and 18 are created and the corresponding tables held in these name translation units 3-4 through 3-8 are produced.

The local filings provided by the group manager 93 constructed as described above locally realize directories "\", "\by-document", "\by-document\plan", "\by-document\monthly report" and "\by-document\patent". Namely, local groups are realized with respect to filings in which the monthly report, plan and patent files are classified on group-by-group hierarchy basis by a first user and local groups are realized with respect to local filings classified according to the type of document.

The second user can obtain access to a resource specified by a path name called "/by-G/1G/monthly report" by the first user using each of the group attribute holders 94-4 through 94-8 under a path name called "\by-document\monthly report\1G". In the second specific example as described above, the first user classifies the monthly report, plan and patent files determined according to the group, whereas the second user can classify files according to the filings having the local groups classified according to the type of document.

A further description will be made in addition to the above description. The directory called "\by-document\monthly report" in the present specific example is constructed so that a sum set of members having specific conditions, of all the members in a subdirectory of a directory "/by-G" is defined as a member. In this case, the name translation table for the group attribute holder 94-6 may be constructed so as to be able to be easily produced by preparing a procedure of calculating a sum set of members in each group given by a plurality of contexts in advance and a procedure of eliminating members that do not meet predetermined requirements or conditions and using them in combination. Alternatively, these procedures may be executed upon name resolution so as to obtain the result of name resolution on demand. The present embodiment has described the procedure of calculating the sum set. However, the present embodiment is not necessarily limited to the adoption of such a procedure. Any operations made to sets such as a difference set, a cross set, a direct sum, a direct product, etc. may be used.

In the second specific example as described above, the rule for naming each file is fixed and is based on naming fixed by a system designer, a system manager or one who stores each file and a group hierarchical structure. Therefore, a high-flexible distributed system capable of resolving the conventional problems that the access cannot be made in accordance with the group structure based on the naming rule determined for each user and each individual classification standard and providing resource-accessing name spaces including local group resources every users, which reflect preference and intentions for an access method by each individual user.

A third specific example of the second embodiment according to the present invention will now be described. As the third specific example, an example will be described wherein members included in each local directory are constructed so as to serve as resources each having a predetermined property. In the present specific example, the predetermined property will be behaved as if files stored in a state compressed by a predetermined compression system would not be compressed. In the present specific example, resource data DATA1Gmonthly report, DATA1Gplan, DATA2Gmonthly report and DATA2Gpatent are regarded as stored in a state compressed by the predetermined compression system.

Figure 21:
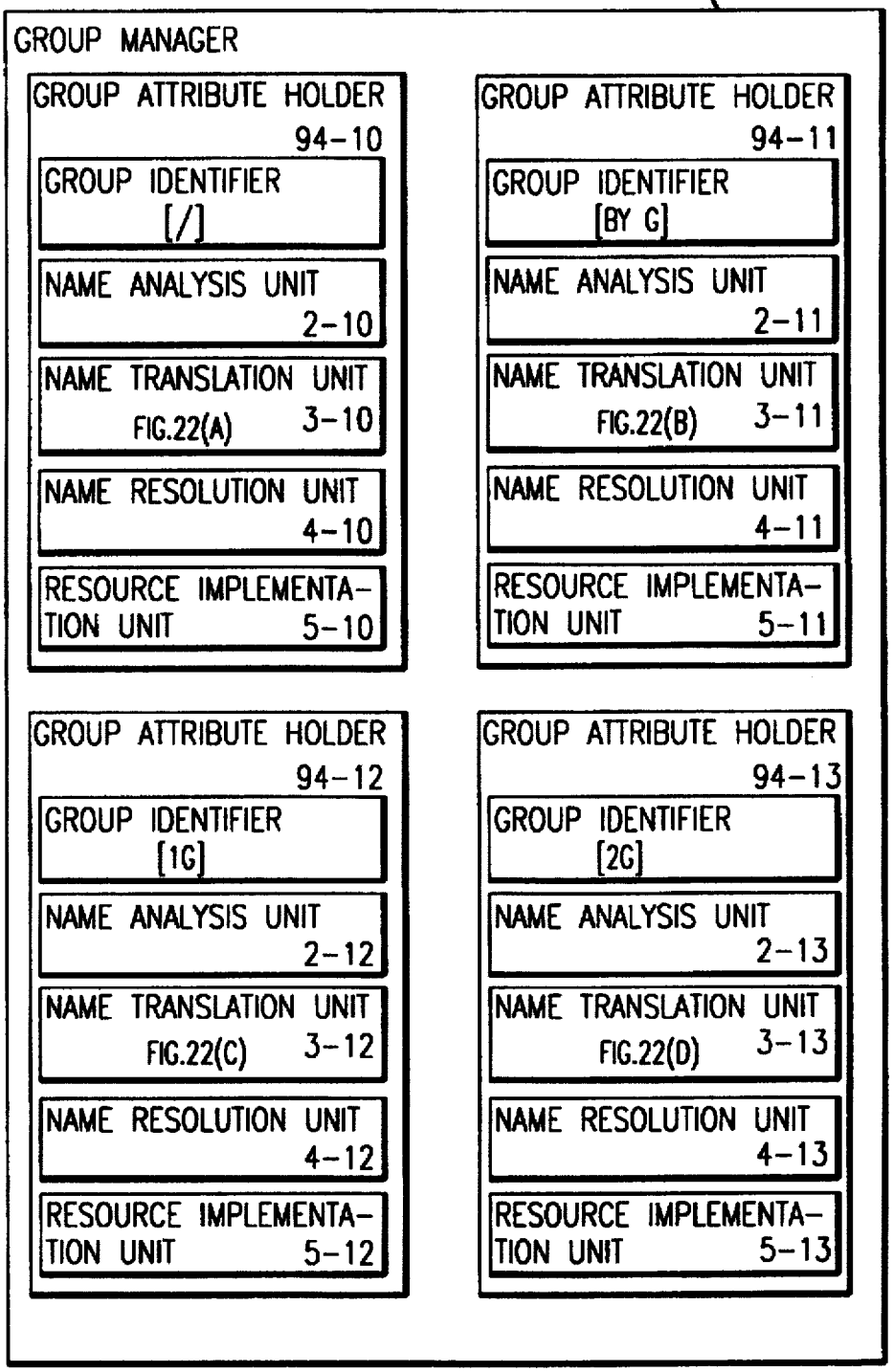
FIG. 21 is a configurational view showing one example of a group manager in a third specific example of the second embodiment according to the present invention.

FIG. 21 is a configuration view showing one example of a group manager employed in the third specific example of the second embodiment according to the present invention. FIGS. 22(A) to (D) are views for describing examples of corresponding tables held in name translation units employed in the third specific example. In the third specific example, the name resolution units 4-2 and 4-3 and the resource implementation units 5-2 and 5-3 of the group attribute holders 94-2 and 94-3 employed in the first specific example mentioned above have been changed. As shown in FIG. 21, a local file system is composed of new group attribute holders 94-10 through 94-13. The group attribute holders 94-10 and the group attribute holders 94-11 are respectively similar to the group attribute holder 94-0 and the group attribute holder 94-1 employed in the first specific example.

A name translation unit 3-12 of the group attribute holder 94-12 obtains a name "monthly report" outputted from a name analysis unit 2-12 and outputs resource implementation representations <[compression/expansion], [1Gmonthly report]> corresponding to a pair of a series or string of resource elements {[1Gmonthly report]} and a procedure [compression/expansion]. Further, a name resolution unit 4-12 outputs the result of name resolution similar to the above. Similarly, the name translation unit 3-12 obtains a name "plan" and outputs resource implementation representations <[compression/expansion], [1Gplan]> corresponding to a pair of a series or string of resource elements {[1Gplan]} and a procedure [compression/expansion]. Further, the name resolution unit 4-12 outputs the result of name resolution similar to the above. A name translation unit 3-13 of the group attribute holder 94-13 outputs resource implementation representations <[compression/expansion], [2Gmonthly report]> corresponding to a pair of a series of resource elements {[2Gmonthly report]} and a procedure [compression/expansion] to a name "monthly report" outputted from a name analysis unit 2-13. Further, the name translation unit 3-13 outputs resource implementation representations <[compression/expansion], [2Gpatent]> corresponding to a pair of a series of resource elements {[2Gpatent]} and a procedure [compression/expansion] to a name "patent". A name resolution unit 4-13 outputs the result of name resolution similar to the above.

When the name resolution unit 4-12 inputs the result of name resolution <[compression/expansion], [1Gmonthly report]> including the procedure to a resource implementation unit 5-12, the resource implementation unit 5-12 produces a new resource identifier [compression/expansion1Gmonthly report]. The resource identifier [compression/expansion1Gmonthly report] is of a handle enabling a file operation. When a write process is effected on the handle, the resource implementation unit 5-12 compresses written data and writes the compressed and processed data into the resource identifier [1Gmonthly report]. On the other hand, when a read process is made from the handle, the resource implementation unit 5-12 reads data from the resource identifier [1Gmonthly report], effects an expansion process on the data and sends back it as the data read from the handle. This processing can be realized as, for example, a process of realizing handles as pipelines of UNIX OS and compressing or expanding data input from one pipeline and outputting it to the other pipeline. Generally, the processing can be realized by communications between desired processes such as RPC (Remote Procedure Call), ports for Mach OS, etc.

In a manner similar to the aforementioned resource identifier [compression/expansion1Gmonthly report], the resource implementation unit 5-12 produces a resource identifier [compression/expansion1Gplan] from the name resolution representation <[compression/expansion], "1Gplan">. A resource implementation unit 5-13 generates a resource identifier [compression/expansion2Gmonthly report ] from the name resolution representation <[compression/expansion], [2Gmonthly report]> and produces a resource identifier [compression/expansion2Gpatent ] from the name resolution representation <[compression/expansion ], [2Gpatent ]>.

Figure 23:
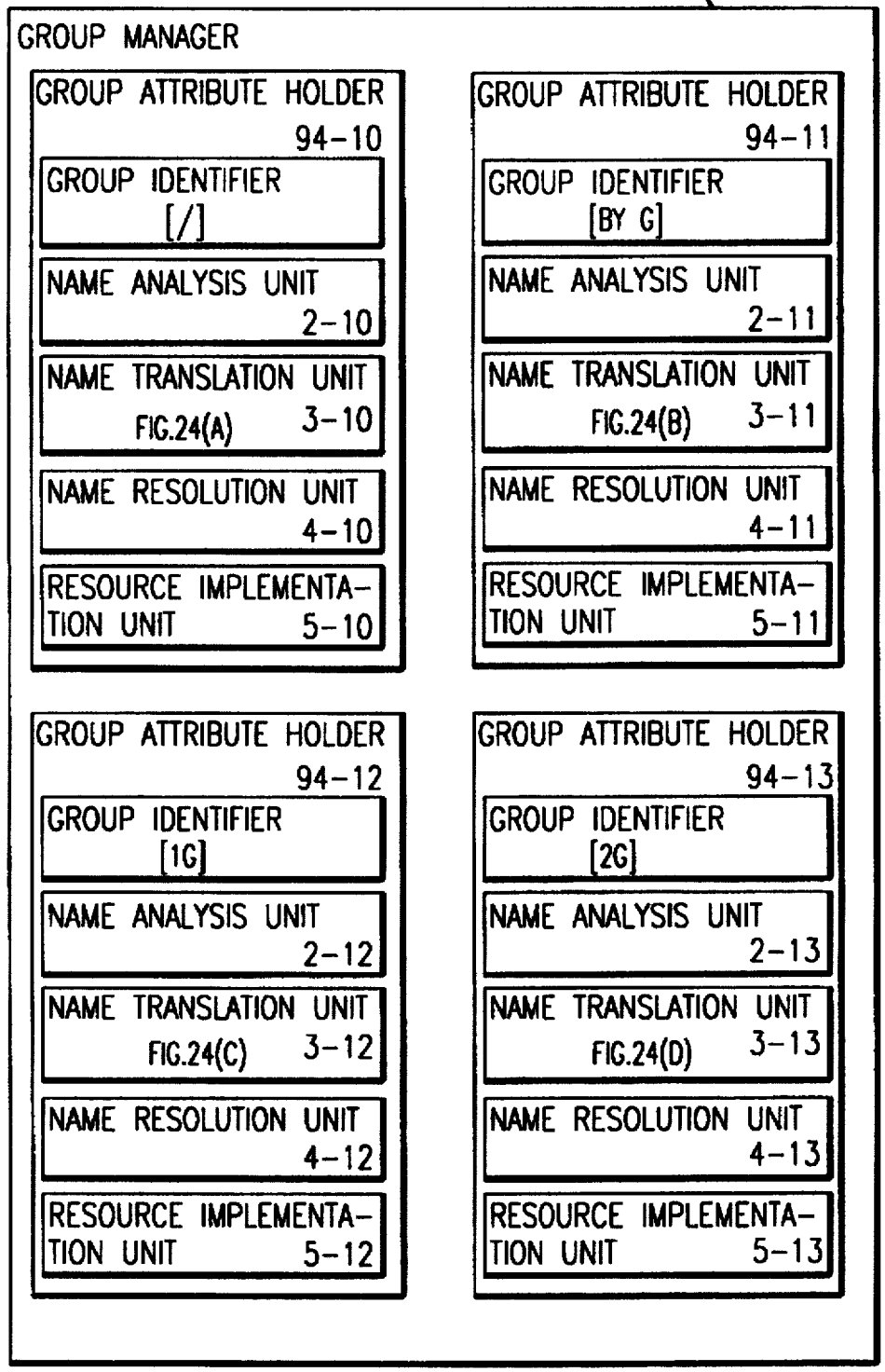
FIG. 23 is a configurational view illustrating another example of the group manager shown in FIG. 21.

When the first user obtains access to "/by-G/1G/monthly report", "/by-G/1G/plan", "/by-G/2G/monthly report" and "/by-G/2G/patent" where the respective resource data have been stored under compression in the aforementioned first specific example, it is necessary to separately perform expansion processes upon reading. When the data are stored, it is necessary to effect compression processing on the data and store the so-processed data. As shown in FIGS. 21 and 23 to the contrary, a third user can access a second "/by-G/1G/monthly report", a second "/by-G/1G/plan", a second "/by-G/2G/monthly report" and a second "/by-G/2G/patent" constructed as local resources owing to the provision of the group attribute holders 94-10 through 94-13. Although resource data DATA1Gmonthly report, DATA1Gplan, DATA2Gmonthly report and DATA2Gpatent are respectively in compressed states at this time, they can be handled as if they would be non-compressed resource data DATA1Gmonthly report, DATA1Gplan, DATA2Gmonthly report and DATA2Gpatent.

In the present specific example, all the resource data DATA1Gmonthly report, DATA1Gplan, DATA2Gmonthly report and DATA2Gpatent are compressed under the same compression system. However, they may not be necessarily compressed under the same compression system. Since the procedures on the compression/expansion can be separately managed by the corresponding tables in the name translation units 4-12 and 4-13, a predetermined compression/expansion system can be applied and resources can be handled even in the case of resource data processed by compression/expansion systems different every resources solvable by the group attribute holders 94-12 and 94-13.

The procedures for performing the compression/expansion processing have been described so as to be managed by the name translation units 3-12 and 3-13 and actually started up by the resource implementation units 5-12 and 5-13. However, the procedures may be handled by either one of the group attribute holders 94-10 and 94-11 as an alternative to being handled by the name translation units 3-12 and 3-13 and the resource implementation units 5-12 and 5-13.

FIG. 23 is a configurational view showing another example of the group manager in the third specific example of the second embodiment according to the present invention. FIGS. 24(A) to (D) are views for describing other examples of the corresponding tables held in the name translation units employed in the third specific example. As the present example, an example will be described wherein a procedure is treated by a group attribute holder 94-11. In this case, [compression/expansion] may be registered in a corresponding table held by a name translation unit 3-11 as the procedure. In doing so, compression/expansion processing can be effected on an operation using a handle for a resource sent back from a group attribute holder 94-12 or a group attribute holder 94-13 subordinate to the group attribute holder 94-11. Namely, the procedure of [compression/expansion] is applied to all the resources included in sub-directories that follow "/by-G/1G" and sub-directories that follow "/by-G/2G".

Figure 25:
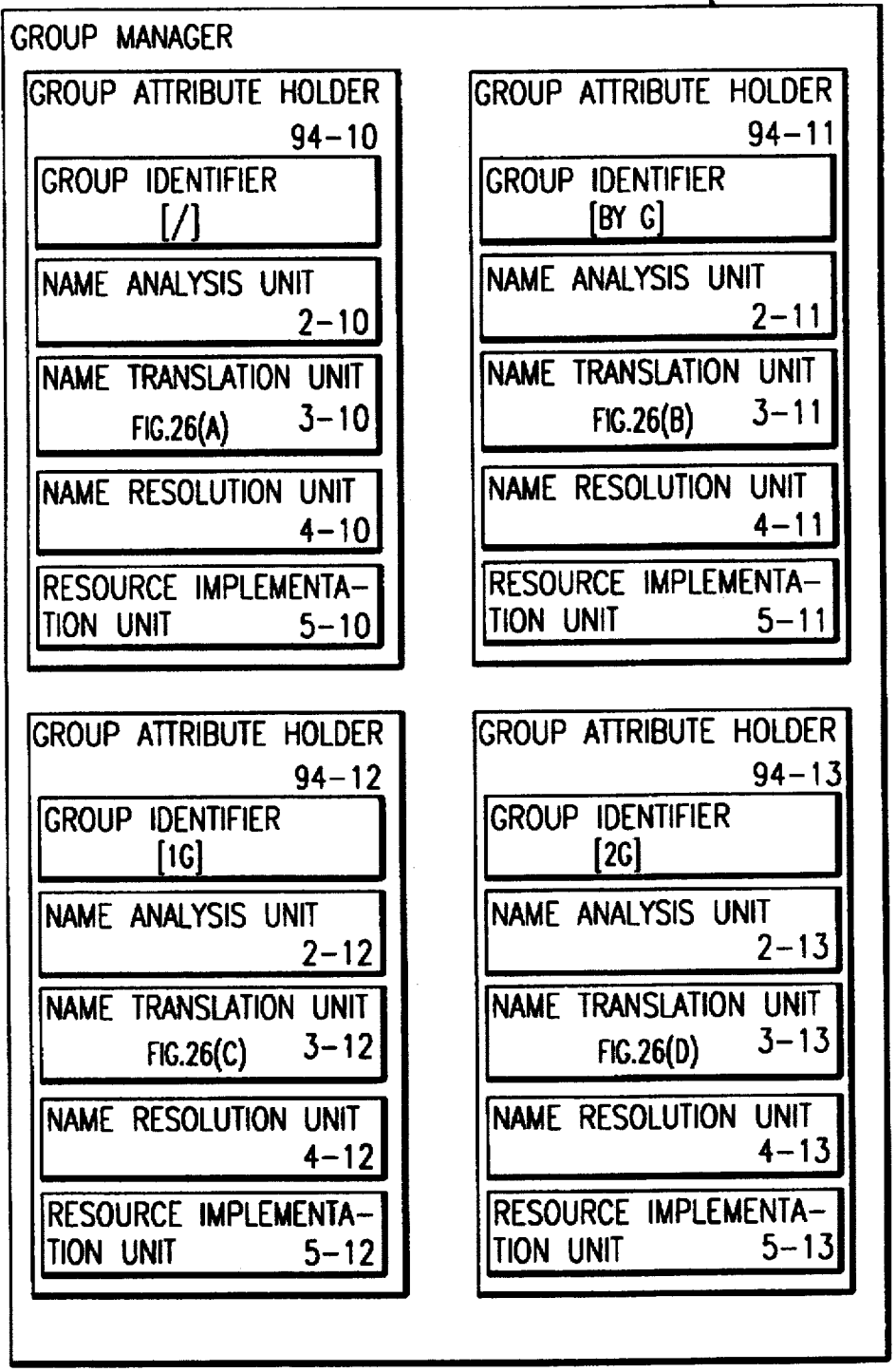
FIG. 25 is a configurational view showing a further example of the group manager shown in FIG. 21.

FIG. 25 is a configurational view showing a further example of the group manager employed in the third specific example of the second embodiment according to the present invention. FIGS. 26(A) to (D) are views for describing further examples of the corresponding tables held in the name translation units employed in the third specific example. The present example shows a case where a procedure is handled by a group attribute holder 94-10. In this case, [compression/expansion] may be registered in a corresponding table held in a name translation unit 3-10 as the procedure. In doing so, a compression/expansion process can be effected on an operation using a handle for a resource sent back from a group attribute holder 94-10 or a group attribute holder 94-11. Namely, the procedure of [compression/expansion] can be applied to all the resources included in directories that follow "/by-G".

Thus, the processes for the procedures handled by the group attribute holders which form the parent-child relationship in each tree structure, can be generally constructed so as to be directly cascade-connected to one another and executed from parent to child or vice versa in order.

The present specific examples have been described using the compression/expansion processing. However, the procedures to be applied are not necessarily limited to the compression/expansion processing. The present resource management apparatus can also provide the function of applying local names to local resources and handling the so-processed names in such a manner that a procedure for converting tone, resolution or color space can be realized in combination with a file storing image data therein, for example. In the case of a document, each local resource represented in the format of a desired document editor can be provided by combination of the document with a procedure for converting a document format.

Further, resources having properties for insuring the reading and writing of voices or images at predetermined time intervals are desired upon storing and extracting them. Since, however, the already-existing filings do not include such properties, the reading and writing of the voices or images at predetermined time intervals are not insured. In such a case, the present specific example can provide the function of ensuring the reading and writing of the voices or images at regular time intervals upon writing and extracting the voices or images if procedures for handling a buffer function enabling data advanced-reading and data delay-writing are combined with each other as well as with conversion of writing or reading cycles, conversion of a data size of one screen or a phoneme corresponding to the sampling quality of data. When the reading and writing of the already-existing filings are retarded, for example, the reading and writing of the already-existing filings at all times can be also ensured if the quantity of data is increased or decreased by adaptably varying the quality of data in linkage with the vacant capacity of buffer data stored under the buffer function.

When a first user handles compressed and stored filings, an on-usage expansion process and an on-storage compression process must be separately carried out in the conventional example. In the third specific example as mentioned above, however, a third user can locally realize and handle such filings as if the compression and expansion thereof would be automatically performed. Further, local directories having such properties that desired processes such as compression and expansion, etc. are separately executed, can be formed. In addition to this, local directories having such properties that files indicative of descendants at the time that members in predetermined directories or hierarchies of the directories are respectively regarded as tree structures or graph structures, can be read and written under the same processing, can be formed. By setting a plurality of processes to directories different from each other and stacking hierarchical structures of the directories on one another, a file system having such properties that the plurality of processes are cascade-connected and automatically carried out, can also be formed.

In the conventional filings, a problem arises that a user cannot separately change file properties determined by a system provider, a system manager or a file storing person. It was necessary for each individual user to separately processes for varying the properties as needed after accessing. Since, however, the present specific example can provide the local filings inclusive of the function of changing the properties, a high-flexible distributed system can be embodied which is capable of resolving the conventional problems by providing the name spaces for accessing the local resources every users, which reflect preference and intentions for an access method by the individual users, using the resource management apparatus comprised of the plurality of group attribute holders for managing the names and procedures in combination.

Since the name spaces can be hierarchically designed and constructed by the plurality of group attribute holders, it is easy to design and re-use the name spaces. Even in that sense, a high-flexible distributed system is embodied.

A fourth specific example of the second embodiment according to the present invention will now be described. In the second specific example, the group attribute holders 94-4 through 94-8 and the name translation units 3-4 through 3-8 were constructed so as to retrieve the corresponding tables created in advance in accordance with the predetermined algorithm and thereby produce the series or string of resource elements from the names. In the fourth embodiment to the contrary, corresponding tables are created upon execution of name translation in accordance with the way of creating the corresponding tables for the name translation units 3-4 through 3-8 of the group attribute holders 94-4 through 94-8, which has been described in the second embodiment, without using the pre-created corresponding tables. Thereafter, a name translation process is executed to produce a series or string of resource elements.

Figure 27A:
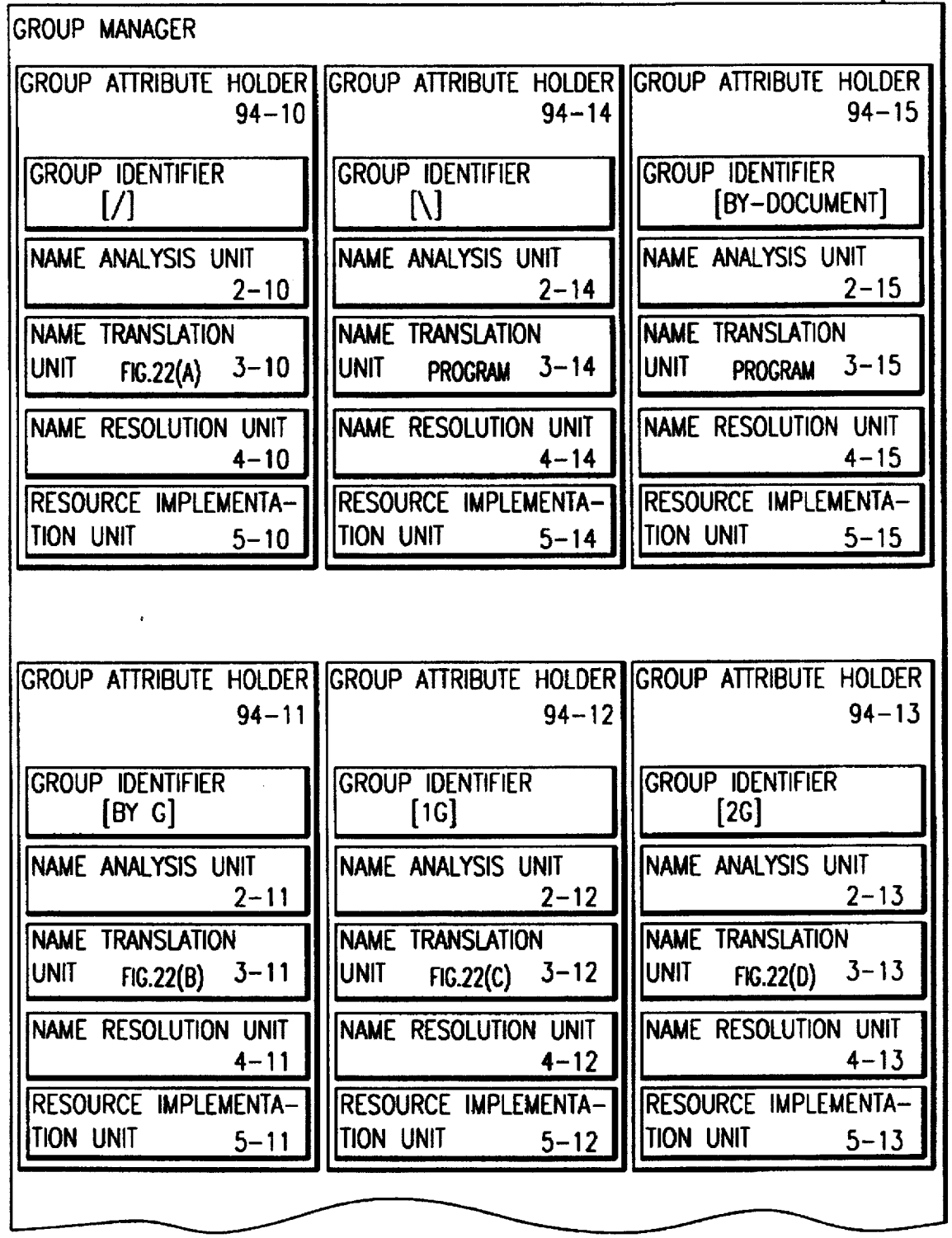
FIG. 27 is a configurational view showing one example of a group manager in a fourth specific example of the second embodiment according to the present invention.
Figure 27B:
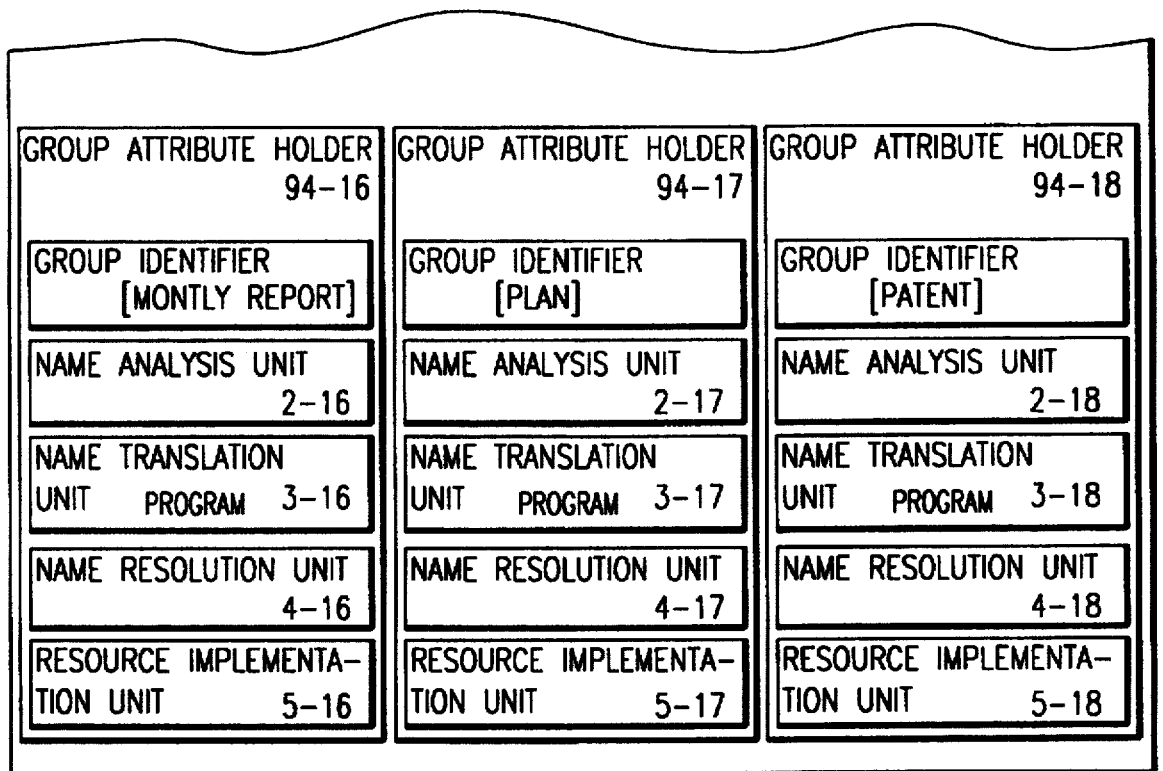

FIG. 27 is a configurational view showing one example of a group manager employed in the fourth specific example of the second embodiment according to the present invention. In the drawing, group attribute holders 94-10 through 94-13 are similar to those shown in FIG. 21. Further, corresponding tables held by name translation units 3-10 through 3-13 of the group attribute holders 94-10 through 94-13 are similar to those shown in FIGS. 22(A) to (D).

A name translation unit 3-15 of a group attribute holder 94-15 has a program for creating the corresponding table similar to the corresponding table held by the name translation unit 3-5 of the group attribute holder 94-5, which is shown in FIG. 18(C) in the second specific example. Based on the corresponding table obtained as a result of startup of the program, the name translation unit 3-15 performs a name translation process. The program is similar to the algorithm shown in FIG. 19, for example.

Similarly, a name translation unit 3-16 of a group attribute holder 94-16, a name translation unit 3-17 of a group attribute holder 94-17 and a name translation unit 3-18 of a group attribute holder 94-18 respectively have programs for executing the algorithm shown in FIG. 20, for example. Based on corresponding tables obtained as a result of startup of the programs, the name translation units 3-16, 3-17 and 3-18 perform name translation processes respectively.

In the present example, all the entries are produced in the corresponding tables. However, the name translation units may be constructed so as to dynamically create or produce only portions about entries necessary for resolution.

Owing to the construction of the group attribute holders 94-14 through 94-18, for example, a fourth user can realize local groups based on local filings classified according to the type of document in a manner similar to the second user described in the second specific example. In conjunction with it, the local groups can materialize local groups having properties in which variations in hierarchical structures of the groups based on the filings handled by the first user are dynamically reflected.

When, for example, the first user stores a resource specified under a path name called "/by-G/1G/weekly report", the fourth user can read and write the same document under a path name called "\by-document\weekly report\1G" even if the corresponding table in the group attribute holder 94-14 is not newly re-created.

In the conventional resource management apparatus, the groups provided by the filings are static and stationary. Therefore, a problem arises that in order to dynamically fix members in groups and the contents of files based on predetermined results of calculations, individual users must regularly perform calculations using some means and reflect the result of calculations in the groups or files.

In the fourth specific example as mentioned above, the local groups defined by the procedures for dynamically constituting the members and the local files defined by the procedures for dynamically calculating the contents can be handled by placing the names thereon. Further, a system can be constructed in such a manner that access is performed based on the result of startup of each procedure regularly or at each access. Therefore, a distributed system can be embodied which is capable of forming name spaces for accessing local resources, every users, which reflect preference and intentions for each access method by each individual user, resolving the conventional problems and providing high flexibility.

In the fourth specific example in particular, the group resources each having the dynamic members can be provided by constructing the name translation units so that the set of names resolved by the group attribute holders is dynamically fixed and constructing the procedures for handling the group attribute holders as the group resources so as to handle the dynamically-fixed members. Thus, a high-flexible distributed system can be embodied.

Figure 28:
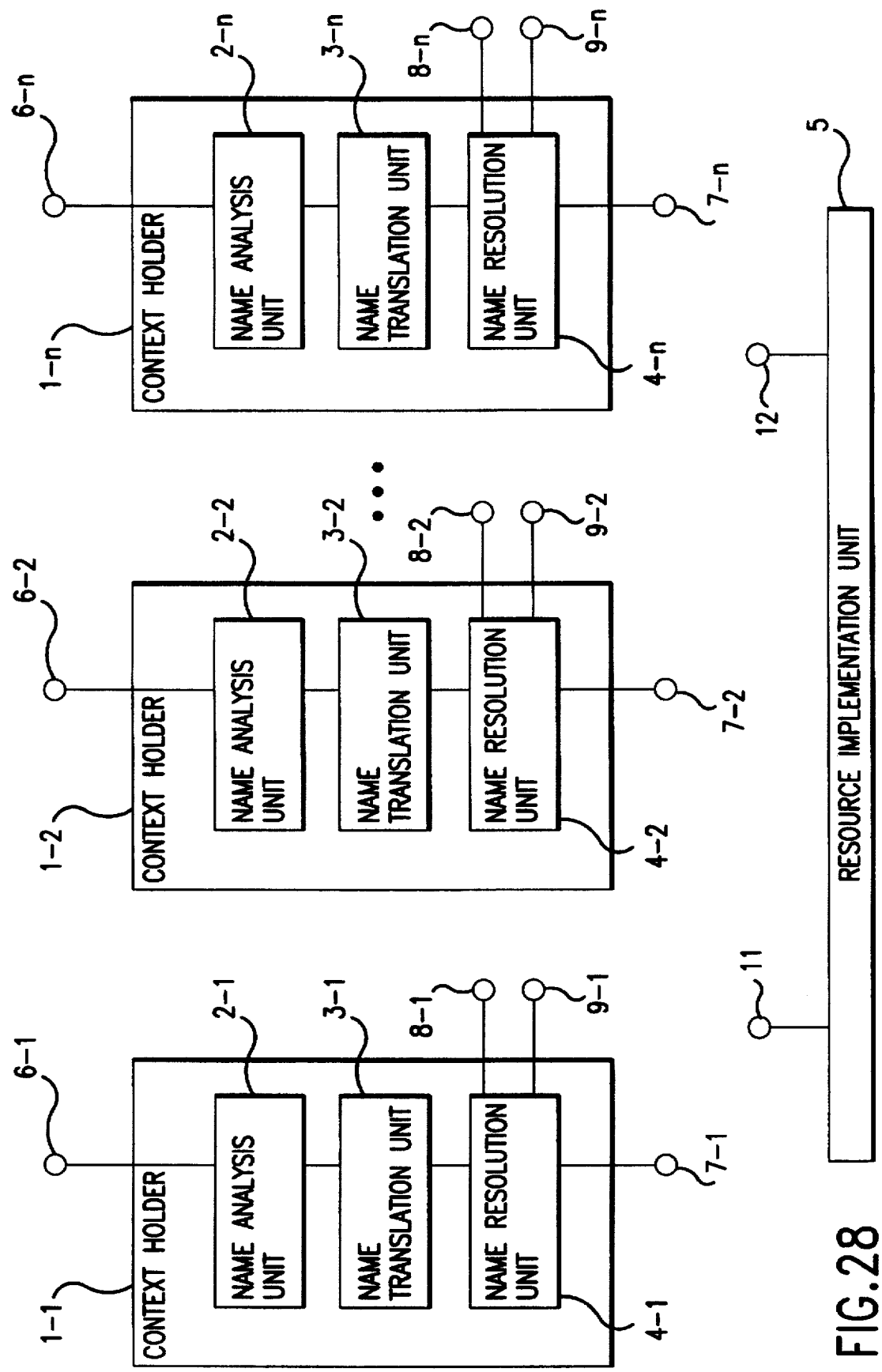
FIG. 28 is a block diagram showing a third embodiment of a resource management apparatus according to the present invention.

FIG. 28 is a block diagram showing a third embodiment of a resource management apparatus according to the present invention. Reference numerals shown in the drawing are identical to those shown in FIG. 1 or FIG. 11. The third embodiment shows an example in which the name resolution unit 4 commonly provided in the first embodiment is provided within each of context holders. Reversely, the third embodiment illustrates an example in which the name resolution units 4-1 through 4-n provided within the individual context holders employed in the second embodiment are provided as a common name resolution 4.

The third embodiment comprises n context holders of a context holder 1-1 to a context holder 1-n and a single resource implementation unit 5. The number of the context holders may be one. The third embodiment may be generally composed of a desired number of context holders. Similarly, the number of resource implementation units may be one. Alternatively, a desired number of resource implementation units may be generally used.

The context holders 1-1 through 1-n have inherent context identifiers respectively. Further, the context holders 1-1 through 1-n include terminals 6-1 through 6-n and terminals 7-1 through 7-n respectively. The terminals 6-1 through 6-n are respectively of input terminals used for the context holders 1-1 through 1-n. The terminals 6-1 through 6-n are respectively supplied with the names of resources. Further, the terminals 7-1 through 7-n are respectively of output terminals used for the context holders 1-1 through 1-n. The terminals 7-1 through 7-n respectively serve so as to output the results of resolutions relative to resource names, corresponding to the resource names inputted to the terminals 6-1 through 6-n.

Further, the context holders 1-1 through 1-n are respectively provided with name analysis units 2-1 through 2-n, name translation units 3-1 through 3-n and name resolution units 4-1 through 4-n. The name analysis units 2-1 through 2-n and the name translation units 3-1 through 3-n are similar to those employed in the first and second embodiments.

The name translation units 3-1 through 3-n are substantially identical to those employed in the second embodiment. However, the results of resolutions of names of resources corresponding to resource names respectively outputted to the context holders 1-1 through 1-n from output terminals 8-1 through 8-n, are inputted to their corresponding input terminals 9-1 through 9-n. Namely, when the context identifiers are included in resource implementation representations received from the name translation units 3-1 through 3-n, the name resolution units 4-1 through 4-n respectively output resource names to the context holders designated by the context identifiers from the output terminals 8-1 through 8-n and respectively receive the corresponding results of resolutions of names from the terminals 9-1 through 9-1n. Thus, the context holders are applied on a chain basis until the context identifiers are not included in the resource implementation representations. The results of name resolutions corresponding to all or any of the resultant resource implementation representations are outputted from the output terminals 7-1 through 7-n of the context holders 1-1 through 1-n respectively Further, a resource implementation unit 5 is similar to that employed in the first embodiment. The resource implementation unit 5 has terminals 11 and 12. The terminal 11 is supplied with the results of name resolutions of resources corresponding to the names, which are outputted from the output terminals 7-1 through 7-n of the context holders 1-1 through 1-n. The terminal 12 is of an output terminal of the resource implementation unit 5, which outputs each of handles for the resources corresponding to the name-resolution results outputted from the context holders 1-1 through 1-n.

By constructing the resource management apparatus as described in the third embodiment, a distributed system can be embodied which is capable of resolving the conventional problems and providing high flexibility in a manner similar to the first and second embodiments.

Figure 29:
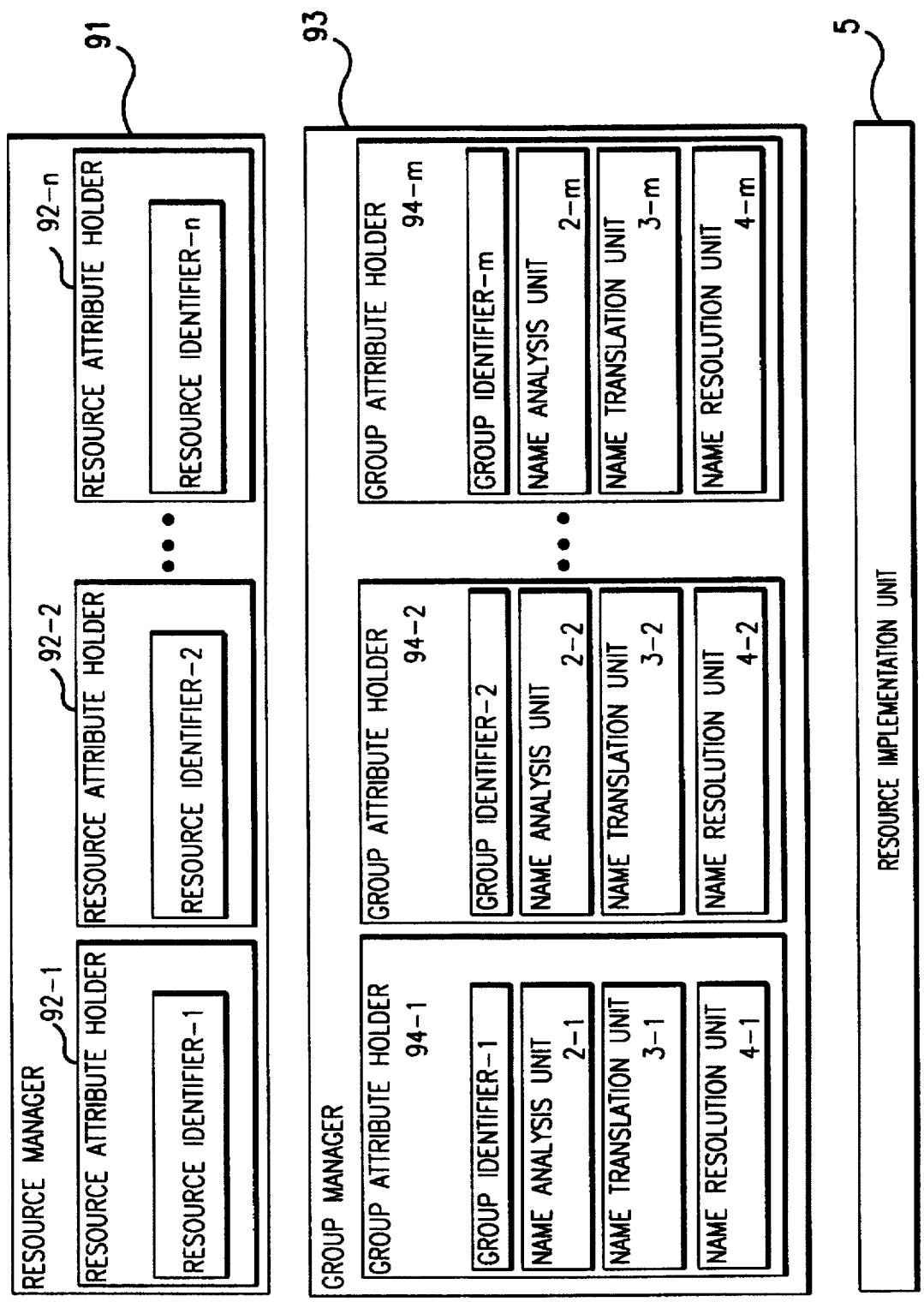
FIG. 29 is a configurational view illustrating a first specific example of the third embodiment shown in FIG. 28.

FIG. 29 is a configurational view showing a first specific example of the third embodiment according to the present invention. Reference numerals shown in the drawing are identical to those shown in FIG. 12. In the present first specific example, the context holders shown in FIG. 28 correspond to group attribute holders. In the present first specific example as compared with the first specific example of the second embodiment described above, resource implementation units are not included in the group attribute holders. When sets of identifiers for the group attribute holders and names are included in a series of resource elements in input resource implementation representations, name resolution units 4-1 through 4-m employed in the present specific example request the group attribute holders represented by the identifiers of the group attribute holders referred to above to solve names, and obtain name-resolution trees as the results of name resolutions represented by the names as an alternative to the acquirement of handles for resources represented by names. Thus, when the names are respectively input to the group attribute holders 94-1 through 94-m, the group attribute holders 94-1 through 94-m output the name-resolution trees respectively. A resolution implementation unit 5 is inputted with the name-resolution trees outputted from the group attribute holders 94-1 through 94-m and interprets them so as to output the handles for the resources represented by the names.

Figure 30:
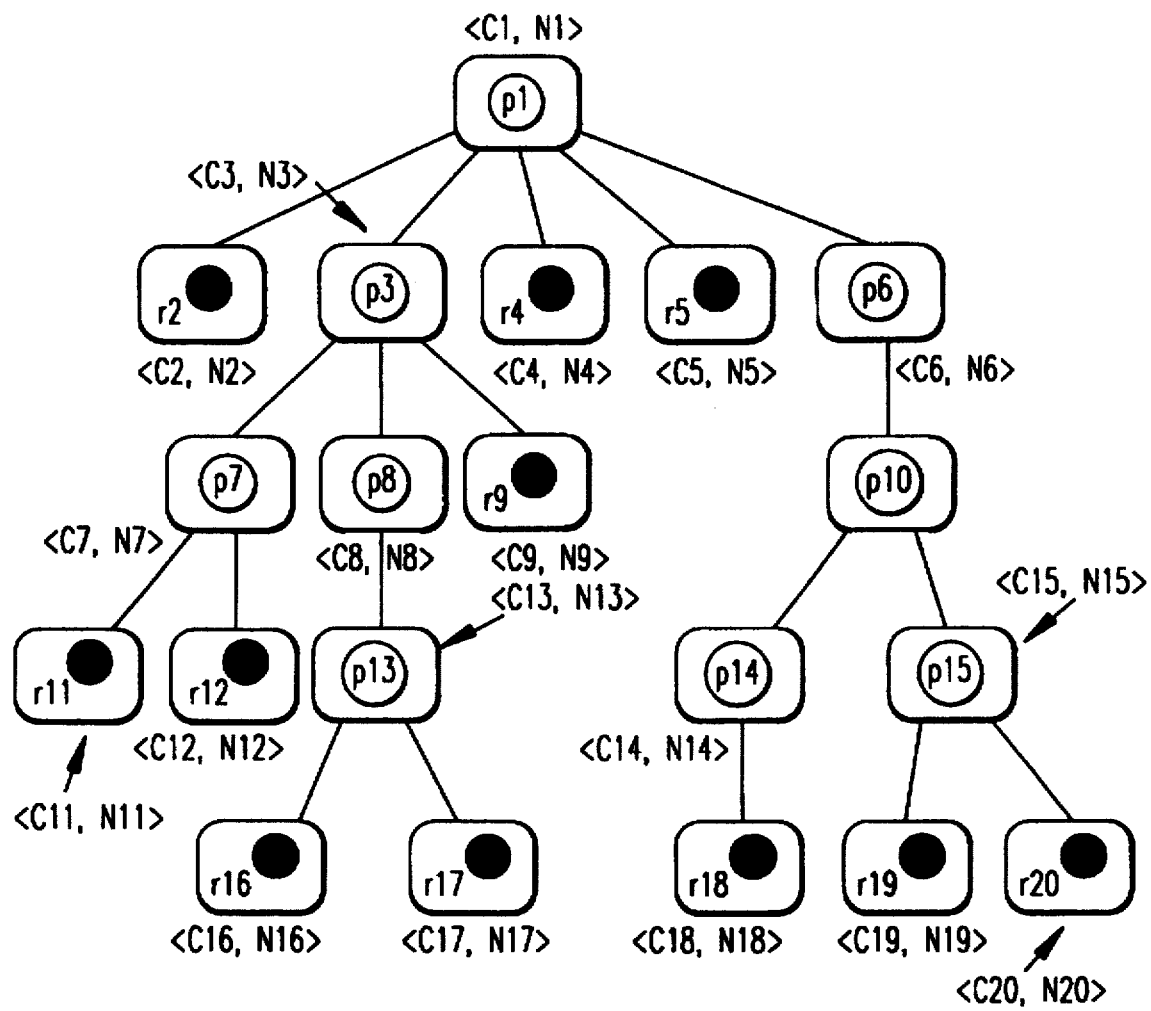
FIG. 30 is a view for describing one example of a name resolution tree.

FIG. 30 is a view for describing one example of a name-resolution tree. FIG. 30 shows a resolution tree of the result of name resolution <C1; N1> obtained as a result of the designation of an identifier C1 for a group attribute holder and the resolution of a name N1. Nodes show group attribute holders and arcs represent linkages between handles. Symbol <Cx ; Nx> (where x indicates each of integers ranging from 1 to 20) affixed to the nodes indicates each of sets of identifiers for group attribute holders indicative of contexts for supplying resources corresponding to the nodes and names. Symbol Cx indicates each of the identifiers for the group attribute holders indicative of the contexts and symbol Nx indicates each of local names at contexts fixed by Cx. Each of black dots or spots in the nodes indicates a resource identifier indicative of a resource which has been implemented in advance and provides one handle for its parents. A label rx (where x indicates any one of 2, 4, 5, 9, 11, 12, 16, 17, 18 and 19) applied to each black spot indicates a resource identifier. White dots or spots respectively indicate resources locally given in the present specific example. Each white spot is given in accordance with a procedure given by a context at its node. A label px (where x indicates any one of 1, 3, 6, 7, 8, 10, 13, 14 and 15) affixed to each while spot indicates a procedure identifier.

Each of squares in which the black and white spots are shown, indicates a context. When a name indicative of a node in the resolution tree is inputted, a context located at the node thereof outputs a resolution tree in which the node is defined as a root.

In the present specific example, the name resolution representation is defined as the resolution tree. This is however not necessarily limited to the resolution tree. This may be a character string indicative of terms, for example. Any one may be used if how to link between the identifiers for the procedure and resource and the handle can be expressed. The resolution tree of <C1; N1> of FIG. 30 is expressed by, for example, terms as follows:

Resolution tree of <C1; Ni>=p1 (r2; p3 (p7 (r11; r12); p8 (p13 (r16; r17)); r9); r4; r5; p6 (p10 (p14 (r18) ; p15 (r19 ; r20)))). The resolution tree will be expressed by the terms in the following examples.

A process of indicating representations for terms in name-resolution trees outputted from the group attribute holders employed in the first specific example of the third embodiment and resolving names will be described based on the case described in the second specific example of the second embodiment. FIG. 31 is a configurational view showing one example of a group manager employed in the first specific example of the third embodiment according to the present invention. The group manager 93 shown in FIG. 31 is substantially identical to that shown in FIG. 17. In the present specific example, however, the group attribute holders 94-0 through 94-8 do not include the resource implementation units 5-0 through 5-8. In the following description, 1- will be defined as a procedure for representing the transfer of each handle given as an argument to a parent's context as it is without effecting any processing on the handle.

FIG. 32 is a view for describing one example of a process of resolving a name "/by-G/G1/monthly report" employed in the first specific example of the third embodiment according to the present invention. When the name "/by-G/G1/monthly report" is inputted to the group attribute holder 94-0, the name resolution unit 4-0 requests the group attribute holder 94-1 to solve a name "/G1/monthly report". Further, the name resolution unit 4-1 of the group attribute holder 94-1 requests the group attribute holder 94-2 to solve a name "/monthly report". The group attribute holder 94-2 solves the name "/monthly report" and sends back the result of name resolution 1-([G1monthly report]) to the name resolution unit 4-1 of the group attribute holder 94-1. The name resolution unit 4-1 receives the result of name resolution therein and returns the result of name resolution 1-(1-([G1monthly report])) to the group attribute holder 94-0. The name resolution unit 4-0 of the group attribute holder 94-0 receives this name-resolution result therein and outputs the result of name resolution 1-(1-(1-([G1monthly report]))) to the resource implementation unit 5. The resource implementation unit 5 outputs a handle for a resource corresponding to the output result of name resolution.

FIG. 33 is a view for describing one example of a process of resolving a name "/by-G/G1" employed in the first specific example of the third embodiment according to the present invention. When the name "/by-G/G1" is inputted to the group attribute holder 94-0 even in this case, the name resolution unit 4-0 requests the group attribute holder 94-1 to solve a name "/G1". Further, the name resolution unit 4-1 requests the group attribute holder 94-2 to solve a name "". Since the name is of a vacant character string at this time, the name resolution unit 4-2 of the group attribute holder 94-2 returns a procedure group (G1) to the name resolution unit 4-1. The name resolution unit 4-1 receives the procedure group (G1) therein and outputs the result of name resolution 1-(group (G1)). The name resolution unit 4-0 outputs 1-(1-(group (G1))) to the resource implementation unit 5.

FIG. 34 is a view for describing one example of a process of resolving a name "\by-document\monthly report\G1" employed in the first specific example of the third embodiment according to the present invention. This case is similar to the above case. However, the "\by-document\monthly report\G1" is inputted to the group attribute holder 94-4. In doing so, the name resolution unit 4-4 requests the group attribute holder 94-5 to solve a name "\monthly report\G1". Further, the name resolution unit 4-5 requests the group attribute holder 94-6 to solve a name "\G1". The group attribute holder 94-6 solves the name "\G1" and returns the result of name resolution 1-([G1monthly report]) to the name resolution unit 4-5 of the group attribute holder 94-5. The name resolution unit 4-5 receives the result of name resolution therein and sends back the result of name resolution 1-(1-([G1monthly report])) to the group attribute holder 94-4. The name resolution unit 4-4 of the group attribute holder 94-4 receives the result of name resolution therein and outputs the result of name resolution 1-(1-(1-([G1monthly report]))) to the resource implementation unit 5. Thus, the name-resolution result identical to that shown in FIG. 32 can be outputted to the resource implementation unit 5.

Further, the case described in the third specific example of the second embodiment can also solve the names in the same manner as the first specific example of the third embodiment. Although a configurational view of a group manager employed in the present specific example is not shown herein, the resource implementation units 5-10 through 5-13 shown in FIG. 21 will be omitted. Name resolving processes will hereinafter be described as several examples.

FIG. 35 is a view for describing a further example of the process of resolving the name "/by-G/G1/monthly report" employed in the first specific example of the third embodiment according to the present invention. When the name "/by-G/G1/monthly report" is inputted to a group attribute holder 94-10, a name resolution unit 4-10 requests a group attribute holder 94-11 to solve a name "/G1/monthly report". Further, a name resolution unit 4-11 requests a group attribute holder 94-12 to solve a name "/monthly report". The group attribute holder 94-12 solves the name "/monthly report". Since a procedure [compression/expansion] is designated at this time, the group attribute holder 94-12 returns the result of name resolution, i.e., compression/expansion([G1monthly report]) to the name resolution unit 4-1 of the group attribute holder 94-1. The name resolution unit 4-1 receives the result of name resolution therein and sends back the result of name resolution 1-(compression/expansion([G1monthly report])) to the group attribute holder 94-0. Further, the name resolution unit 4-0 of the group attribute holder 94-0 receives this name-resolution result therein and outputs the result of name resolution 1-(1-(compression/expansion([G1monthly report]))) to the resource implementation unit 5.

Further, the case described using FIG. 23 as the modification of the third specific example of the aforementioned second embodiment can also solve the names in the same manner as described in the first specific example of the third embodiment. FIG. 36 is a view for describing a still further example of the process of resolving the name "/by-G/G1/monthly report" employed in the first specific example of the third embodiment according to the present invention. When the name "/by-G/G1/monthly report" is inputted to the group attribute holder 94-10 in the same manner as described above, the name resolution unit 4-10 requests the group attribute holder 94-11 to solve a name "/G1/monthly report". Further, the name resolution unit 4-11 requests the group attribute holder 94-12 to solve a name "/monthly report". The group attribute holder 94-12 solves the name "/monthly report" and sends back 1-([G1monthly report]) to the name resolution unit 4-1 of the group attribute holder 94-1 as the result of name resolution. The name resolution unit 4-1 receives this name-resolution result therein and effects a name resolution process on the group attribute holder 94-0. Since a procedure [compression/expansion] is specified at this time, the group attribute holder 94-12 returns the compression/expansion (1-([G1monthly report])) to the name resolution unit 4-1 of the group attribute holder 94-1 as the result of name resolution. Further, the name resolution unit 4-0 of the group attribute holder 94-0 receives this name-resolution result therein and outputs the result of name resolution 1-(compression/expansion(1-([G1monthly report]))) to the resource implementation unit 5.

The resource implementation unit 5 receives a name resolution tree indicative of the name-resolution result obtained by giving the names to their corresponding contexts. Next, the resolution tree is searched. If an intended node is of a leaf node indicative of a pre-realized resource, then a handle in which an operation is applied to the resource, is obtained from resource identifiers. Since the handle for the resource has been realized in advance, the handle can be obtained from the identifiers. If the resource is of a file, for example, then an identifier is designated and open processing is executed. As a result, a port corresponding to the identifier is obtained. In a UNIX file system, the identifier for the resource may be a file name or an i node number. In the case of a resource obtained based on the HTTP, an identifier for the resource may be URL (Universal Resource Locator).

If the node is of an intermediate node, then a handle for each child node is connected to an argument port to communicate with the argument port, whereby a procedure for performing predetermined processing is started up. The type of procedure depends on a label affixed to each of nodes of the resolution tree. The argument port is of a port for connecting a resource handle given as an argument for the procedure fixed by the given label to the intermediate node. The procedure applies a predetermined operation to the handle connected to the argument port. Further, since the procedure produces a new handle, the new handle is connected to an argument port for a parent's node of the resolution tree if the node is of a node other than a root. On the other hand, when the node is of the root, the handle is returned to a client as a handle for a resource relative to the given name.

A method of scanning nodes in a name resolution tree in turn and starting up a procedure associated with the scanned node can be realized by a method identical to a method of analyzing a syntax tree obtained as a result of syntax analysis when a complier is constructed, for example and generating object codes corresponding to respective nodes in the syntax tree. A method of analyzing the syntax tree and executing action associated with the respective nodes in the syntax tree can be realized by a Syntax-directed Translation method described in, for example, the "Compilers", Addison-Wesley Publishing Co., Ltd. by A. V. Aho, R. Sethi, J. D. Ullman, Chapters 5 to 9, 1986, a Code Generation method, etc.

Figure 37:
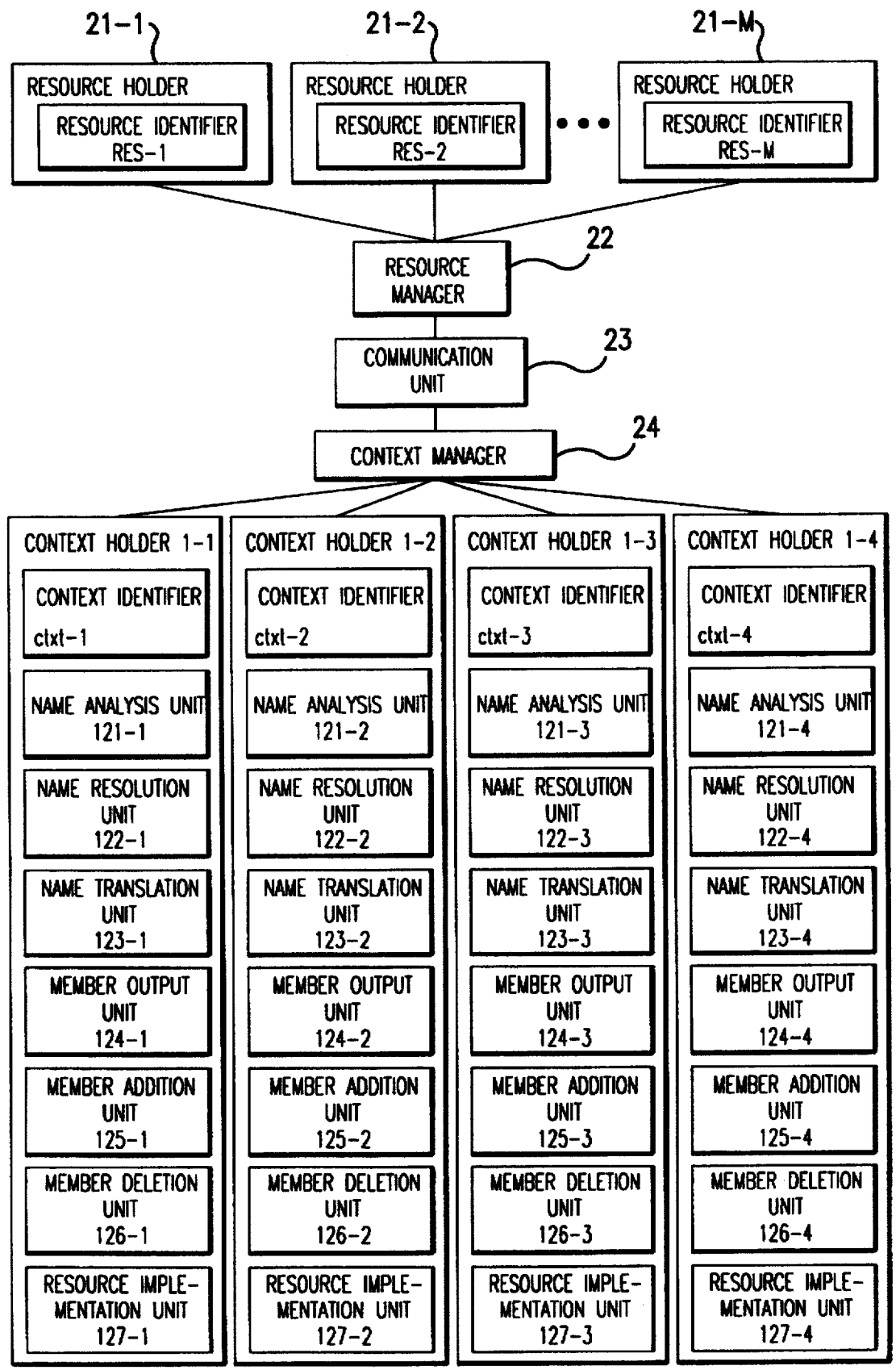
FIG. 37 is a configurational view showing a second specific example of the third embodiment according to the present invention.

FIG. 37 is a configurational view showing a second specific example of the third embodiment according to the present invention. In the drawing, the same elements of structure as those shown in FIG. 2 are identified by like reference numerals and their description will therefore be omitted. Reference numerals 121-1 through 121-4 indicate name analysis units, reference numerals 122-1 through 122-4 indicate name resolution units, reference numerals 123-1 through 123-4 indicate name translation units, reference numerals 124-1 through 124-4 indicate member output units, reference numerals 125-1 through 125-4 indicate member addition units, reference numerals 126-1 through 126-4 indicate member deletion units and reference numerals 127-1 through 127-4 indicate resource implementation units, respectively.

Context holders 1-1 through 1-4 have context identifiers ctxt-1 through ctxt-4 respectively. Further, the context holders 1-1 through 1-4 are respectively comprised of the name analysis units 121-1 through 121-4, the name resolution units 122-1 through 122-4, the name translation units 123-1 through 123-4, the member output units 124-1 through 124-4, the member addition units 125-1 through 125-4, the member deletion units 126-1 through 126-4 and the resource implementation units 127-1 through 127-4.

The name analysis units 121-1 through 121-4 employed in the present specific example respectively have functions similar to those of the name analysis units 2 employed in the respective embodiments and specific examples described above. The name analysis units 121-1 through 121-4 are all identical in function to the name analysis units 2 and respectively output input names as they are. The name resolution units 122-1 through 122-4 combine their own functions with functions of the name translation units 3 and the name resolution units 4 employed in the respective embodiments and specific examples mentioned above.

The name resolution unit 122-1 of the context holder 1-1 manages names and resource implementation representations indicative of a pair of a resource identifier and a procedure in the form of a table. In the present example, a name name1 will be resolved as resource implementation representations <compression, res-1> and a name name2 will be resolved as resource implementation representations <expansion, res-2>. The name translation unit 123-1 is inputted with a name and a second name and changes the corresponding relationship between the names and the resource implementation representations of the table held by the name resolution unit 122-1. The member output unit 124-1 extracts the names from the table comprised of the set of the names and the resource implementation representations managed by the name resolution unit 122-1 to thereby return a list <name1, name2> of solvable names. The member addition unit 125-1 is inputted with a pair of a name and resource implementation representations and adds the set to the table so that the name resolution unit 122-1 can solve the input name into resource implementation representations. The member deletion unit 126-1 is inputted with a name and deletes a set including the input name from the corresponding relationship between the names and the resource implementation representations held by the name resolution unit 122-1. The resource implementation unit 127-1 inputs the resource identifier outputted from the name resolution unit 122-1 to a resource manager 22 to request the resource manager 22 to output a file. The resource implementation unit 127-1 returns the result obtained by applying a procedure outputted from the name resolution unit 122-1 to the above result of output.

The name resolution unit 122-2 of the context holder 1-2 manages names and resource implementation representations indicative of a pair of a resource identifier and a procedure in the form of a table. A name name2 will be resolved as resource implementation representations <compression, res-3> and a name name3 will be resolved as resource implementation representations <expansion, res-4>. The name translation unit 123-2 is inputted with a name and a second name and changes the corresponding relationship between the names and the resource implementation representations of the table held by the name resolution unit 122-2. The member output unit 124-2 extracts the names from the table comprised of the set of the names and the resource implementation representations managed by the name resolution unit 122-2 to thereby return a list <name2, name3> of solvable names. The member addition unit 125-2 is inputted with a pair of a name and a resource identifier and adds the corresponding relationship to the table so that the name resolution unit 122-2 can solve the input name into a resource identifier. The member deletion unit 126-2 is inputted with a name and deletes a set including the input name from the corresponding relationship between the names and the resource implementation representations held by the name resolution unit 122-2. The resource implementation unit 127-2 inputs the resource identifier outputted from the name resolution unit 122-2 to the resource manager 22 to request the resource manager 22 to output a file. The resource implementation unit 127-2 returns the result obtained by applying a procedure outputted from the name resolution unit 122-2 to the above result of output.

A description will be made of the context holder 1-3. The name resolution unit 122-3 of the context holder 1-3 is inputted with a name and executes the following procedure. The name resolution unit 122-3 first passes the input name to the context holder 1-1 to request the context holder 1-1 to output a file. If a vacant or unavailable result is returned, then the name resolution unit 122-3 returns the unavailable result to the context holder 1-1 as it is and finishes the procedure. If a vacant or available result is returned, then the name resolution unit 122-3 delivers the input name to the context holder 1-2 to request the context holder 1-2 to output a file. If an unavailable result is returned, then the name resolution unit 122-3 returns the unavailable result to the context holder 1-2 as it is and finishes the procedure. If a vacant or available result is returned, then the name resolution unit 122-3 returns the vacant result to the context holder 1-2.

The name translation unit 123-3 is inputted with a name and a second name and executes the following procedure. The name translation unit 123-3 firstly gives the input name and the second name to the context holder 1-1 to request the context holder 1-1 to change the names. The name translation unit 123-3 then delivers the input name and the second name to the context holder 1-2 and requests the context holder 1-2 to change the names.

The member output unit 124-3 executes the following procedure. The member output unit 124-3 first requests the context holder 1-1 to output a member. The result of output will be regarded as A. Next, the member output unit 124-3 requests the context holder 1-2 to output a member. The result of output will be represented as B. A result obtained by coupling the results A and B obtained in this way to each other will be represented as C, which is returned.

The member addition unit 125-3 is supplied with a pair of a name and resource implementation representations and executes the following procedure. The member addition unit 125-3 firstly passes the input set of name and resource implementation representations to the context holder 1-1 and requests the context holder 1-1 to add members to a table. If the request is successfully made, then the procedure is finished. If the request comes to naught, then the member addition unit 125-3 further delivers the input set of name and resource implementation representations to the context holder 1-2 and requests the context holder 1-2 to add the members to the table.

The member deletion unit 126-3 is inputted with a name and executes the following procedure. The member deletion unit 126-3 firstly delivers the input name to the context holder 1-1 and requests the context holder 1-1 to delete members. The member deletion unit 126-3 then passes the input name to the context holder 1-2 and requests the context holder 1-2 to delete members.

The resource implementation unit 127-3 returns the result of output by the name resolution unit 122-3 as it is.

One example of the operation of the second specific example of the third embodiment according to the present invention will now be described. Here, the operation of the second specific example, for designating a context identifier ctxt-3 to a communication unit 23 and requesting the communication unit 23 to output a file given by the name name1 will be described.

A context manager 24 searches the context holder 1-3 having the context identifier ctxt-3 and requests the context holder 1-3 to input the name name1 and output the file. The context holder 1-3 inputs the name name1 to the name analysis unit 121-3 to obtain the name name1. Next, the context holder 1-3 inputs the name name1 to the name resolution unit 122-3 and requests the name resolution unit 122-3 to solve the name.

The name resolution unit 122-3 executes the aforementioned procedure. Namely, the name resolution unit 122-3 firstly requests the context holder 1-1 to output the file given by the name name1. The context holder 1-1 inputs the name name1 to the name analysis unit 121-1 to obtain the name name1. Next, the context holder 1-1 inputs the name name1 to the name resolution unit 122-1 of the context holder 1-1. The name resolution unit 122-1 of the context holder 1-1 returns <compression, res-1> to the input name name1.

Next, the context holder 1-1 requests the resource manager 22 to output a file to a resource holder having a resource identifier res-1. The resource manager 22 searches a resource holder 21-1 in which the resource identifier is equal to res-1 and requests the resource holder 21-1 to output a file. The resource holder 21-1 outputs the file and sends it back to the resource manager 22.

The context holder 1-1 that has received the result of file output from the resource manager 22, inputs the result of output and a procedure "compression" to the resource implementation unit 127-1 to request the resource implementation unit 127-1 to apply the procedure. The resource implementation unit 127-1 compresses the input result of file output in accordance with the definition of the procedure "compression" and returns it to the context holder 1-1.

The context holder 1-1 returns the result outputted from the resource implementation unit 127-1 to the name resolution unit 122-3 and finishes the processing. The name resolution unit 122-3 sends back the input to the communication unit 23 as it is.

The name name1 is solved in this way and hence a resource obtained by effecting the compression process on the resource res-1 can be obtained. At this time, a user can handle a virtual resource having the name name1 as a resource subjected to a predetermined compression process. In the present specific example as well, the respective parts included in the context holders have procedures respectively. Thus, the names are resolved by using the context holders on a chain basis according to the corresponding relationship between the context holders and the names. Alternatively, each of the names can be solved in accordance with a predetermined procedure.

As in the case of the respective specific examples of the second embodiment, each of which is constructed so that the group attribute holders respectively include the name resolution units and the resource implementation units, the individual specific examples of the first embodiment are also constructed so that the name resolution units and the resource implementation units are respectively in the context holders. Therefore, the respective specific examples of the first embodiment can be made identical in construction to the specific examples of the second and third embodiments. In this case, the name resolution units and the resource implementation units are identical in operation to the name resolution units and the resource implementation units employed in the individual specific examples of the second embodiment or the name resolution units and the resource implementation units employed in the individual specific examples of the third embodiment. Thus, the functions shown in the individual specific examples of the first embodiment can be realized by the constructions of the second and third embodiments.

Similarly, the individual specific examples of the second embodiment are constructed so that the name resolution units and the resource implementation units are not respectively included in the group attribute holders as in the case of the individual specific examples of the first embodiment, each of which is constructed so that the context holders do not include the name resolution units and the resource implementation units respectively and the individual specific examples of the third embodiment, each of which is constructed so that the group attribute holders do not include the resource implementation units respectively. Thus, the respective specific examples of the second embodiment can be constructed in a manner similar to those of the first and third embodiments. In this case, the name resolution units and the resource implementation units are identical in operation to the name resolution units and the resource implementation units employed in the individual specific examples of the first embodiment or those employed in the individual specific examples of the third embodiment. Thus, the functions shown in the individual specific examples of the second embodiment can be realized by the constructions of the first and third embodiments.

Further, as in the case of the individual specific examples of the first embodiment, each of which is constructed so that the context holders do not include the name resolution units respectively and the individual specific examples of the second embodiment, each of which is constructed so that the group attribute holders include the resource implementation units respectively, the individual specific examples of the third embodiment can be constructed in the same manner as those of the first embodiment by constructing the individual specific examples of the second embodiment so that the name resolution units are not included in the group attribute holders respectively. Further, the individual specific examples of the third embodiment can be constructed in a manner similar to those of the second embodiment by constructing the resource implementation units so as to be included in the group attribute holders respectively. When the name resolution units are constructed not so as to be included in the group attribute holders respectively, the name resolution units are identical in operation to the name resolution units employed in the individual specific examples of the first embodiment. On the other hand, when the resource implementation units are constructed so as to be included in the group attribute holders respectively, the resource implementation units are identical in operation to those employed in the individual specific examples of the second embodiment. As described above, the functions shown in the respective specific examples of the third embodiment can be realized by the constructions of the first and second embodiments.

A fourth embodiment of a resource management apparatus according to the present invention will now be described. The name analysis units 2 and the name translation units 3 employed in the aforementioned individual embodiments, the name resolution units 4 employed in the third embodiment, and the resource implementation units 5 employed in the second embodiment have formed the context holders so as to be associated with the context identifiers respectively. However, each of the context identifiers is nothing but one attribute for specifying each of the name analysis units 2, name translation units 3, name resolution units 4 and resource implementation units 5. These name analysis units 3, name translation units 3, name resolution units 4 and resource implementation units 5 can be associated with other various attributes. They can be selectively used according to the attribute.

The fourth embodiment is basically similar in structure to the first through third embodiments described above. In the fourth embodiment, the individual context holders respectively hold attributes in place of the context identifiers in the individual specific examples of the first through third embodiments. It is needless to say that the context identifier may be included in each context holder as one attribute. Incidentally, each of specific examples of respective embodiments to be described below will be illustrated as a modification of the first specific example of the first embodiment by way of example. However, other specific examples of the first embodiment and the individual specific examples of the third embodiment can be modified in the same manner as described above.

Figures 38, 39:
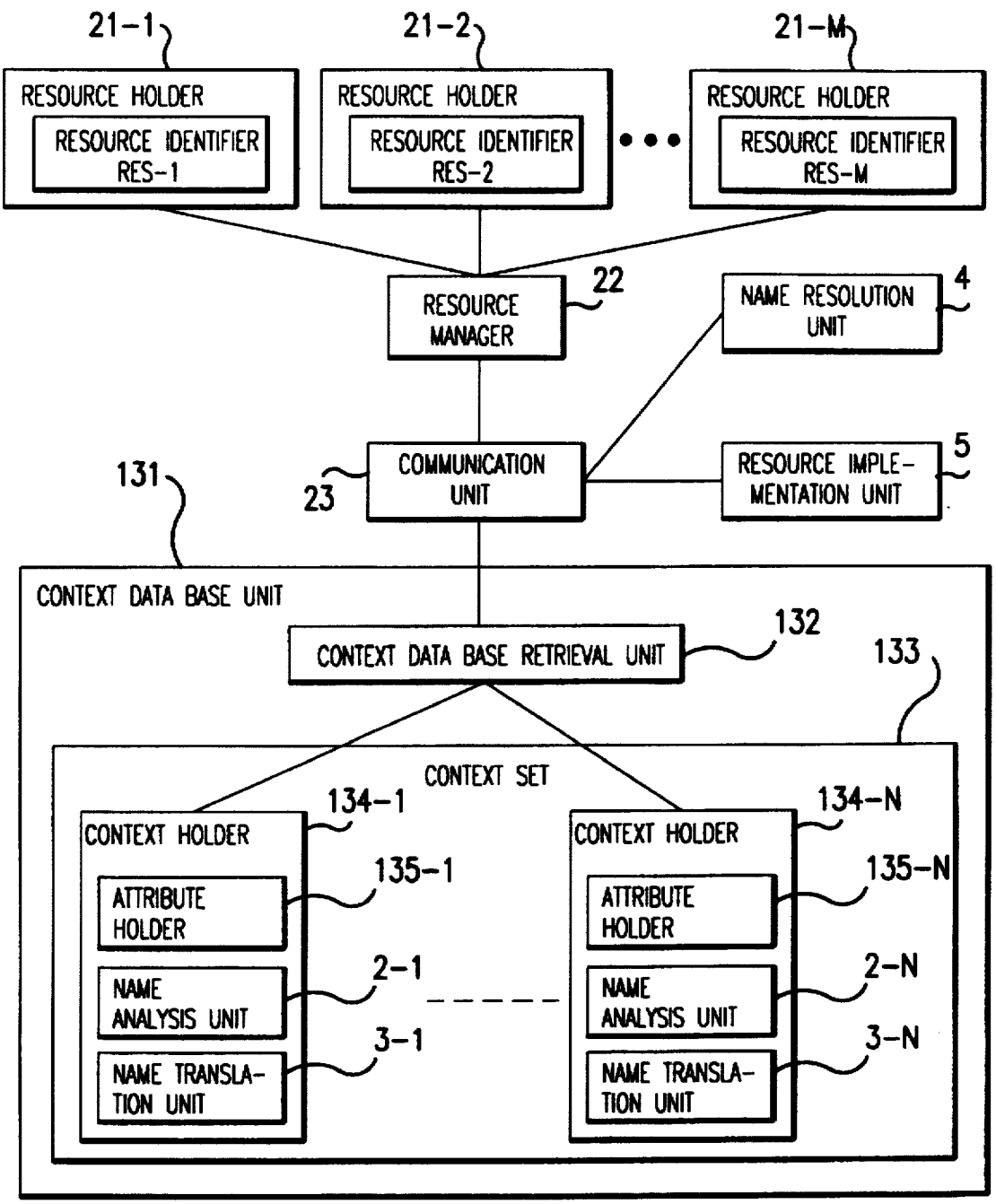
FIG. 38 is a configurational view illustrating one specific example of a fourth embodiment according to the present invention.
FIG. 39 is a view for describing one example of a resource retrieval expression employed in the specific example shown in FIG. 38.

FIG. 38 is a configurational view showing one specific example of the fourth embodiment according to the present invention. In the drawing, the same elements of structure as those shown in FIG. 2 are identified by like reference numerals and their description will therefore be omitted. Reference numeral 131 indicates a context data base unit, reference numeral 132 indicates a context data base retrieval unit, reference numeral 133 indicates a context set, reference numerals 134-1 through 134-N indicate context holders respectively and reference numerals 135-1 through 135-N indicate attribute holders respectively. The context set will now be represented as a set "context".

The context data base unit 131 manages the N context holders 134-1 through 134-N as the context set 133. The context data base unit 131 normally manages a desired number of sets. Further, the context data base unit 131 gives names to the sets respectively and refers to the sets by using the names given to the sets. However, when the number of sets is one, the context data base unit 131 may refer to the set without giving a name to the set.

Further, the context data base unit 131 is provided with the context data base retrieval unit 132 for retrieving the context set 133. The context data base retrieval unit 132 receives therein a resource retrieval expression described by using attributes and finds out a context holder having an attribute that meets the resource retrieval expression from the context set 133.

The context holders 134-1 through 134-N comprise the attribute holders 135-1 through 135-N, name analysis units 2-1 through 2-N and name translation units 3-1 through 3-N respectively. The attribute holders 135-1 through 135-N hold a desired number of attributes therein as lists comprised of pairs of names thereof and values thereof, respectively. It is needless to say that they may have context identifiers as the attributes respectively. When only the context identifiers are used as the attributes, they are made identical in structure to those employed in the first specific example of the first embodiment.

One example of a specific operation made by the one specific example of the fourth embodiment according to the present invention will be described. Now, each of the attribute holders 135-1 through 135-N holds therein three attributes: an attribute "owner" indicative of its owner, an attribute "mdate" indicative of a modified or changed date and an attribute "category" indicative of the category as a list of names thereof and values thereof. The attribute values can be referred to as property. owner, property. mdate and property. category respectively. The value of the property. owner of the attribute holder 135-1 will be represented as "Smith", the value of the property. mdate thereof will be represented as "95.3.18" and the value of the property. category thereof will be represented as "picture". The values of all the property owners of the attribute holders 135-2 to 135-N will be regarded as "Bill", the values of all the property. mdates thereof will be regarded as "95.3.3" and the values of all the property. categories thereof will be regarded as "sound".

Further, the name analysis unit 2-1 outputs all the input names as they are. The name translation unit 3-1 outputs resource implementation representations <{ }, {res-1}> to a name name1. The resource implementation representations comprise a vacant series or string of implementation elements and a resource identifier res-1 corresponding to a series of resource elements. Namely, a resource having the resource identifier res-1 is used as it is and hence the resource implementation representations correspond to the resource identifier res-1 alone. Therefore, the name translation unit 3-1 outputs the resource identifier res-1 to the name name1 herein. Further, the name resolution unit 4 outputs all of the input resource retrieval expression and resource retrieval expression in the resource implementation representations to the context data base retrieval unit 132 as they are.

Now, consider where a context is designated or specified in which the attribute value indicative of the owner is equal to "Smith", the attribute value indicative of the modified date is newer than Mar. 16, 1995 and the attribute value indicative of the category is an "image", and an inquiry about the name name1 is made.

FIG. 39 is a view for describing one example of a resource retrieval expression employed in the one specific example of the fourth embodiment according to the present invention. When the above inquiry is made, a resource retrieval expression OQL-1 shown in FIG. 39, for example, may be inputted. The resource retrieval expression OQL-1 has been described in accordance with the Object Query Language: OQL proposed by the Object Database Management Group (ODMG). The resource retrieval expression OQL-1 means retrieving a context holder from the context set 133, in which the value of the attribute property. owner indicative of the owner is equal to "Smith", the value of the attribute property. mdate indicative of the modified date is greater or newer than 95.3.16 and the value of the attribute property. category is equal to "picture". When the corresponding context holder exists as one as a result of its retrieval, the corresponding context holder is returned and an error is returned at all other times.

When a communication unit 23 receives therein a request for an inquiry about the name name1 that has designated the resource retrieval expression OQL-1, the communication unit 23 requests the context data base unit 131 to find or retrieve one satisfying the resource retrieval expression OQL-1 from the attribute holders 135-1 through 135-N of the context holders 134-1 through 134-N.

The context data base unit 131 sends the resource retrieval expression OQL-1 to the context data base retrieval unit 132 to find or retrieve a context attribute holder that meets the resource retrieval expression OQL-1. Since the context attribute holder 135-1 satisfies the condition for the resource retrieval expression OQL-1, the context data base unit 131 returns the context attribute holder 135-1 as the result of retrieval of the resource retrieval expression OQL-1.

The communication unit 23 inputs the name name1 to the context attribute holder 135-1 and requests it to solve the name. The context attribute holder 135-1 inputs the name name1 to the name analysis unit 2-1 and requests it to solve the name. The name name1 inputted to the name analysis unit 2-1 is outputted as the name name1 as is and the name name1 is applied to the name translation unit 3-1 as an input to the name translation unit 3-1. The name translation unit 3-1 outputs the resource identifier res-1 to the input name name1.

The resource identifier res-1 inputted to the name resolution unit 4 is outputted as is. Thus, the communication unit 23 can obtain the resource identifier res-1 as a result of resolution of the name name1 that has designated the resource retrieval expression OQL-1. Accordingly, the resource implementation unit 5 is able to obtain a resource having the resource identifier res-1 from the resource implementation representations.

A fifth embodiment of a resource management apparatus according to the present invention will now be described. In the aforementioned respective embodiments, the context holders are respectively specified by the context identifiers or attributes with the context holders as units and the names to be resolved are inputted. There is however a case in which respective parts in a certain context holder are just the same as their corresponding parts in other context holders. It is thus useless to provide a part common to several context holders within the respective context holders. When a plurality of context holders having a certain common part exist, inconvenience takes place that when the common part is modified in a given context holder, this modification is not reflect on other context holders in the case of the aforementioned individual embodiments.

In the fifth embodiment, name analysis units 2, name translation units 3, name resolution units 4 and resource implementation units 5 provided within the individual context holders have attributes respectively and sets are formed every parts in these components. By selecting a part satisfying a resource retrieval expression from the respective sets and using the selected part, the same operation as when the context holder is selected, can be carried out. In the following specific examples similarly to the aforementioned first embodiment, a description will be made of a case where the name resolution unit 4 and the resource implementation unit 5 respectively exist as single. However, the following specific examples are not necessarily limited to this. The present specific examples can be constructed in the same manner as described above even in the case where the plurality of name resolution units 4 exist as in the third embodiment and the case where the plurality of name resolution units 4 and the plurality of resource units 5 exist as in the second embodiment.

Figure 40:
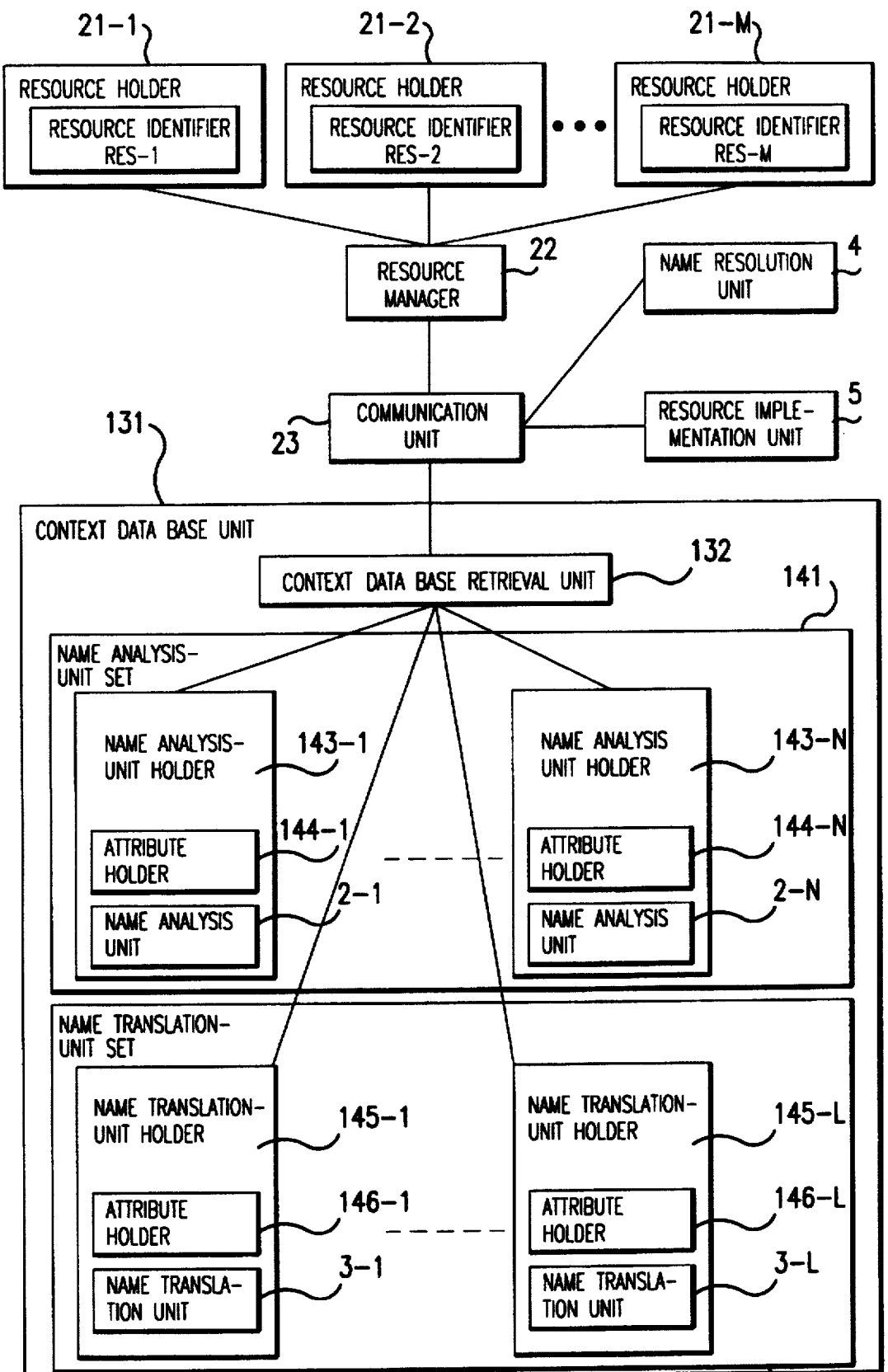
FIG. 40 is a configurational view showing one specific example of a fifth embodiment according to the present invention.

FIG. 40 is a configurational view showing one specific example of the fifth embodiment according to the present invention. In the drawing, the same elements of structure as those shown in FIGS. 2 and 38 are identified by like reference numerals and their description will therefore be omitted. Reference numeral 141 indicates a name analysis-unit set, reference numeral 142 indicates a name translation-unit set, reference numerals 143-1 through 143-N indicate name analysis-unit holders respectively, reference numerals 144-1 through 144-N indicate attribute holders respectively, reference numerals 145-1 through 145-L indicate name translation-unit holders respectively, and reference numerals 146-1 through 146-L indicate attribute holders respectively.

A context data base unit 131 comprises a context data base retrieval unit 132, N name analysis-unit holders 143-1 through 143-N, and L name translation-unit holders 145-1 through 145-L. The context data base unit 131 controls or manages the N name analysis-unit holders 143-1 through 143-N as a name analysis-unit set 141 and the L name translation-unit holders 145-1 through 145-L as a name translation-unit set 142.

The name analysis holders 143-1 through 143-N comprise the attribute holders 144-1 through 144-N respectively having attributes, and name analysis units 2-1 through 2-N respectively. Further, the name translation-unit holders 145-1 through 145-L comprise the attribute holders 146-1 through 146-L respectively having attributes, and name translation units 3-1 through 3-L respectively. A desired number of attributes are held in each of the attribute holders 144-1 through 144-N and attribute holders 146-1 through 146-L as a list of pairs of names thereof and values thereof.

One example of a specific operation made by the one specific example of the fifth embodiment according to the present invention will be described. Here, the name analysis-unit set 141 will be represented as a set "Parser" and the name translation-unit set 142 will be represented as a set "Trans".

Further, attributes "name" indicative of names are held in their corresponding attribute holders 144-1 through 144-N of the name analysis-unit holders 143-1 through 143-N as a list of pairs of attribute names and attribute values. The attribute value indicative of the name for each of the attribute holders 144-1 through 144-N can be referred to as a property. name. The value of the property. name for the attribute holder 144-1 will be regarded as "path_expression". Further, the value of the property. name for each of the attribute holders 144-2 to 144-N will be regarded as "dot_notation".

Furthermore, two attributes: an attribute "owner" indicative of a owner and an attribute "category" indicative of a category are held in each of the attribute holders 146-1 through 146-L of the name translation-unit holders 145-1 through 145-N as a list of each pair of an attribute name and an attribute value. The attribute values for the attribute holders 146-1 through 146-L can be respectively referred to as a property. owner and a property. category. The value of the property. owner for the attribute holder 146-1, the value of the property. category therefor, the value of the property. owner for each of the attribute holders 146-2 through 146-L and the value of the property. category for each of them will be respectively regarded as "Smith", "picture", "Bill" and "sound".

The name analysis unit 2-1 of the name analysis-unit holder 143-1 outputs the longest character string continuous from the head of an input name exclusive of a character "/", to the input name. The name translation unit 3-1 of the name translation-unit holder 145-1 outputs a resource identifier res-1 to a name name1. Further, the name resolution unit 4 outputs all the input resource retrieval expressions as they are.

A description will now be made of one example of the operation for retrieving a context having a name analysis unit in which the attribute value indicative of the name is equal to "path_expression" and a name translation unit in which the attribute value indicative of the owner is equal to "Smith" and the attribute value indicative of the category is equal to "image" and requesting the retrieved context to solve the name "name1/name2/name3".

FIG. 41 is a view for describing one example of a resource retrieval expression employed in the one specific example of the fifth embodiment according to the present invention. When it is desired to make the aforementioned request, a resource retrieval expression OQL-2 shown in FIG. 41, for example, may be inputted as the resource retrieval expression. This resource retrieval expression OQL-2 is based on the Object Query Language: OQL proposed by the Object Database Management Group (ODMG) in a manner similar to the aforementioned fourth embodiment. The resource retrieval expression OQL-2 means that a name analysis-unit holder in which the value of the attribute property. name indicative of the name is equal to "path_expression", is retrieved from the set Parser, and when the corresponding name analysis-unit holder exists as single, a name analysis unit of the corresponding name analysis-unit holder is regarded as a name analysis unit of a context obtained as a result of retrieval, whereas an error is returned otherwise. Further, the resource retrieval expression OQL-2 means that a name translation-unit holder in which the value of the attribute property. owner indicative of the owner is equal to "Smith" and the value of the attribute property. category indicative of the category is equal to "picture", is retrieved from the set Trans, and when the corresponding name translation-unit holder exists as single, a name translation unit of the corresponding name translation-unit holder is regarded as a name translation unit of a context obtained as a result of retrieval, whereas a request to return an error is made otherwise.

When a communication unit 23 receives therein the resource retrieval expression OQL-2 and a request for an inquiry about the name "name1/name2/name3", the communication unit 23 requests the context data base unit 131 to obtain a context that satisfies the resource retrieval expression OQL-2. The context data base unit 131 sends the resource retrieval expression OQL-2 to the context data base retrieval unit 132, which in turn finds a name analysis-unit holder and a name translation-unit holder both satisfying the resource retrieval expression OQL-2 to thereby produce a context.

Figure 42:
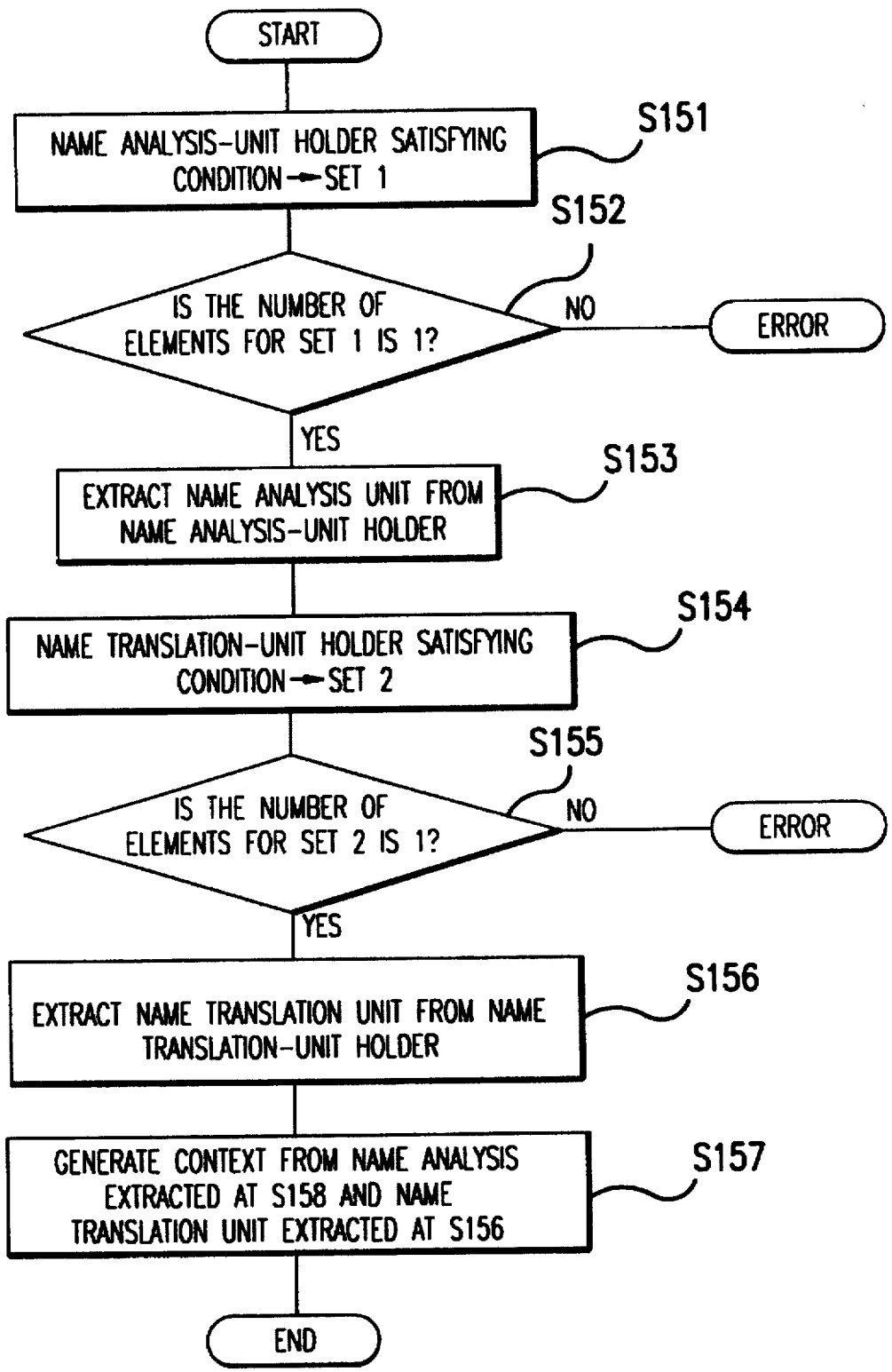
FIG. 42 is a flowchart for describing one example of retrieval operations of a name analysis unit and a name translation unit in the specific example shown in FIG. 40.

FIG. 42 is a flowchart for describing one example of retrieval operations of a name analysis unit and a name translation unit in the one specific example of the fifth embodiment according to the present invention. At S151, a name analysis-unit holder that satisfies a condition for a resource retrieval expression, is firstly retrieved and defined as a set 1. Here, the value of the attribute "property. name indicative of the name held in each of the attribute holders 144-1 through 144-N corresponding to the components of the N name analysis-unit holders 143-1 through 143-N that are elements of the set Parser, is compared with "path_expression". Since the name analysis-unit holder 143-1 is obtained if the result of comparison is true, a set in which only the name analysis-unit holder 143-1 is represented as an element, is defined as the set 1.

It is judged at S152 whether the number of elements of the set 1 obtained at S151 is 1. When the number of the elements is other than 1, an error is returned and the routine procedure is finished. The routine procedure proceeds to the next step at all other times. In this case, the routine procedure proceeds to S153.

At S153, a name analysis unit 2-i is fetched from a name analysis-unit holder 143-i corresponding to an element of the set 1. The fetched name analysis unit 2-1 is represented as a name analysis unit of a context corresponding to the result of retrieval by the resource retrieval expression. In the present specific example, the name analysis unit 2-1 is extracted from the name analysis-unit holder 143-1.

Next, at S154, a name translation-unit holder that satisfies the condition for the resource retrieval expression, is retrieved and represented as a set 2. In the present specific example, the value of the attribute "property. owner" indicative of the owner, which is held in each of the attribute holders 146-1 through 146-L corresponding to components of the L name translation-unit holders 145-1 through 145-L that are elements of the set Trans, is compared with "Smith". The answer "true" is obtained as a result of comparison. Further, the value of the attribute "property. category" indicative of the category is compared with "picture". Since the true result means that the name translation-unit holder 145-1 is selected, a set with only the name translation-unit holder 145-1 as an element is represented as the set 2.

It is judged at S155 whether the number of elements of the set 2 obtained at S154 is 1. When other than 1, an error is returned and the routine procedure is finished. The routine procedure proceeds to the next step at all other times. In the present specific example, the routine procedure proceeds to S156.

At S156, a name translation unit 3-j is extracted from a name translation-unit holder 145-j that is of an element of the set 2. The ***taken-out name translation unit 3-j is regarded as a name translation unit of a context corresponding to the result of retrieval by the resource retrieval expression. In the present specific example, the name translation unit 3-1 is extracted from the name translation-unit holder 145-1.

At S157, a context composed of the name analysis unit obtained at S153 and the name translation unit obtained at S156, which are components thereof, is produced and returned as a result. Since the name analysis unit 2-1 and the name translation unit 3-1 are extracted in the present specific example, a context composed of these units is generated and returned as the result of retrieval.

The communication unit 23 inputs the name "name1/name2/name3" to the generated context and requests it to solve the name. The name "name1/name2/name3" is inputted to the name analysis unit 2-1 extracted by the retrieval. The name analysis unit 2-1 outputs a character string "name1" prior to a character "/" as seen from the head, from the input name "name1/name2/name3". The character string "name1" is inputted to the name translation unit 3-1.

The name translation unit 3-1 outputs a resource identifier res-1 to the input character string "name1". The resource identifier res-1 inputted to the name resolution unit 4 is outputted as it is. The resource identifier res-1 is returned to the communication unit 23 as the result of resolution of the name "name1/name2/name3" that has designated or specified the resource retrieval expression OQL-2.

A sixth embodiment of a resource management apparatus according to the present invention will now be described. The aforementioned fifth embodiment has shown the example in which the respective parts that constitute each context, are retrieved in accordance with the resource retrieval expression to thereby produce the intended context. In the sixth embodiment, respective parts constituting each context, i.e., a name analysis unit, a name translation unit, a name resolution unit and a resource implementation unit are respectively comprised of name analysis information, name translation information, name resolution information and resource implementation information. The respective parts are produced by retrieving the name analysis information, name translation information, name resolution information and resource implementation information respectively. It is of course unnecessary to produce or generate all the parts constituting each context in this way. Some of the respective parts may be simply constructed so as to be produced. The present sixth embodiment can be applied even in the case where the context holders exist as in the individual specific examples shown in the first through fourth embodiments and the case where the respective parts constituting each context are retrieved as in the specific example shown in the fifth embodiment.

Each of specific examples to be described below will be described as one example having such a construction as described above. Namely, each of contexts is composed of a name analysis unit and a name translation unit. A name analysis unit is retrieved from a set of name analysis-unit holders in a manner similar to the fifth embodiment described above. Further, a name translation unit is produced by name translation information retrieved from a plurality of sets having name translation information. However, the present embodiment is not necessarily limited to this construction. Even in the case where the name resolution unit 4 exists in the context as in the third embodiment and the case where the name resolution unit 4 and the resource implementation unit 5 exist as in the second embodiment, the present embodiment can be constructed in the same manner. Further, the name analysis unit, the name resolution unit and the resource implementation unit other than the name translation unit may be produced by retrieving name analysis information, name resolution information and resource implementation information respectively.

Figure 43:
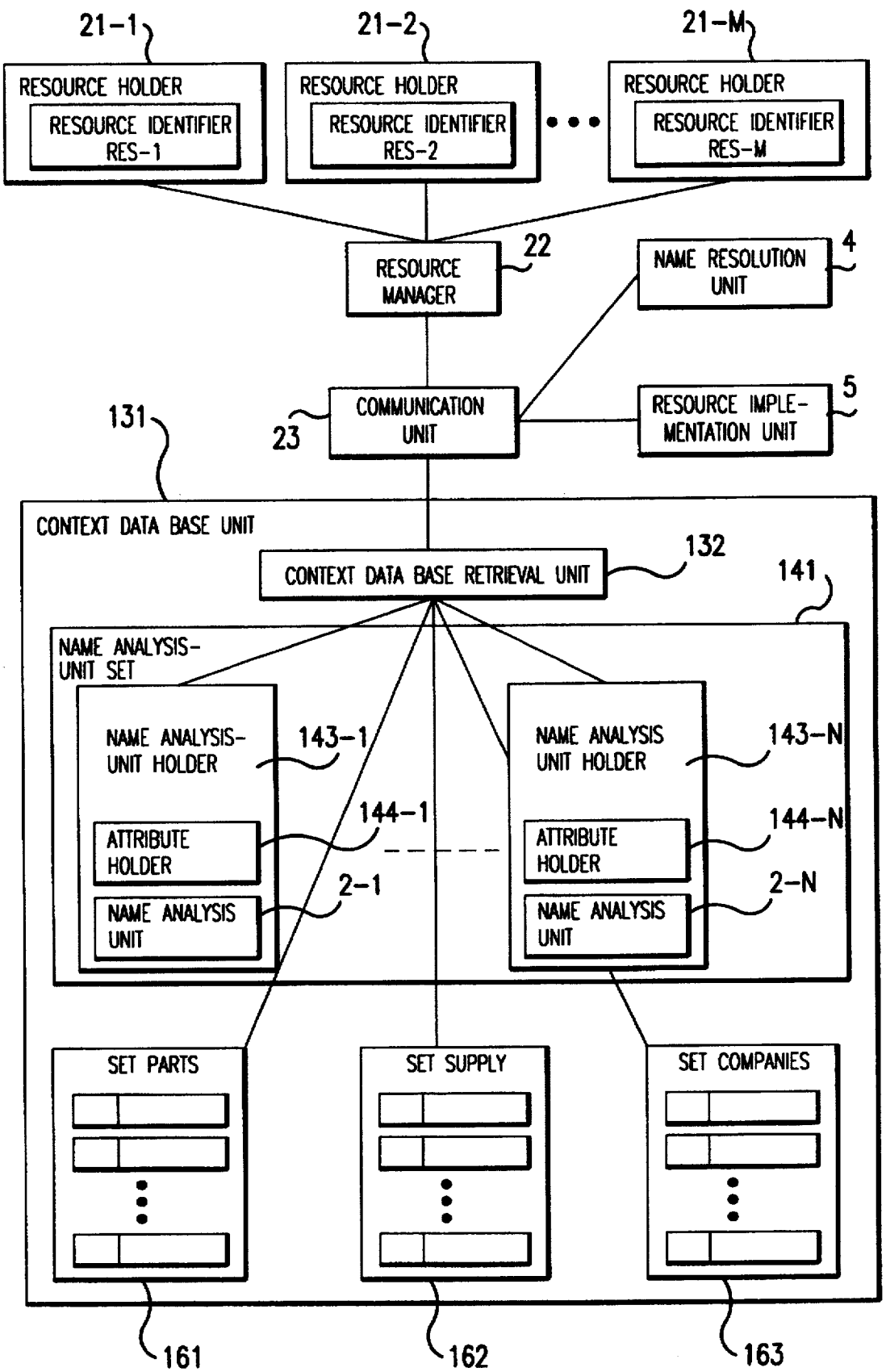
FIG. 43 is a configurational view showing one specific example of a sixth embodiment according to the present invention.

FIG. 43 is a configurational view showing one specific example of the sixth embodiment according to the present invention. In the drawing, the same elements of structure as those shown in FIG. 40 are identified by like reference numerals and their description will therefore be omitted. Reference numerals 161 through 163 indicate sets of name translation information respectively. A context data base unit 131 includes a context data base retrieval unit 132, a name analysis-unit set 141 having N name analysis-unit holders 143-1 through 143-N and the three name translation information sets 161 through 163.

The name translation information sets 161 through 163 are constructed so that their name translation information are retrievable by the context data base retrieval unit 132. If the name translation information is of name-translatable information, any one may be used. As the name translation information, may be used those such as a relational table, a function, etc. Further, a term reloadable rule, an attribute grammar rule, a rule of Syntax Directed Translation, etc. may be used as the name translation information. Furthermore, a node set defined by logical programming, automaton synthesis (synthesis using a transition rule), a transition rule using a turing machine, etc. may be used. Still further, the name translation information may be an instance of an object defined by object-oriented programming.

In the following description, the name translation information is regarded as a relational table as one example. In the present specific example, the name analysis-unit set 141, the name translation information set 161, the name translation information set 162 and the name translation information set 163 are represented as Parser, Parts, Supply and Companies respectively. FIG. 44 is a view for describing one example of the name translation information set employed in the specific example of the sixth embodiment according to the present invention. One example of the contents of the set Parts is shown in FIG. 44. Data about parts are stored in the set Parts. The set Parts indicates a set in which a two-term or ordered pair is defined as elements. The first term of the ordered pair is referred to as name and the second term thereof is referred to as price. The first term name shows the name of a part and the second term price represents the price of the part. For example, a two-term pair of <part1, 1500> shows that the price of a part whose name is "patt1", is 1500.

FIG. 45 is a view for describing another example of the name translation information set employed in the specific example of the sixth embodiment according to the present invention. The set Supply is illustrated in FIG. 45. Data about supply conditions of parts are stored in the set Supply. The set Supply corresponds to a set in which a two-term pair is defined as elements. The first term of the two-term pair is referred to as name and the second term thereof is referred to as supplier. The first term name indicates the name of a part and the second term supplier shows a part supplier. For example, a two-term pair of <part1, com1> shows that the part supplier whose name is "patt1", is "com1".

FIG. 46 is a view for describing a further example of the name translation information set employed in the specific example of the sixth embodiment according to the present invention. The set Companies is shown in FIG. 46. Data about suppliers are stored in the set Companies. The set Companies is of a set in which a three-term pair is defined as elements. The first term of the three-term pair is referred to as name, the second term thereof is referred to as tel and the third term thereof is referred to as outline. The first term name shows the name of a supplier, the second term tel indicates a telephone number of the supplier and the third term outline represents a resource identifier for a file resource in which the outline of the supplier has been described. For example, a three-term pair of <com1, tel, res-5> shows that the telephone number of the part supplier whose name is "com1", is "11-111-1111" and the resource identifier for the file resource in which the outline of the supplier has been described, is "res-5".

One example of a specific operation made by the one specific example of the sixth embodiment according to the present invention will be described. Now, the name analysis-unit holders 143-1 through 143-N comprise attribute holders 144-1 through 144-N respectively having attributes and name analysis units 2-1 through 2-N respectively. Further, attributes "name" indicative of names are held in their corresponding attribute holders 144-1 through 144-N as a list of pairs of attribute names and attribute values. The attribute value indicative of the name for each of the attribute holders 144-1 through 144-N can be referred to as a property. name. The value of the property. name for the attribute holder 144-1 of the name analysis-unit holder 143-1 is regarded as "path_expression". Further, the value of the property. name for each of the attribute holders 144-2 to 144-N is regarded as "dot_notation". The name analysis unit 4 outputs the longest character string continuous from the head of an input name exclusive of a character "/", to the input name. The name resolution unit 5 outputs all the input resource retrieval expressions as they are.

Figures 47, 48:
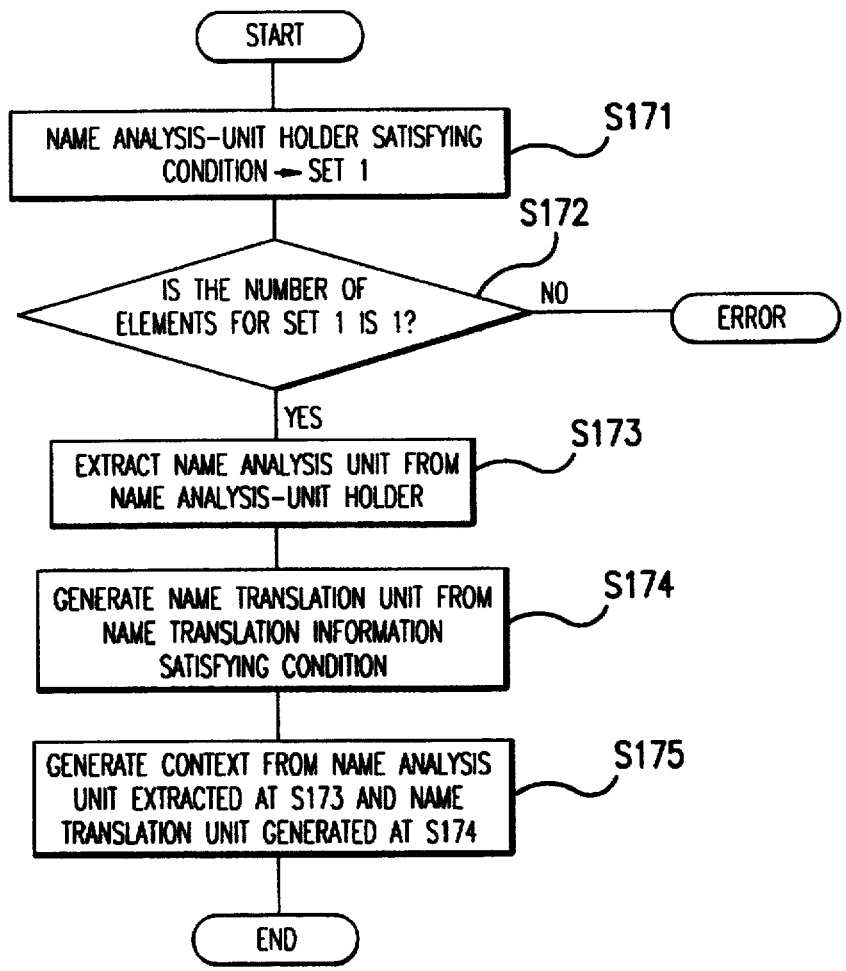
FIG. 47 is a view for describing one example of a resource retrieval expression in the specific example shown in FIG. 43.
FIG. 48 is a flowchart for describing one example of operations for retrieval of each name analysis unit and retrieval of name translation information, which are executed in the specific example shown in FIG. 43.

FIG. 47 is a view for describing one example of a resource retrieval expression employed in the one specific example of the sixth embodiment according to the present invention. A resource retrieval expression OQL-3 shown in FIG. 47, for example, is now considered to be inputted as the resource retrieval expression. The resource retrieval expression OQL-3 shown in FIG. 47 is based on the Object Query Language: OQL proposed by the Object Database Management Group (ODMG) in a manner similar to the aforementioned fifth and sixth embodiments. The resource retrieval expression OQL-3 includes the following means. A name analysis-unit holder in which the value of the attribute property. name indicative of the name is equal to "path_expression", is first retrieved from the set Parser. When the corresponding name analysis-unit holder exists as single, a name analysis unit of the corresponding name analysis-unit holder is then regarded as a name analysis unit of a context obtained as a result of retrieval. When other than one, an error is returned. Further, a Cartesian product of the set Parts, the set Supply and the set Companies is determined and the resultant product is regarded as a set 1. Elements in which the value of each term equivalent to price of the set Parts is greater than 1000, the value of each term equivalent to name of the set Parts and the value of a term equivalent to name of the set Supply are equal to each other, and the value of each term equivalent to supplier of the set Supply and the value of a term equivalent to name of the set Company are equal to each other, are selected from the set 1 and regarded as a set 2. A set in which a two-term pair composed of a term equivalent to name of the set Company and a term equivalent to outline of the set Company is defined as elements, is produced with respect to the individual elements of the set 2. The result of retrieval is regarded as a name translation unit.

When the aforementioned resource retrieval expression OQL-3 is specified and a request for an inquiry about a name "com1/name2/name3" is made, the communication unit 23 receives these therein and requests the context data base unit 131 to send a context composed of a name analysis unit and a name translation unit that satisfy the resource retrieval expression OQL-3. The context data base unit 131 delivers or passes the resource retrieval expression OQL-3 to the context data base retrieval unit 132, which retrieves a name analysis unit that satisfies the resource retrieval expression OQL-3. Further, the context data base unit 131 produces a name translation unit from name translation information that satisfies the resource retrieval expression OQL-3 to thereby form an intended context.

FIG. 48 is a flowchart for describing one example of retrieval operations for a name analysis unit and a name translation information, which are executed in the one specific example of the sixth embodiment according to the present invention. In the flowchart, steps S171 through S173 are similar to the steps S151 through S153 shown in FIG. 42. In the present specific example, the value of the attribute "property. name" indicative of the name held in each of the attribute holders 144-1 through 144-N corresponding to components of the name analysis-unit holders 143-1 through 143-N that are of the elements of the set Parser, is compared with "path_expression". A set 1 composed of only the name analysis-unit holder 143-1 indicative of "true" as a result of comparison is obtained. Next, the name analysis unit 2-1 is extracted from the name analysis-unit holder 143-1 that is an element of the set 1, and the ***taken-out name analysis unit 2-1 is regarded as a name analysis unit for a context.

Next, at S174, name translation information that satisfies a condition for a resource retrieval expression, is extracted to produce a name translation unit. In the case of the aforementioned resource retrieval expression OQL-3, a Cartesian product of the sets Parts, Supply and Company is first determined and the resultant product is regarded as a set 2-1. Elements in which the values of terms each equivalent to price of the set Parts are greater than 1000, are selected from elements of the set 2-1 and a set of the selected elements is represented as a set 2-2. Further, elements in which the value of each term equivalent to name of the set Parts and the value of each term equivalent to name of the set Supply are equal to each other, are selected from elements of the set 2-2 and a set of the selected elements is represented as a set 2-3. Furthermore, elements in which the value of each term equivalent to supplier of the set Supply and the value of each term equivalent to name of the set Company are equal to each other, are selected and a set of the selected elements is represented as a set 2-4.

FIG. 49 is a view for describing a specific example of the name translation information which satisfies the resource retrieval expression employed in the one specific example of the sixth embodiment according to the present invention. The set 2-4 is represented as shown in FIG. 49 as a result of determination of it from the sets Parts, Supply and Company shown in FIGS. 44 through 46.

Further, a two-term pair in which the term equivalent to name of the set Company is regarded as the first term from and the term equivalent to outline of the set Company is regarded as the second term to, is formed with respect to each element of the set 2-4, based on the resource retrieval expression OQL-3. A set in which the two-term pairs are formed as elements, is generated and regarded as a set 2-5.

FIG. 50 is a view for describing a specific example of the name translation unit produced by the one specific example of the sixth embodiment according to the present invention. The so-generated set 2-5 indicates information for converting or translating the name of the first term from into a resource identifier for the second term to. Thus, a name translation unit can be constructed by the set 2-5 shown in FIG. 50.

Referring back to FIG. 48, a context is produced by the name analysis unit extracted at S173 and the name translation unit produced at S174 at S175. In the present specific example, the intended context is produced by the name analysis 2-1 and the produced name translation unit.

The context data base unit 131 returns the context in which the name translation unit produced by the name analysis unit 2-1 and the set 2-5 is of a component, to the communication unit 23 as the result of retrieval by the resource retrieval expression OQL-3.

The communication unit 23 inputs the required name "com1/name2/name3" to the so-produced context and requests it to perform a name resolution operation. The name "com1/name2/name3" is inputted to the name analysis unit 2-1 so that the longest character string "com1" continuous from the head of the name exclusive of a character "/" is outputted. Since the name translation unit has information shown in FIG. 50, it outputs the term to "res-5" of an element in which the term from is com1.

The res-5 inputted to the name resolution unit 4 is outputted to the communication unit 23 as it is and the OQL-3 is designated to the communication unit 23. The resource identifier res-5 is returned as a result of the request for resolution of the name "com1/name2/name3".

In each individual specific example of the four through sixth embodiments, the resource identifier is obtained by performing the name resolution process once. In some cases, however, a name and a resource retrieval expression are often obtained. In this case, the communication unit 23 sends the resultant resource retrieval expression to the context data base unit 131 again to retrieve a context. The communication unit 23 requests the retrieved context to solve the name. Thus, in a manner similar to the individual specific examples of the first through third embodiments, the resource can be obtained by repeating the process of resolving the name.

In each individual specific example of the fourth through sixth embodiments as well, the resource implementation unit 5 is provided. However, each of the specific examples may be constructed without providing the resource implementation unit 5. When the resource identifier is outputted from the name resolution unit as particularly in the case of each individual example described above, the resource implementation unit 5 becomes unnecessary.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. An apparatus for managing resources, which is suitable for use in a network information system wherein a plurality of computer systems for carrying out information processing are connected to one another by a network, comprising:

a plurality of context holding means each having a context identifier; and name resolving means;

said plurality of context holding means each including:
name analyzing means for receiving therein a resource name corresponding to the name given to a resource and analyzing the name of the resource name; and
name translating means for converting the result of analysis by said name analyzing means into a result of name conversion, which is either a first resource implementation representation composed of a pair of a first series of resource elements with resource identifiers inherently held by real resources realized in advance within said each computer system as elements and a first series of implementation elements corresponding to procedure information for processing the real resources specified by the first series of resource elements to produce another resource or a second resource implementation representation composed of a pair of a second series of resource elements with individual pairs of a context identifier and a resource names as elements and a second series of implementation elements corresponding to procedure information for processing resources specified by the second series of resource elements to produce another resource; and
said name resolving means receiving the result of name conversion from the name translating means, determining whether the result of name conversion is the first resource implementation representation or the second resource implementation representation, if the result of name conversion is the second resource implementation representation, outputting a resource name included in the second series of resource elements to said context holding means specified by the corresponding context identifier, and if the result of name conversion is the first resource implementation representation, making a result of name resolution, which is a list of the resource identifier and the procedure information, according to the first resource implementation representation.

2. The apparatus for managing resources according to claim 1 further comprising:

resource implementing means for interpreting the procedure information included in the result of name resolution made by said name resolving means, and producing a resource, based on the result of the interpretation and the pre-realized real resource corresponding to the resource identifier included in the result of name resolution.

3. An apparatus for managing resources, which is suitable for use in a network information system wherein a plurality of computer systems for carrying out information processing are connected to one another by a network, comprising:

at least one first context holding means having a context identifier; and at least one second context holding means having a context identifier;

said first context holding means including:
first name analyzing means for receiving a resource name corresponding to a name given to a resource and analyzing the name of the resource name;
first name translating means for converting the result of analysis by said first name analyzing means into a first series of resource elements with only resource identifiers inherently held by real resources realized in advance within said each computer system as elements;
first name resolving means for converting the result of conversion by said first name translating means into a first result of name resolution corresponding to a pair of the first series of resource elements converted by said first name translating means and procedure information for processing the, first series of resource elements; and
first resource implementing means for interpreting the procedure information included in the first name resolution result converted by said first name resolving means, effecting the result of interpretation on a real resource corresponding to the first series of resource elements to thereby produce a resource and outputting handle information for operating the resource;

said second context holding means including:
second name analyzing means for receiving a resource name therein and analyzing the name of the resource name;
second name translating means for converting the result of analysis by said second name analyzing means into a second series of resource elements with individual pairs of a context identifier and a resource name as elements;
second name resolving means for outputting a resource name of the second series of resource elements converted by said second name translating means to the first context holding means associated with the corresponding context identifier and converting the result of conversion by said second name translating means into a second result of name resolution corresponding to a pair of handle information obtained from said first context holding means and procedure information for processing a resource corresponding to the handle information; and
second resource implementing means for interpreting the procedure information included in the second name resolution result converted by said second name resolving means and effecting the result of interpretation on the resource corresponding to the handle information to thereby produce a resource.

4. An apparatus for managing resources, which is suitable for use in a network information system wherein a plurality of computer systems for carrying out information processing are connected to one another by a network, comprising:

at least one first context holding means having a context identifier; and at least one second context holding means having a context identifier;

said first context holding means including:
first name analyzing means for receiving a resource name corresponding to a name given to a resource and analyzing the name of the resource name;

first name translating means for converting the result of analysis by said first name analyzing means into a first series of resource elements with resource identifiers inherently held by real resources realized in advance within said each computer system as elements; and first name resolving means for outputting a first result of name resolution corresponding to a pair of the first series of resource elements converted by said first name translating means and procedure information for processing the first series of resource elements; and said second context holding means including:

second name analyzing means for receiving a resource name therein and analyzing the name of the resource name;

second name translating means for converting the result of analysis by said second name analyzing means into a second series of resource elements with individual pairs of a context identifier and a resource name as elements; and second name resolving means for outputting a resource name of the second series of resource elements converted by said second name translating means to the first context holding means specified by the corresponding context identifier, receiving therein the first result of name resolution from said first context holding means and outputting a second result of name resolution corresponding to a pair of each resource identifier and procedure information for processing a real resource corresponding to the resource identifier using the first result of name resolution received from said first context holding means.

5. An apparatus for managing resources, which is suitable for use in a network information system wherein a plurality of computer systems for carrying out information processing are connected to one another by a network, comprising:

at least one first context holding means having a context identifier;

at least one second context holding means having a context identifier; and resource implementing means;

said first context holding means including:

first name analyzing means for receiving a resource name corresponding to a name given to a resource and analyzing the name of the resource name;

first name translating means for converting the result of analysis by said first name analyzing means into a first series of resource elements with only resource identifiers inherently held by real resources realized in advance within said each computer system as elements;

first name resolving means for outputting a first result of name resolution corresponding to a pair of the first series of resource elements converted by said first name translating means and procedure information for processing the first series of resource elements;

said second context holding means including:

second name analyzing means for receiving a resource name therein and analyzing the name of the resource name;

second name translating means for converting the result of analysis by said second name analyzing means into a second series of resource elements with individual pairs of a context identifier and a resource name as elements; and second name resolving means for outputting a resource name of the second series of resource elements converted by said second name translating means to the first context holding means specified by the corresponding context identifier and outputting a second result of name resolution corresponding to a pair of each resource identifier and procedure information for processing a real resource corresponding to the resource identifier using the first result of name resolution received from said first context holding means; and said resource implementing means interpreting the procedure information included in the second name resolution result outputted from said second name resolving means provided within said second context holding means and effecting the result of interpretation on the pre-realized real resource corresponding to the resource identifier to thereby produce a resource.

6. An apparatus for managing resources, comprising:

a first context holding means having a context identifier; and a second context holding means having a context identifier;

the first context holding means inputting a resource name corresponding to a name given to each of the resources, analyzing the resource name, specifying a resource identifier, which identifies a real resource realized in advance, and procedure information for processing the real resource identified by the resource identifier in accordance with the result of analysis, interpreting the procedure information, producing a resource by the result of interpretation on the real resource identified by the resource identifier, and outputting handle information for operating the produced resource;

the second context holding means receiving a resource name, analyzing the resource name, specifying a context identifier and a resource name in accordance with the result of analysis, outputting the specified resource name to the first context holding means identified by the specified context identifier, receiving handle information corresponding to the output resource name from the first context holding means, specifying procedure information for processing the resource corresponding to the handle information in accordance with the result of the analysis, interpreting the procedure information, and producing another resource by applying the result of interpretation to the resource corresponding to the handle information.

7. An apparatus for managing resources, which is suitable for use in a computer system for performing information processing, comprising:

at least one name analyzing means for receiving a resource name corresponding to a name associated with an attribute and given to a resource and analyzing the name of the resource name;

at least one name translating means associated with the attribute for converting the result of analysis by said name analyzing means into a result of conversion, which is either a first resource implementation representation composed of a pair of a first series of resource elements with resource identifiers inherently held by real resources realized in advance within said each computer system as elements and a first series of implementation elements corresponding to procedure information for processing the first series of resource elements or a second resource implementation representation composed of a pair of a second series of resource elements with pairs of each retrieval expression for directly or indirectly specifying the attribute and a resource name as elements and a second series of implementation elements corresponding to procedure information for processing a resource obtained from the second series of resource elements;

selecting means for selecting said name analyzing means and said name translating means receiving therein the result of name analysis from said name analyzing means, based on the retrieval expression included in the second resource implementation representation converted by said name translating means or the input retrieval expression; and name resolving means for determining whether the result of the name conversion is the first resource implementation representation or the second implementation representation, if the result of the name conversion is the second resource implementation representation, transferring the resource name of the second series of resource elements included in the second resource implementation representation converted by said name translating means or the input resource name to the name analyzing means selected by said selecting means, and if the result of name conversion is the first resource implementation representation, making a result of name resolution, which is a list of the resource identifier and the procedure information, according to the first resource implementation representation.

8. An apparatus according to claim 7, wherein said name translating means comprises at least one name translation information associated with the attribute, said selecting means selects the name translating means by specifying said at least one name translation information and has name translation constructing means constituting said name translating means based on said at least one name translation information specified by said selecting means, and the name analyzing means selected by said selecting means transfers the result of name analysis to the corresponding name translating means constructed by said name translation constructing means.

9. An apparatus according to claim 7, wherein said name resolving means exists as plural in association with the attribute, said selecting means further selects said name resolving means, and the name translating means selected by said selecting means transfers the first resource implementation representation or the second resource implementation representation to the name resolving means selected by said selecting means.

10. An apparatus according to claim 7, further comprising resource implementing means for interpreting the first series of implementation elements in the first resource implementation representation obtained from said name translating means and producing a resource, based on the pre-realized real resource corresponding to the first series of resource elements from the result of interpretation.

11. An apparatus according to claim 10, wherein said resource implementing means exists as plural in association with the attribute, said selecting means further selects said resource implementing means, and said name resolving means transfers the first resource implementation representation to the resource implementing means selected by said selecting means.

12. In a network information system including a plurality of context holding units, a method for managing resources executed in each of the context holding unit, comprising the steps of:

receiving a resource name corresponding to a name given to each of the resources;

analyzing the resource name;

obtaining a result of name conversion in accordance with the result of analysis, the result of name conversion being either a first representation comprising a resource identifier, which identifies a real resource realized in advance, and first procedure information for processing the real resource identified by the resource identifier, or a second representation comprising a pair of a context identifier and another resource name and second procedure information for processing the resource specified by the resource name;

determining whether the result of name conversion is the first representation or the second representation;

if the result of name conversion is the first representation, interpreting the first procedure information;

producing a resource by applying the result of interpretation on the real resource identified by the resource identifier, and outputting handle information for operating the produced resource;

if the result of name conversion is the second representation, outputting the second resource name to another context holding unit identified by the specified context identifier;

receiving handle information corresponding to the output second resource name from another context holding unit;

interpreting the second procedure information; and producing a resource by applying the result of interpretation to the resource corresponding to the handle information.

* * * * *